United States Patent
Buzinkai et al.

(10) Patent No.: US 11,312,859 B2
(45) Date of Patent: Apr. 26, 2022

(54) THERMOPLASTIC RESINS FOR NETWORK APPLICATIONS

(71) Applicant: INV Nylon Chemicals Americas, LLC, Wilmington, DE (US)

(72) Inventors: John F. Buzinkai, Chattanooga, TN (US); Alexander L. Gulledge, Columbia, SC (US); Benjamin D. Herzog, Wichita, KS (US); Isaac K. Iverson, Wichita, KS (US); Chee Sern Lim, Kennesaw, GA (US); James Michael Shurish, Troy, MI (US)

(73) Assignee: INV Nylon Chemicals Americas, LLC, Wilmington, DE (US)

(*) Notice: Subject to any disclaimer, the term of this patent is extended or adjusted under 35 U.S.C. 154(b) by 0 days.

(21) Appl. No.: 17/221,519

(22) Filed: Apr. 2, 2021

(65) Prior Publication Data
US 2021/0292553 A1   Sep. 23, 2021

Related U.S. Application Data

(63) Continuation of application No. PCT/IB2021/052093, filed on Mar. 12, 2021.

(60) Provisional application No. 63/154,035, filed on Feb. 26, 2021, provisional application No. 63/142,081, filed on Jan. 27, 2021, provisional application No. 62/989,105, filed on Mar. 13, 2020.

(51) Int. Cl.
*C08L 77/06* (2006.01)
*C08K 7/14* (2006.01)
*H01Q 1/42* (2006.01)

(52) U.S. Cl.
CPC ............. *C08L 77/06* (2013.01); *C08K 7/14* (2013.01); *H01Q 1/42* (2013.01)

(58) Field of Classification Search
CPC ... C08L 77/04; C08L 77/06; H01Q 1/42; C08K 7/14
See application file for complete search history.

(56) References Cited

U.S. PATENT DOCUMENTS

| 2004/0030023 | A1 | 2/2004 | Bühler et al. |
| 2008/0090945 | A1* | 4/2008 | Langrick .......... D01F 1/10 524/94 |
| 2008/0194751 | A1* | 8/2008 | Rexin ............... C08L 77/04 524/423 |
| 2010/0160008 | A1 | 6/2010 | Topoulos |
| 2012/0301659 | A1* | 11/2012 | Rao ............... C08G 69/265 428/97 |

(Continued)

FOREIGN PATENT DOCUMENTS

| EP | 1961787 A1 | 8/2008 |
| EP | 3857265 A1 | 8/2021 |

(Continued)

OTHER PUBLICATIONS

Allconnect Cellular Frequency Bands. "Cellular Frequency Bands Explained". (Year: 2021).*

(Continued)

*Primary Examiner* — Michael M Dollinger

(57) ABSTRACT

The present disclosure relates to the use of thermoplastic resins in millimeter wave network applications. More specifically, it relates to polyamide materials meeting the requirements of dielectric performance in such applications.

20 Claims, 24 Drawing Sheets

(56) References Cited

U.S. PATENT DOCUMENTS

| | | | |
|---|---|---|---|
| 2016/0355670 A1* | 12/2016 | Lee | C08K 7/24 |
| 2017/0190884 A1* | 7/2017 | Yun | C08K 7/24 |
| 2018/0009982 A1 | 1/2018 | Steele et al. | |
| 2019/0177519 A1 | 6/2019 | Wang et al. | |
| 2021/0087361 A1* | 3/2021 | Davis | C08K 3/30 |
| 2021/0403711 A1 | 12/2021 | Buzinkai et al. | |
| 2021/0403712 A1 | 12/2021 | Buzinkai et al. | |
| 2021/0403713 A1 | 12/2021 | Buzinkai et al. | |

FOREIGN PATENT DOCUMENTS

| | | | |
|---|---|---|---|
| TW | 201533156 A | 9/2015 | |
| TW | 201724641 A | 7/2017 | |
| WO | 2013160454 A2 | 10/2013 | |
| WO | WO-2018189114 A1 * | 10/2018 | C08K 7/14 |

OTHER PUBLICATIONS

Prospector. Lumid® GP1000B(W) Datasheet. (Year: 2021).*

Tanigawa, T., et al., "New Low Transmission Loss Material for Millimeter-Wave Radar Module AS-400HS", Hitachi Chemical Technical Report No. 58, Jul. 31, 2020, pp. 17-18.

Akro-Plastic "Akroloy PA GF 50 black (6507)", Retrieved from Internet URL : https://akro-plastic.com/productfilter/details/6507/, Jul. 21, 2021, pp. 1-3.

International Search Report and Written Opinion received for PCT Application No. PCT/IB2021/052093, dated Jun. 17, 2021, 09 Pages.

Vsetula et al., "Axisymmetric horn antenna based on TEM → TM → TEM transform", International Conference on Electromagnetics in Advanced Applications, (ICEAA), 2011, pp. 753-756.

* cited by examiner

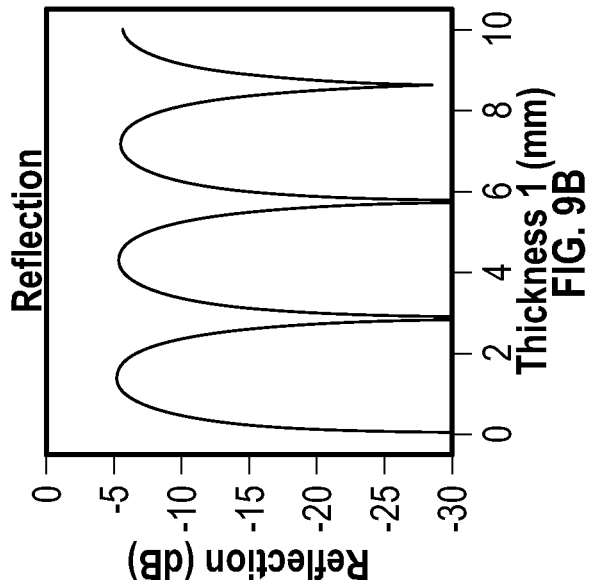 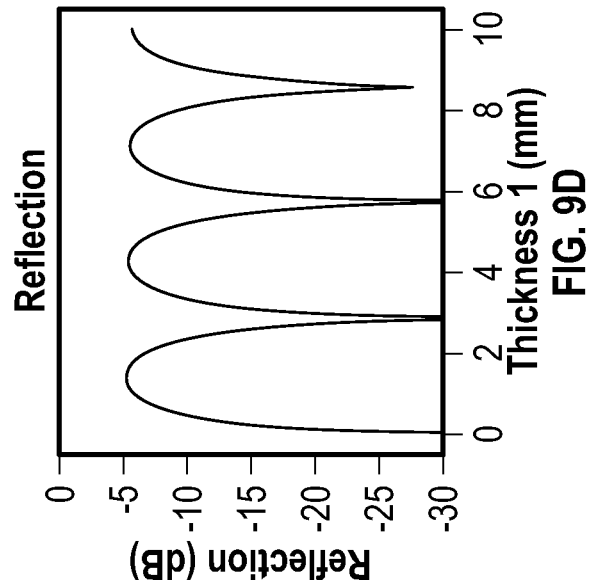
FIG. 9A  FIG. 9B
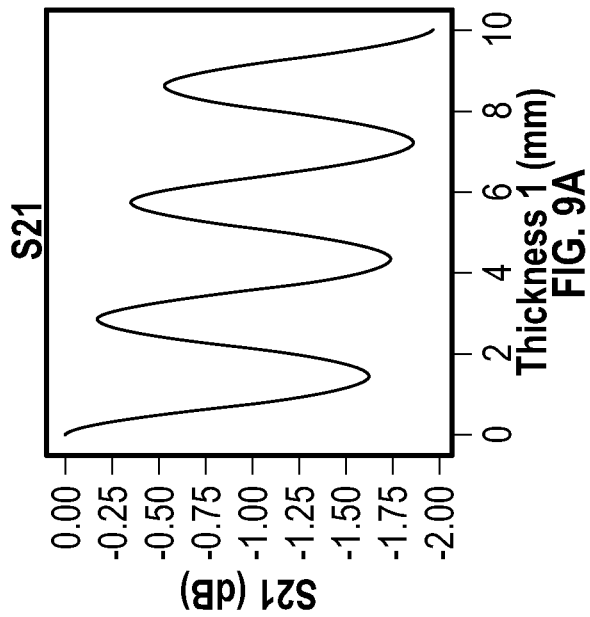 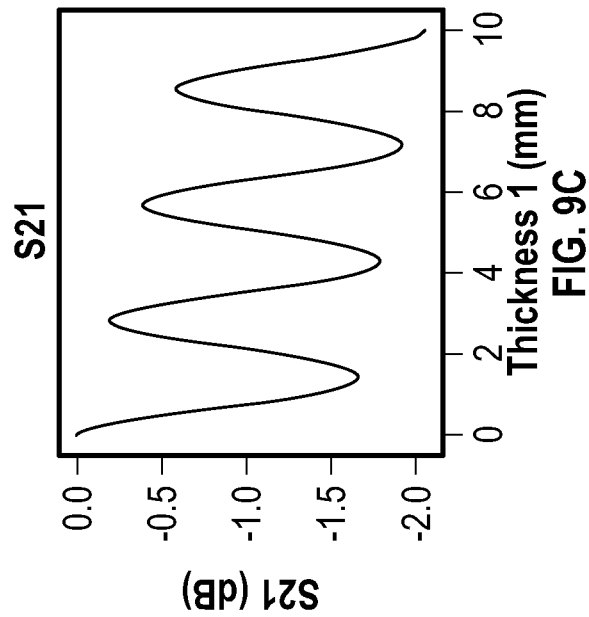
FIG. 9C  FIG. 9D

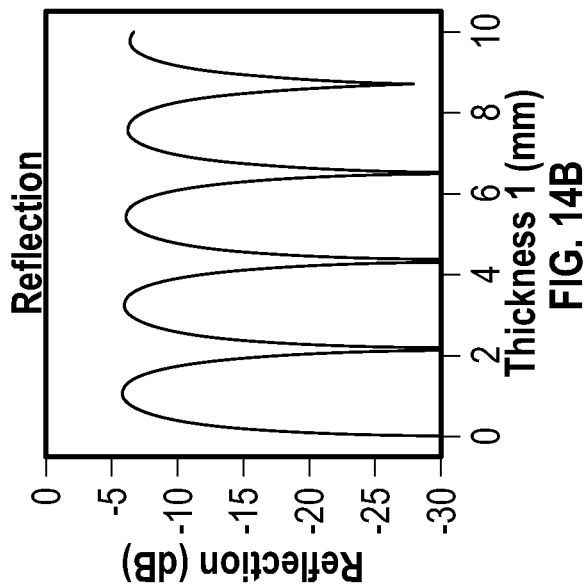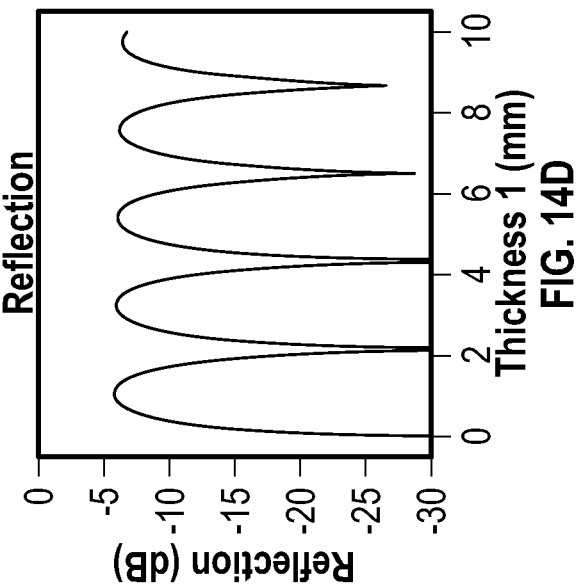
FIG. 14A          FIG. 14B
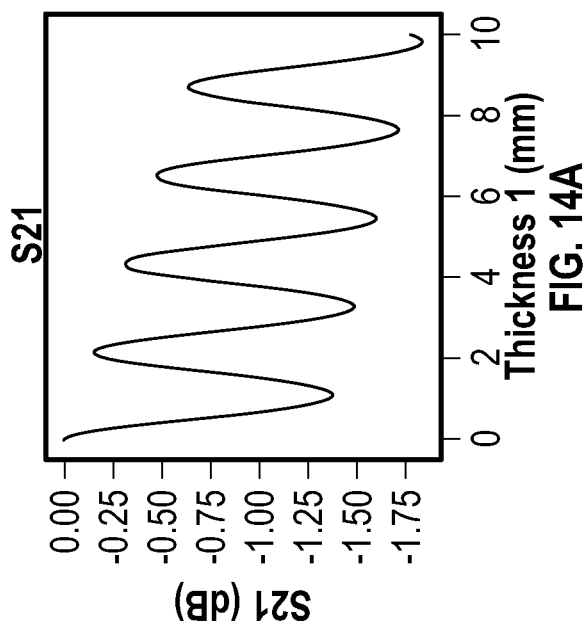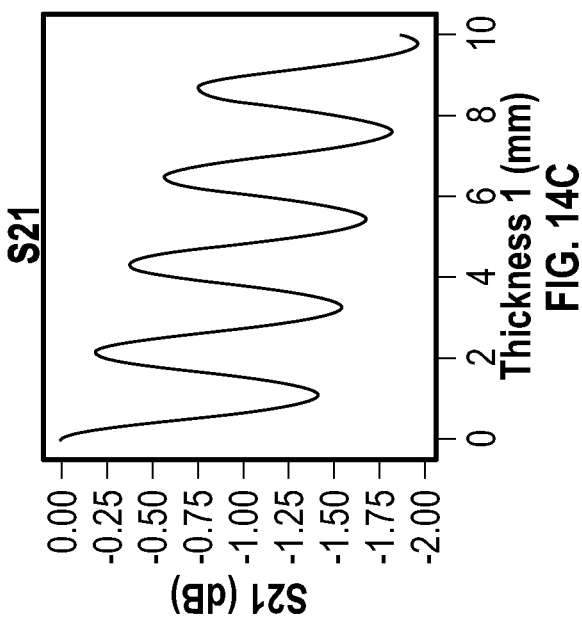
FIG. 14C          FIG. 14D

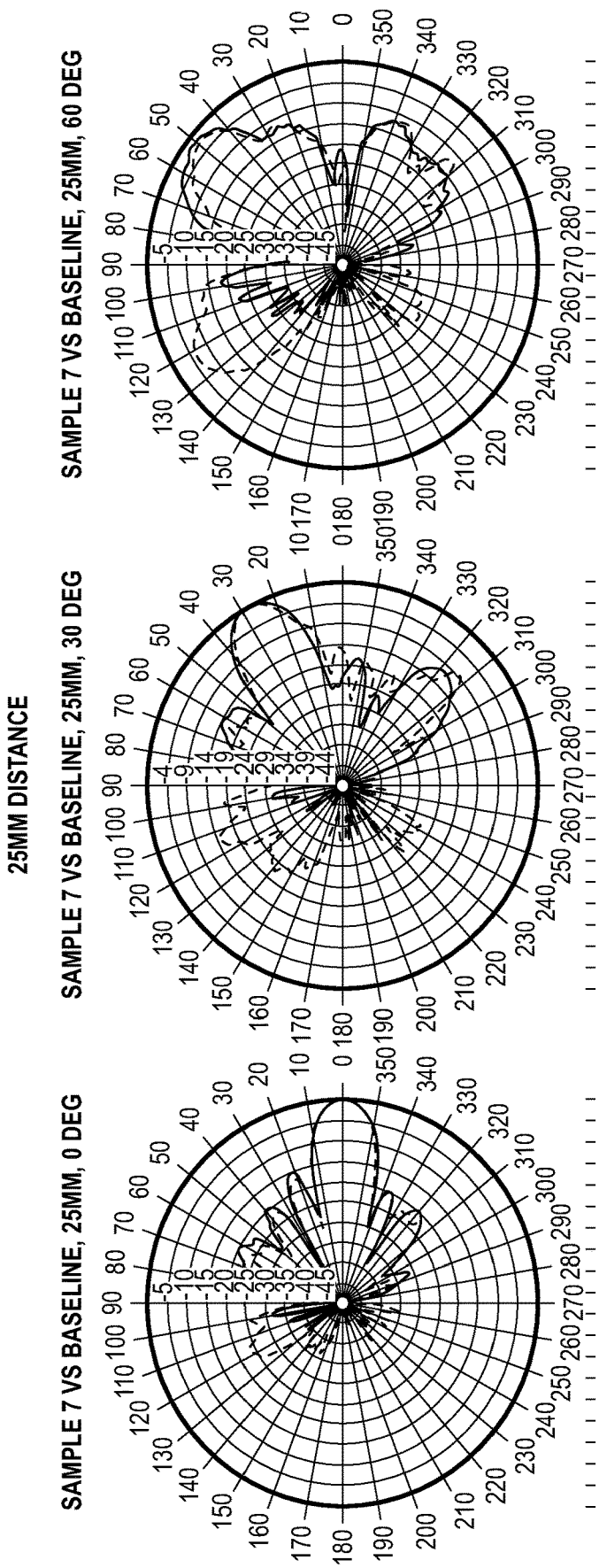

THERMOPLASTIC RESINS FOR NETWORK APPLICATIONS

CROSS-REFERENCE TO RELATED APPLICATIONS

This application is a continuation of International Application No. PCT/IB2021/052093, filed on Mar. 12, 2021, which application claims priority to, and incorporates herein by reference, U.S. Provisional Application No. 62/989,105 filed on Mar. 13, 2020, U.S. Provisional Application No. 63/142,081, filed on Jan. 27, 2021, and U.S. Provisional Application No. 63/154,035, filed on Feb. 26, 2021.

FIELD

The present disclosure relates to thermoplastic resins in millimeter wave network applications suited for 5G (abbreviated for the 5th Generation of mobile device communication) related technology. The disclosed resins can be used to make enclosures or housings for an electronic component that can receive or transmit electromagnetic signals in the high-frequency radio and microwave regimes.

BACKGROUND

World-wide communications technology advancements are heading towards faster, reliable and affordable products and services. Technologies such as 4G LTE and 5G have been evolving to cater to the needs of the global consumer base.

In recent years, the 5G wireless communication technology, in particular, is advancing at a much faster pace. The 5G coverage can be separated into two regimes in the electromagnetic spectrum: i) millimeter waves (mmWave), and ii) low-/mid-band. The mmWave technology uses frequencies in the 6-100 GHz range, for example, above 24-25 GHz, for example, in the range of 28-39 GHz, while the low-/mid-frequency band uses frequencies below 6 GHz.

One of the hurdles in mmWave 5G communication network is that it requires newer and more transmitters to function properly. This is due to its range being severely limited as compared to low and mid-band networks. Also, there is a problem of mmWave 5G network getting through physical obstacles like buildings and structures. This would limit one's transmission range, which is undesirable from a consumer adopting this technology.

Material used in antenna concealment assemblies have generally been customized structures comprising fiberglass, fiberglass reinforced plastic ("FRP"), polyurethane foam, ABS plastic, other composite material, or both. These materials have offered a reasonable degree of structural integrity and strength as well as a reasonable degree of radio frequency (RF) transparency for lower-frequency cellular applications. Such customized structures and material choices, when implemented on a pervasive scale, are, however, less feasible for higher-spectrum broadband and satellite applications due to extreme RF transparency requirements.

Approaches to developing low transmission loss materials have included Hitachi Chemical's low dielectric material, AS-400HS, in which Hitachi reported improved electric properties and workability compared to polytetrafluoroethylene (PTFE) and aromatic liquid crystal polymers (LCP), examples of which can be found at New Low Transmission Loss Material for Millimeter-wave Radar Module "AS-400HS", Hitachi Chemical Technical Report No. 58., Tanigawa et al. Additional approaches to developing low transmission loss materials have included low-density foam enclosures and panels such as those used with the RayCap INVISIWAVE™ product.

There remains a need to provide material with suitably high transmissibility for mm wave applications while at the same time providing structurally useful tensile strength, and toughness and improved durability.

SUMMARY

The disclosure relates to thermoplastic resin comprising a polyamide and at least one of a second polyamide or an additive.

The polyamide can comprise nylon-6, nylon-6,6, mixtures thereof, or copolymers thereof. The polyamide can further include a nylon-6; nylon-6,6; a copolymer thereof that includes at least one repeating unit of poly(hexamethylene terephthalamide), poly(hexamethylene isophthalamide), or a copolymer of poly(hexamethylene terephthalamide) and poly(hexamethylene isophthalamide); a mixture thereof a copolymer thereof or a combination thereof.

The additive can be selected from the group consisting of a reinforcing fiber, an ultraviolet resistance additive, a flame retardancy additive, an anti-static additive, an impact modifier, a colorant, a moisture repellant, and a mixture thereof.

The disclosure also relates to articles formed of the thermoplastic resin of the disclosure, such as, e.g., enclosures or parts of enclosures of telecommunication equipment like RF transmitter/receiver antennas, circuitry, or combinations thereof.

There are many advantages and unexpected properties associated with the disclosed subject matter. For example, according to various aspects, panels including nylon-6,6 are able to provide good mechanical strength, especially when glass fibers are included in the nylon-6,6, while providing adequate transmissibility properties. This is unexpected due to the hygroscopic nature of nylon-6,6. The hygroscopic nature of nylon-6,6 is thought to allow too much moisture uptake, which is thought to destroy transmissibility. However, the inventors have, surprisingly, found that this is not the case.

BRIEF DESCRIPTION OF THE FIGURES

The drawings illustrate generally, by way of example, but not by way of limitation, various aspects of the present invention.

FIG. 9A shows the transmission loss (S21 in dB on the Y-axis) as a function of thickness (mm on the X-axis) for a dry as molded (DAM) (or dry) specimen at a designated frequency, according to various examples of the present disclosure.

FIG. 9B shows reflection (in dB) as a function of thickness (mm on the X-axis) for a dry as molded (DAM) (or dry) specimen at a designated frequency, according to various examples of the present disclosure.

FIG. 9C shows the transmission loss (S21 in dB on the Y-axis) as a function of thickness (mm on the X-axis) for a conditioned (or wet) specimen at a specified frequency, according to various examples of the present disclosure.

FIG. 9D shows the reflection (in dB) as a function of thickness (mm on the X-axis) for a conditioned (or wet) specimen at a specified frequency, according to various examples of the present disclosure.

FIG. 14A shows the transmission loss (S21 in dB on the Y-axis) as a function of thickness (mm on the X-axis) for a dry as molded (DAM) (or dry) specimen at a designated frequency, according to various examples of the present disclosure.

FIG. 14B shows reflection (in dB) as a function of thickness (mm on the X-axis) for a dry as molded (DAM) (or dry) specimen at a designated frequency, according to various examples of the present disclosure.

FIG. 14C shows the transmission loss (S21 in dB on the Y-axis) as a function of thickness (mm on the X-axis) for a conditioned (or wet) specimen at a specified frequency, according to various examples of the present disclosure.

FIG. 14D shows the reflection (in dB) as a function of thickness (mm on the X-axis) for a conditioned (or wet) specimen at a specified frequency, according to various examples of the present disclosure.

FIG. 23D represents array antenna data measured at an azimuth of 0°, according to Example 28 of the present disclosure.

FIG. 23E represents array antenna data measured at an azimuth of 30°, according to Example 28 of the present disclosure.

FIG. 23F represents array antenna data measured at an azimuth of 60°, according to Example 28 of the present disclosure.

DETAILED DESCRIPTION OF THE INVENTION

Definitions

Figure 1:
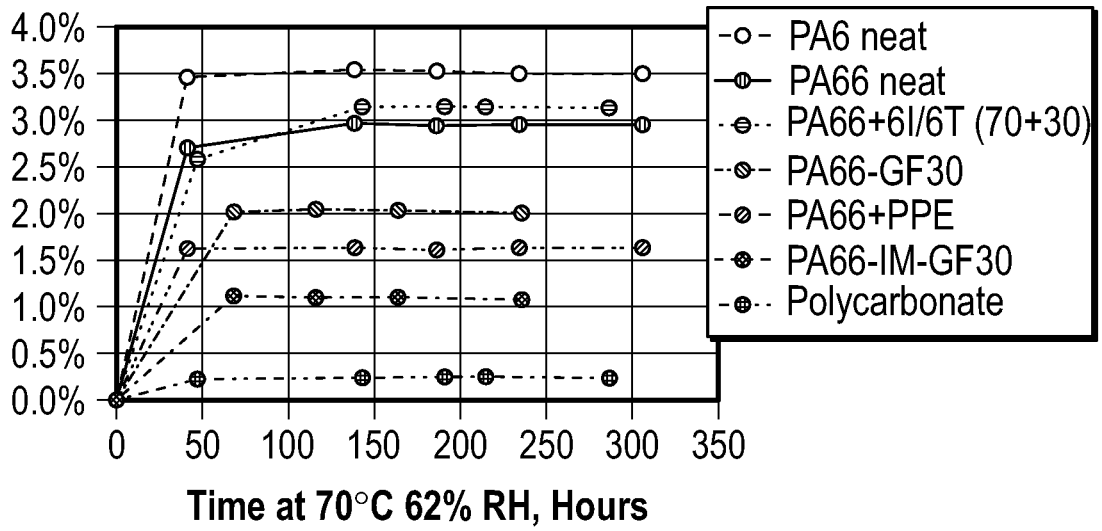
FIG. 1 is a graph showing moisture gain data for 1.5 mm thick test specimen plaques measured according to the ISO 1110 Procedure, according to various examples of the present disclosure.

Reference will now be made in detail to certain aspects of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the disclosure, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The terms "about" or "substantially" as used herein can allow for a degree of variability in a value or range, for example, within 20%, within 15%, within 10%, within 5%, or within 1% of a stated value or of a stated limit of a range, and includes the exact stated value or range.

The term "polyamide" as used herein refers to polymer having repeating units linked by amide bonds. Polyamides may arise from monomers comprising aliphatic, semi-aromatic or aromatic groups. Polyamide includes nylons, e.g., nylon-6,6 or nylon-6, and may refer to polyamides arising from a single monomer, two different monomers, or three or more different monomers. The term polyamide thus includes dimonomeric polyamides. The polyamide may be a nylon having as monomer units a dicarboxylic acid monomer unit and a diamine monomer unit. For example, if the dicarboxylic acid monomer unit is adipic acid and the diamine is hexamethylene diamine, the resulting polyamide can be nylon-6,6. Nylon-6 is a polyamide having a caprolactam monomer. The polyamide may be copolymers which may be prepared from aqueous solutions or blends of aqueous solutions that contain more than two monomers. In various aspects, polyamides can be manufactured by polymerization of dicarboxylic acid monomers and diamine monomers. In some cases, polyamides can be produced via polymerization of aminocarboxylic acids, aminonitriles, or lactams. Suitable polyamides include, but are not limited, to those polymerized from the monomer units described herein. The term "polyamide" includes polyamides such as PA6, PA66, PA11, PA12, PA612, Nylon-66/6T. However, this term can be modified, when done so expressly, to exclude particular polyamides. For example, in some aspects, the polyamide can be a polyamide other than PA11, PA12, and PA612; or the polyamide can be a polyamide other than Nylon-66/6T.

The term "N6," "nylon-6," or "PA6" as used herein, refers to a polymer synthesized by polycondensation of caprolactam. The polymer is also known as polyamide 6, nylon-6, and poly(caprolactam).

The term "N66," "nylon-6,6," or "PA66" as used herein, refers to a polymer synthesized by polycondensation of hexamethylenediamine (HMD) and adipic acid. The polymer is also known as Polyamide 66, nylon-66, nylon-6-6, and nylon-6/6.

The polymers described herein can terminate in any suitable way. In some aspects, the polymers can terminate with an end group that is independently chosen from a suitable polymerization initiator, —H, —OH, a substituted or unsubstituted (C1-C20)hydrocarbyl (e.g., (C1-C10)alkyl or (C6-C20)aryl) interrupted with 0, 1, 2, or 3 groups independently selected from —O—, substituted or unsubstituted —NH—, and —S—, a poly(substituted or unsubstituted (C1-C20)hydrocarbyloxy), and a poly(substituted or unsubstituted (C1-C20)hydrocarbylamino).

In the present disclosure, the terms "DAM" or "dry" refer to the dry-as-molded test specimens.

In the present disclosure, the terms "wet" or "cond" or "conditioned" refer to the conditioned test specimens.

The term "substantially uniform attenuation" means the reduction in signal strength across a sample of uniform thickness when an electromagnetic signal crosses the thickness of the sample in a direction normal to the surface of the sample.

The term "attenuation coefficient," as used herein, refers to a calculated value for the measured wave attenuation (or loss) in decibels (dB) as the wave signal of a certain frequency (in GHz) passes through a medium of ca certain structural thickness (in cm). The unit of measure for the attenuation coefficient is dB/GHz.cm. As an illustration, attenuation coefficient value of 1.0 dB/GHz.cm means 1.0 dB of wave loss per 1 unit of GHz per 1 cm medium thickness.

Compositions

The present disclosure relates to materials exhibiting low transmission losses for electromagnetic signals at frequencies associated with a 5G network.

The low transmission loss material can include at least one polyamide. The polyamide can be PA6; PA4,6; PA6,6; PA6,9; PA6,10; PA6,12; PA10,12; PA12,12; PA6; PA11; PA12; PA66/6T; PA6I/6T; PADT/6T; PA66/6I/6T; or blends thereof, such as PA6/PA66. In some examples, the polyamide can include 6I repeating units (hexamethylene isophthalamide), 6T repeating units (polyhexamethylene terephthalamide) or a combination of 6I/6T repeating units. When a combination of 6I and 6T repeating units is present the 6I and 6T repeating units can be present in any suitable weight ratio, for example, weight ratios from about 96:4 to about 10:90 wt:wt of 6I:6T, about 80:20 to about 20:80 wt:wt, about 70:30 to about 30:70 wt:wt, or about 60:40 to about 40:60 wt:wt or 6I:6T. In some examples the polyamide can be PA66:DI with a molar weight ratio between PA66 and DI in a range of 85:15 to 96:4 (wt:wt).

As used herein, "PA66/DI" refers to a type of co-polyamide of polyhexamethyleneadipamide (nylon-6,6 or N66 or PA66) and "DI" which is a combination of 2-methylpentamethylenediamine (or "MPMD") and isophthalic acid. MPMD is commercially available as INVISTA Dytek® A amine and industrially known as "D" in the abbreviated formulation labeling. Isophthalic acid is commercially available and industrially known as "I" in the abbreviated formulation labeling. The formulation "PA66/DI" used in the examples of the present disclosure had an RV of 45, and a composition of 92:8 PA66:DI (wt/wt), with the "DI" part being about 40:60 D:I (wt/wt). Other non-limiting co-polyamides suitable for use in place of the PA66/DI used in the present examples include 66/D6, 66/DT, 6T/DT, 66/610, or 66/612.

The polyamide can include nylon-6 (e.g., PA6) and nylon-6,6 (e.g., PA6,6). The polyamide can be nylon-6,6 and the composition can optionally be substantially free of all other polyamides (e.g., nylon-6,6 can be the only polyamide used to form the composition).

In some examples, the polyamide can range from about 30 wt % to about 100 wt % of the enclosure, about 50 wt % to about 95 wt %, less than, equal to, or greater than, 30 wt %, 35, 40, 45, 50, 55, 60, 65, 70, 75, 80, 85, 90, 95, or 100 wt %. In some examples, the polyamide can constitute the majority of the enclosure material with minor amounts of a fiber (e.g., glass fibers, carbon fibers, basalt, aramid, polymeric, silica, mineral fibers, or mixtures thereof), additives, or mixtures thereof. In some examples, the enclosure described herein consist of (a polyamide and a fiber. In some examples, the enclosure described herein consist of a polyamide, a fiber, and an additive. In some examples, the enclosure can consist of nylon-6,6, and a fiber. In some examples, the enclosure can consist of nylon-6,6, a glass fiber, and an additive. In some examples, the enclosure can consist of nylon-6,6.

The low transmission loss material can be adapted to have a density in a range of from about 0.7 g/cm$^3$ to about 10 g/cm$^3$, 0.7 g/cm$^3$ to about 5 g/cm$^3$, about 2 g/cm$^3$ to about 5 g/cm$^3$, about 0.75 g/cm$^3$ to 4 g/cm$^3$, 0.8 g/cm$^3$ to about 4 g/cm$^3$, about 0.8 g/cm$^3$ to about 3 g/cm$^3$, 0.85 to about 3 g/cm$^3$, or, equal to, or greater than about 0.7 g/cm$^3$, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or about 10.0 g/cm$^3$.

Suitable polyamides according to this disclosure have sufficient tensile modulus and tensile strength values to allow an apparatus formed from the polyamides to withstand environmental stresses. As an example, suitable polyamides include those having a tensile modulus in a range from 1,000 MPa to 50,000 MPa, for example, 1,000 MPa to 40,000 MPa, for example, 1,000 MPa to 30,000 MPa. As an example, suitable polyamides include those having tensile strength from 30 MPa to 400 MPa, 35 MPa to 300 MPa, 40 MPa to 280 MPa, less than, equal to, or greater than about 30, 50, 100, 150, 200, 250, 300, 350, or 400 MPa.

In some examples, a PA66 with 20 wt % GF can have a tensile strength in a range of from about 100 MPa to about 150 MPa at a temperature of 50° C. and from about 70 MPa to about 100 MPa at a temperature of 23° C. In some examples, a PA66 with 30 wt % glass fiber can have a tensile strength in a range of from about 140 MPa to about 190 MPa at a temperature of 50° C. and from about 100 MPa to about 130 MPa at a temperature of about 23° C. In some examples, a PA66 with 20 wt % glass fiber can have a tensile strength in a range of from about 100 MPa to about 150 MPa at a temperature of 50° C. and from about 70 MPa to about 100 MPa at a temperature of about 23 C. In some examples, a PA66 with polyphenylene ether can have a tensile strength in a range of from about 45 MPa to about 65 MPa at a temperature of 50° C. and from about 40 MPa to about 55 MPa at a temperature of about 23° C. In some examples, a PA66 with polyphenylene ether and 20 wt % glass fiber can have a tensile strength in a range of from about 100 MPa to about 130 MPa at a temperature of 50° C. and from about 80 MPa to about 100 MPa at a temperature of about 23° C.

Additionally, suitable polyamides further include those within the tensile strength or tensile modulus ranges above that exhibit toughness in the un-notched Charpy impact test at 23° C. from 30 KJ/m$^2$ to non-break, for example 40 KJ/m$^2$ to 200 KJ/m$^2$, 40 KJ/m$^2$ to 150 KJ/m$^2$, equal to, or greater than 40, 50, 60, 70, 80, 90, 100, 110, 120, 130, 140, 150, 160, 170, 180, 190, or 200 KJ/m$^2$. In some examples, a PA66 with 20 wt % glass fiber can have an un-notched Charpy impact value in a range of from about 98 KJ/m$^2$ to about 110 KJ/m$^2$ at a temperature of 50° C. and from about 53 KJ/m$^2$ to about 72 KJ/m$^2$ at a temperature of about 23° C. In some examples, a PA66 with 30 wt % glass fiber can have an un-notched Charpy impact value in a range of from about 110 KJ/m$^2$ to about 120 KJ/m$^2$ at a temperature of 50° C. and from about 89 KJ/m$^2$ to about 100 KJ/m$^2$ at a temperature of about 23° C. In some examples, a PA66 with polyphenylene ether can have an un-notched Charpy impact value in a range of from about 240 KJ/m$^2$ to about 340 KJ/m$^2$ at a temperature of 50° C. and from about 310 KJ/m$^2$ to about 370 KJ/m$^2$ at a temperature of about 23° C. In some examples, a PA66 with polyphenylene ether and 20 wt % glass fiber can have an un-notched Charpy impact value in a range of from about 73 KJ/m$^2$ to about 76 KJ/m$^2$ at a temperature of 50° C. and from about 79 KJ/m$^2$ to about 82 KJ/m$^2$ at a temperature of about 23° C. In some examples, a PA66 with 20 wt % glass fiber can have a notched Charpy impact value in a range of from about 10 KJ/m$^2$ to about 22 KJ/m$^2$ at a temperature of 50° C. and from about 7 KJ/m$^2$ to about 8.5 KJ/m$^2$ at a temperature of about 23° C. In some examples, a PA66 with 30 wt % glass fiber can have a notched Charpy impact value in a range of from about 15 KJ/m$^2$ to about 27 KJ/m$^2$ at a temperature of 50° C. and from about 11 KJ/m$^2$ to about 14 KJ/m$^2$ at a temperature of about 23° C. In some examples, a PA66 with polyphenylene ether can have a notched Charpy impact value in a range of from about 24 KJ/m$^2$ to about 35 KJ/m$^2$ at a temperature of 50° C. and from about 20 KJ/m$^2$ to about 23 KJ/m$^2$ at a temperature of about 23° C. In some examples, a PA66 with polyphenylene ether and 20 wt % glass fiber can have a notched Charpy impact value in a range of from about 11 KJ/m$^2$ to about 14 KJ/m$^2$ at a temperature of 50° C. and from about 11 KJ/m$^2$ to about 12 KJ/m$^2$ at a temperature of about 23° C.

The polyamide can be a neat polyamide. The polyamide can be a single polyamide. The polyamide can be a copolymer. The polyamide material can be a blend of polyamides. The polyamide material can comprise a blend of materials or compounds that are not polyamides. Examples of such materials or compounds can include additives and reinforcing fibers. Other examples of such materials or compounds can include polyethers such as polyphenylene ether (PPE) and polyolefins such as polyethylene, polypropylene, polybutylene, acrylonitrile-butadiene-styrene (ABS) resin, polybutylene terephthalate (TBT), propylene carbonate (PC), and blends thereof.

The reinforcement of polyamides can be carried out by incorporating, for example, glass fibers, carbon fibers, basalt, aramid, polymeric, silica, or mineral fibers in the polyamide melt, for example from an extruder. When present, the reinforcing fibers can be in a range of from about 5 wt % to about 50 wt % of the panel 100, about 10 wt % to about 30 wt %, less than, equal to, or greater than about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %.

In addition to, or instead of including the reinforcing fibers, the polyamide material can further include at least one additive or package of additives. Where present, the at least one additive or package of additives can be in a range of from about 0.1 wt % to about 60 wt %, for example from about 0.5 wt % to about 55 wt %, for example from about 0.75 wt % to about 50 wt %, based on the total polyamide material. Examples of additives or packages of additives can include ultraviolet radiation resistance additives, flame retardancy additives, anti-static additives, impact modifiers, color additives (e.g., pigments), heat stabilizer additives, and moisture repellency additives. In some examples, an article including the polyamide can include a flame retardancy coating disposed on an external surface of the article.

Examples of suitable impact modifying additives can include a maleated polyolefin. Examples of suitable maleated polyolefins include maleated polyolefins available under the trade designation AMPLIFY™ GR, which are commercially available from Dow Chemical Co., Midland Mich., USA (examples include Amplify™ GR 202, Amplify™ GR 208, Amplify™ GR 216, and Amplify™ GR380), maleated polyolefins available under the trade designation EXXELOR™ available from ExxonMobil, Irving Tex., USA (examples include Exxelor™ VA 1803, Exxelor™ VA 1840, Exxelor™ VA1202, Exxelor™ PO 1020, and Exxelor™ PO 1015), maleated polyolefins available under the trade designation ENGAGE™ 8100 available from Dow Elastomer Midland Mich., USA, and maleated polyolefins available under the trade designation BONDYRAM® 7103 available from Ram-On Industries LP.

Examples of suitable flame retardants include, for example, organophosphorus compounds such as organic phosphates (including trialkyl phosphates such as triethyl phosphate, tris(2-chloropropyl)phosphate, and triaryl phosphates such as triphenyl phosphate and diphenyl cresyl phosphate, resorcinol bis-diphenylphosphate, resorcinol diphosphate, and aryl phosphate), phosphites (including trialkyl phosphites, triaryl phosphites, and mixed alkyl-aryl phosphites), phosphonates (including diethyl ethyl phosphonate, dimethyl methyl phosphonate), polyphosphates (including melamine polyphosphate, ammonium polyphosphates), polyphosphites, polyphosphonates, phosphinates (including aluminum tris(diethyl phosphinate); halogenated fire retardants such as chlorendic acid derivatives and chlorinated paraffins; organobromines, such as decabromodiphenyl ether (decaBDE), decabromodiphenyl ethane, polymeric brominated compounds such as brominated polystyrenes, brominated carbonate oligomers (BCOs), brominated epoxy oligomers (BEOs), tetrabromophthalic anyhydride, tetrabromobisphenol A (TBBPA) and hexabromocyclododecane (HBCD); metal hydroxides such as magnesium hydroxide, aluminum hydroxide, cobalt hydroxide, and hydrates of the foregoing metal hydroxide; and combinations thereof. The flame retardant can be a reactive type flame-retardant (including polyols which contain phosphorus groups, 10-(2,5-dihydroxyphenyl)-10H-9-oxa-10-phospha-phenanthrene-10-oxide, phosphorus-containing lactone-modified polyesters, ethylene glycol bis(diphenyl phosphate), neopentylglycol bis(diphenyl phosphate), amine- and hydroxyl-functionalized siloxane oligomers). These flame retardants can be used alone or in conjunction with other flame retardants.

Examples of suitable ultraviolet additives include ultraviolet absorbers, quenchers, hindered amine light stabilizers (HALS), or mixtures thereof. Ultraviolet absorbers are a type of light stabilizer that functions by competing with the chromophores to absorb ultraviolet radiation. Absorbers change harmful ultraviolet radiation into harmless infrared radiation or heat that is dissipated through the polymer matrix. Carbon black is an effective light absorber. Another ultraviolet absorber is rutile titanium oxide which is effective in the 300-400 nm range. Hydroxybenzophenone and hydroxyphenylbenzotriazole are also suitable ultraviolet stabilizers that have the advantage of being suitable for neutral or transparent applications. Hydroxyphenylbenzotriazole is not very useful in thin parts below 100 microns. Other ultraviolet absorbers include oxanilides for polyamides, benzophenones for polyvinyl chloride and benzotriazoles and hydroxyphenyltriazines for polycarbonate. Ultraviolet absorbers have the benefit of low cost, but may be useful only for short-term exposure. Quenchers return excited states of the chromophores to ground states by an energy transfer process. The energy transfer agent functions by quenching the excited state of a carbonyl group formed during the photo-oxidation of a polymeric material and through the decomposition of hydroperoxides. This prevents bond cleavage and ultimately the formation of free radicals. Hindered Amine Light Stabilizers are long-term thermal stabilizers that act by trapping free radicals formed during the photo-oxidation of a polymeric material and thus limiting the photodegradation process. The ability of Hindered Amine Light Stabilizers to scavenge radicals created by ultraviolet absorption is explained by the formation of nitroxy radicals through a process known as the Denisov Cycle. Although there are wide structural differences in the Hindered Amine Light Stabilizers, most share the 2,2,6,6-tetramethylpiperidine ring structure. Hindered Amine Light Stabilizers are proficient UV stabilizers for a wide range of polymeric materials. While Hindered Amine Light Stabilizers are also very effective in polyolefins, polyethylene, and polyurethane, they are not useful in polyvinyl chloride. Non-limiting examples of optional additives include adhesion promoters, biocides, anti-fogging agents, anti-static agents, anti-oxidants, bonding, blowing and foaming agents, catalysts, dispersants, extenders, smoke suppressants, impact modifiers, initiators, lubricants, nucleants, pigments, colorants and dyes, optical brighteners, plasticizers, processing aids, release agents, silanes, titanates and zirconates, slip agents, anti-blocking agents, stabilizers, stearates, ultraviolet light absorbers, waxes, catalyst deactivators, and combinations thereof Non-limiting examples of optional additives include adhesion promoters, biocides, anti-fogging agents, anti-static agents, anti-oxidants, bonding, blowing and foaming agents, catalysts, dispersants, extenders, smoke suppressants, impact modifiers, initiators, lubricants, nucleants, pigments, colorants and dyes, optical brighteners, plasticizers, processing aids, release agents, silanes, titanates and zirconates, slip agents, anti-blocking agents, stabilizers, stearates, ultraviolet light absorbers, waxes, catalyst deactivators, and combinations thereof.

Articles Made of a Thermoplastic Resin of the Disclosure

The thermoplastic resin presented in this disclosure have industrial utility in the wireless network infrastructure. Hence, the disclosure further relates to articles formed of the thermoplastic resins disclosed herein. Such compositions can be used in many areas including communication devices, electronics, and electric power systems. Exemplary articles formed of the thermoplastic resin include, without limitation, power cable terminations, miniatured antenna, antenna concealment, cell phone casings, housing for electronic component, power transformer/power conditioner, optical fiber, fiber termination box, radios, diplexer/multiplexer, coaxial cable, and their combinations. The article can take the form of an enclosure for electronic equipment or a portion of an enclosure for electronic equipment. When the article is a portion of an enclosure, the article can be a panel.

Figure 19:
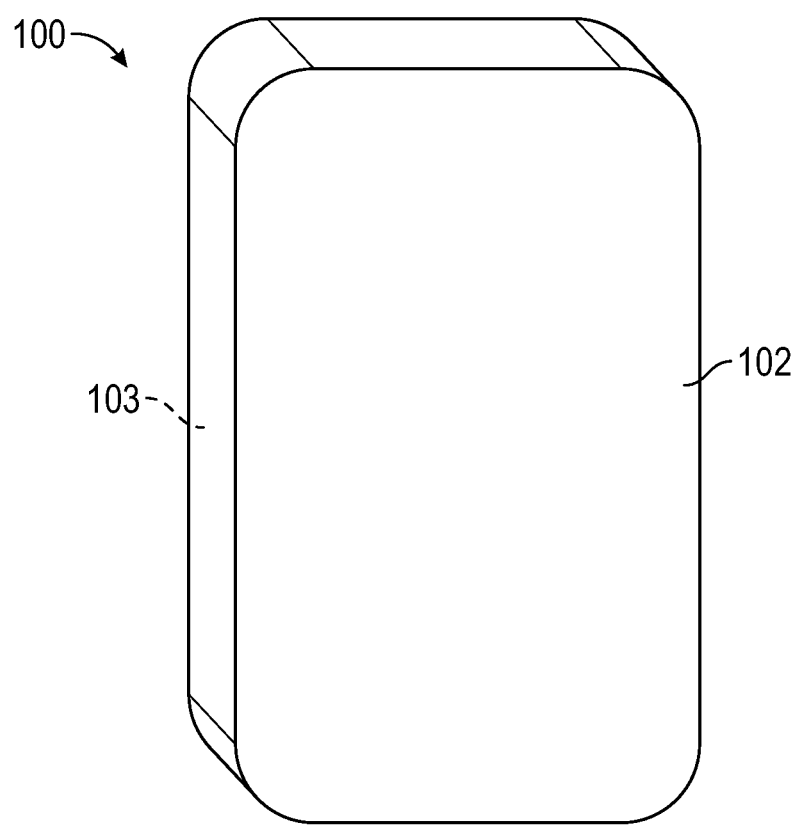
FIG. 19 is a perspective view of a low transmission loss panel, according to various examples of the present disclosure.

FIG. 19 shows an example of panel 100, according to the present disclosure. According to various aspects, an enclosure can be formed from a plurality of joined panels 100. Alternatively, an enclosure can be formed by contouring panel 100, as described further below. The formed panel 100 can be characterized by its dielectric constant. For example, a dielectric constant of the panel 100 including the polyamide can be in a range of from about 2.50 to about 4.00 in the 3-40 GHz frequency range, about 2.75 to about 3, less than, equal to, or greater than about 2.50, 2.60, 2.70, 2.80, 2.90, 3.00, 3.10, 3.20, 3.30, 3.40, 3.50, 3.60, 3.70, 3.80, 3.90, or about 4.0. These values can be measured, e.g., using Active Standard Test Method (ASTM) D2520. The formed panel 100 can be further characterized by its dissipation factor (DF), which can be in a range of about 0.004 to about 0.025, about 0.010 to about 0.020, less than, equal to, or greater than about 0.004, 0.006, 0.007, 0.008, 0.009, 0.010, 0.011, 0.012, 0.013, 0.014, 0.015, 0.016, 0.017, 0.018, 0.019, 0.020, 0.021, 0.022, 0.023, or 0.024 in the 3-40 GHz frequency range. These values can be measured, e.g., using ASTM D2520. An attenuation of panel 100 can be from 1 dB to 0 dB for a signal of frequency 500 MHz to 6 GHz and a panel thickness from 0.5 mm to 6 mm, for a signal of frequency 24 GHz to 30 GHz and a panel thickness from 0.5 mm to 4.5 mm, for a signal of frequency 36 GHz to 40 GHz and a panel of thickness from 0.5 mm to 4 mm, or for a signal of frequency 76 GHz to 81 GHz and a panel thickness from 0.5 mm to 3.5 mm.

When the frequency is 500 MHz to 6 GHz, signal impingement angle with the surface is 90±5°, the composition is selected from any of the thermoplastic resins of Table 1 and the desired attenuation is from 1 dB to 0 dB, then suitable thicknesses can be between 0.5 mm and 6 mm.

When the frequency is 24 GHz to 30 GHz, signal impingement angle with the surface is 90±5°, the composition is selected from any of the thermoplastic resins of Table 1 and the desired attenuation is from 1 dB to 0 dB, then suitable thicknesses can be between 0.5 mm and 4.5 mm.

When the frequency is 36 GHz to 40 GHz, signal impingement angle with the surface is 90±5°, the composition is selected from any of the thermoplastic resins of Table 1 and the desired attenuation is from 1dB to 0 dB, then suitable thicknesses can be between 0.5 mm and 4 mm.

When the frequency is 76 GHz to 81 GHz, signal impingement angle with the surface is 90±5°, the composition is selected from any of the thermoplastic resins of Table 1 and the desired attenuation is from 1 dB to 0 dB, then suitable thicknesses can be between 0.5 mm and 3.5 mm.

The panel 100 made substantially (e.g., up to impurities or negligible structural features made from other materials) from a low transmission loss material, can take on many different forms. For example, the panel 100 can be configured to be a panel 100 for covering a transmissive element such as an antenna. In some examples, the panel 100 can be a component of a molded article. The molded article, for example, can be an enclosure designed to cover the antenna or other transmissive element. Where present as part of an enclosure, the panel 100 may be the only portion of the molded article that includes a low transmission loss material. Forming the panel 100 as part of an enclosure may be useful for providing weather-resistant shielding for electronic equipment. Alternatively, in some aspects, an entire enclosure can be formed of the same material as panel 100. As used herein the term "weather resistant" refers to an enclosure's ability to withstand reasonable exposure to the elements (e.g., sun, rain, wind, or combinations thereof) while substantially maintaining its structural integrity.

The panel can have any suitable dimensions. The panel can have a thickness in a range of from about 0.5 mm to about 6 mm, 1 mm to about 2 mm, less than, equal to, or greater than about 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.1, 4.2, 4.3, 4.5, 4.6, 4.7, 4.8, 4.9, 5.1, 5.2, 5.3, 5.4, 5.5, 5.6, 5.7, 5.8, 5.9 or 6 mm. FIG. 19 is a perspective view of an example of a panel 100. The thickness of the panel 100 is defined between opposed major surfaces 102 and 103. The surfaces 102 and 103 of the panel 100 can be, e.g., circular (or substantially circular, allowing for some deviation from a perfect circle) or otherwise rounded, or polygonal in shape. Examples of suitable polygonal shapes include a triangular shape (e.g., equilateral triangle, right triangle, obtuse triangle, an isosceles triangle, or acute triangle), a quadrilateral shape (e.g., a square or rectangle), a pentagonal shape, a hexagonal shape, a heptagonal shape, an octagonal shape, or any higher-order polygonal shape.

The opposed major surfaces 102 and 103 of the panel 100 can have a flat profile or a curved profile. The curved profile can include a single curve or a series of undulations. The curved profile can give the panel 100 a generally convex or concave shape. Respective adjacent undulations can be evenly spaced with respect to each other or unevenly spaced with respect to each other. Additionally, either of the opposed major surfaces 102 and 103 can include one or more projections such as a rib. Where present, a rib can be helpful to increase the strength of the panel 100. Each surface can be substantially smooth or textured. The opposed major surfaces can have the same profile or each major surface can have a different profile.

The panel 100 can be formed by any of a number of suitable processes including injection molding, thermoforming, and compression molding. The disclosed panel 100 can optionally be formed in a single molding operation or in a multi-shot process in which surrounding material is the same or different from that of the disclosed panel 100. In general, a multi-shot process is performed on one machine that is programmed to perform two injections in one cycle. In the first cycle, a nozzle injects plastic into a mold. The mold is then automatically rotated, and a different type of plastic is injected into the mold from a second nozzle. Double injection molding optimizes co-polymerization of hard and soft materials to create a powerful molecular bond. The result is a single part with production and feature advantages. It can be used for a variety of product designs across all industries. It also allows for molding using clear plastics, colored graphics and stylish finishes, which improves product functionality and marketplace value.

In applications where a panel 100 cannot be formed through injection molding, the panel 100 may be formed through extrusion. In some examples of extrusion, a die placed at the end of the extruder can have a shape that is the negative impression of the intended shape of the panel 100. In still some further examples, any part of the panel 100 can be formed through an additive manufacturing process.

Electronic equipment may be housed inside an enclosure prepared from the materials disclosed herein. Such enclosure(s) may be either stationary installations, such as poles, buildings, roof-tops, etc., or moving installations, such as vehicles, aircrafts, bicycles, boats, wearables, etc. The enclosures may be designed according to the application specification in terms of the volume, weight, ease of access for maintenance/repairs, aesthetics (color, finish, appearance, etc.), or other criteria. Electronic equipment can be, for example, AC or DC powered 5G mmWave and 4G radios; AC/DC rectifiers or remote powering units, fiber connectivity enclosures, radio-frequency combiners or diplexers, alarm systems and intrusion systems, AC and DC power distribution panels, 5G antennas, or 5G receivers.

Reinforcing fibers can be helpful to increase the tensile strength and toughness of the article. The amount of reinforcing fiber added can be enough to impart the desired tensile strength and toughness to the article while not compromising the low transmission loss characteristics of the material.

The ability of the materials to achieve density values greater than 1 g/cm$^3$ can help to increase the tensile strength and toughness of the resulting article. This is in direct contrast, for example, to articles that include a foam material.

The decision on the specific polyamide or blend of polyamides that are used in the article can be a function of the respective polyamide's tensile strength, toughness, or both.

The polyamide or polyamides that can be used in an injection molding, extrusion, or additive manufacturing process can be provided as individual pellets. The individual pellets can include the polyamide or mixture of polyamides along with any of the additives described herein. The pellets can further include any of the reinforcing fibers described herein. In some examples, a diameter or length of an individual pellet can independently be in a range of from about 1 mm to about 5 mm, about 2 mm to about 4 mm.

Alternatively, in some examples, the pellets can include only the polyamide or mixture of polyamides. These pellets can then be heated so that they soften and any additives, reinforcing fibers, or both can be added to the softened pellets and mixed. Following mixing, the mixture of the polyamides, additives, reinforcing fibers, or a sub-combination thereof can be subjected to an injection molding process, extrusion process, or additive manufacturing process.

EXAMPLES

Various aspects of the present invention can be better understood by reference to the following Examples, which are offered by way of illustration. The present invention is not limited to the Examples given herein.

Certain combinations of composition, surface profile and structural thickness can surprisingly yield molded articles exhibiting useful dielectric constants and high transparency to millimeter waves.

General Procedure for Producing Compounded Material

A twin-screw extruder having a minimum 18-mm diameter co-rotating screw with a 40-56 L/D (e.g., L/D ratio of 40-56) was used for compounding. The unit has one main feeder and a minimum of three side feeders. A feed rate of at least 1 kg/hr was used. The twin-screw co-rotating/turning at the speed of at least 1000 RPM was sufficient to provide the high shear for compounding function. The total compounder throughput was at least 15 kg/hr.

The compounding unit had at least three vent ports, one atmospheric and two vacuum ports. The rotating twin screws imparted the forward momentum to the heated mass inside the barrel, and the barrel was heated along its length in zones at temperatures in a range of 250-310° C.

The processing section of the twin-screw compounder was set up to suit various process needs and to allow for a wide variety of processes, including compounding processes. Polymer, fillers, and additives, as desired, were continuously fed into the first barrel section of the twin screw using a metering feeder. The products were conveyed along the screw and were melted and mixed by kneading elements in the plastification section of the barrel. The polymer then traveled along to a side port where, if desired, fillers or additives were mixed in, and was supplied to degassing zones and from there to a pressure build zone where it then exited the die via an at least 3-mm hole as a lace. The cast lace was fed into a water bath to cool and to enable it to be cut into chips via a pelletizer. The unit was designed to be able to withstand at least 70 bar die pressure. The die with a minimum of four holes, each at least 3 mm diameter for pelletizing, can be included.

A compounded pellet of polyamide having a diameter of 3 mm and a length of 3-5 mm was produced using the above equipment. The moisture content of the pelletized polyamide material was less than about 0.2 wt %.

General Procedure for Producing Molded Panels

An injection molding machine (Demag Sumitomo Sytec 100/200) used included a feed throat, and a single rotating screw in a temperature zoned barrel, where zones can range from 40 to 320° C. to melt a nylon-6,6 based resin, and where the screw moved within the barrel to inject a volume of molten resin into a mold, where the mold was at 60-90° C. for a nylon-6,6 based resin. The mold yields solid parts or specimens, which includes those suitable for testing, such as flammability bars of desired dimensions.

In these examples, flammability ratings were established by performing a test functionally equivalent to the UL 94 Standard.

Materials Used in Examples

Feedstock PA6 neat polyamide, as used herein, is commercially available from BASF as Ultramid® polyamide, DSM Engineering Materials as Akulon® polyamide or similar.

Feedstock PA66 neat polyamide, as used herein, is a commercially available INVISTA nylon-66 (or N66) grade under the Tradename INVISTA™ U4800 polyamide resin, available from INVISTA, Wichita KS. The PA66 has standard RV range of 42-50. The feedstock PA66 has high RV ranging from 80 to 240.

As used herein, "6I/6T" is commercially available from EMS-Chemie (North America) Inc. of Sumter, S.C., USA, as EMS Grivory G21.

As used herein, the term "PA66-6I/6T" or "PA66+6I/6T" refers to a blended material of PA66 and 6I/6T. For example, "PA66+6I/6T (70+30)" is a 70:30 (wt:wt) nylon:6I/6T blended material of PA66 and 6I/T.

As used herein, "PA66-GF30" is a glass fiber reinforced nylon-66. "GF30" indicates 30 wt % glass fiber content.

As used herein, "PA66-GF20" is a glass fiber reinforced nylon-66. "GF20" indicates 20 wt % glass fiber content.

As used herein, "PA66-PPE" is a commercially available thermoplastic polymer blend of PA66 and polyphenylene ether (abbreviated as PPE). Such material is available from Asahi Kasei, SABIC, Mitsubishi and LG Chem, for example, LG Chemical LUMILOY® TX5002 High Flow PPE/PA Alloy, Mitsubishi Lemalloy® C61HL PPE-PA66 Alloy, or similar. The suitable PA66-PPE blends may have mass ratio range from 90:10 to 10:90, for example, 80:20, 70:30, 60:40, 50:50, 40:60, 30:70, 20:80, and such.

As used herein, "PA66-PPE-GF20" is a glass fiber reinforced nylon-66-PPE. "GF20" indicates 20 wt % glass fiber content.

As used herein, "PPE" is commercially available material, such as that available from Asahi Kasei, SABIC, Mitsubishi and LG Chem.

As used herein, "PA66-IM-GF30" is a nylon-66 containing impact modified polyolefin with 30 wt % GF.

Neat polycarbonate (PC) is a commercially available material, such as that available from Lotte Chemical.

As used herein, "PA66/DI" is known as a copolymer of hexamethylene adipamide and 2-methyl-1,5-pentamethylene-isophthalamide. PA66/DI used in the examples has a relative viscosity (RV) of 45 and contains about 92:8 (wt:wt) PA66:DI. The "DI" part in PA66/DI is about 50:50 (molar) or about 40:60 (wt:wt) D:I.

Material Specimens Tested:

Seven resin specimens were tested in these Examples. The seven resins are listed below in Table 1. The starting resin pellet moisture was measured by AquaTrac instrument prior to molding plaques.

TABLE 1

Resins

| Specimen Label | Material ID | Material Type | Material Condition | Pellet Moisture (wt %) measured before molding plaques |
|---|---|---|---|---|
| A | PA66 Neat | Polyamide, unreinforced | DAM | 0.12% |
| B | | | c50% RH | |
| C | PA66-GF30 | Polyamide with 30% glass fiber | DAM | 0.05% |
| D | | | c50% RH | |
| E | PA6 Neat | Polyamide, unreinforced | DAM | 0.12% |
| F | | | c50% RH | |
| G | PA66-PPE | Polyamide + PPE blend, unreinforced | DAM | 0.02% |
| H | | | c50% RH | |
| I | PA66-6I/6T | Polyamide blend, unreinforced | DAM | 0.05% |
| J | | | c50% RH | |
| K | PA66-IM-GF30 | Polyamide with 30% glass fiber | DAM | 0.05% |
| L | | | c50% RH | |
| M | PC | Polycarbonate, unreinforced | DAM | 0.02% |
| N | | | c50% RH | |

Test Methods Used in the Examples

ISO 1110 Accelerated conditioning of polyamide specimens.

ASTM D2520 Standard Test Methods for Complex Permittivity (Dielectric Constant) of Solid Electrical Insulating Materials at Microwave Frequencies and Temperatures to 1650 Degrees C." (Method B, Resonant Cavity Perturbation Technique).

ASTM D789 Relative viscosity (RV) measurement method.

UL 94 Std. Flammability (V-0/V-1/V-2) rating determination method.

Moisture Gain Determination

Each resin specimen was molded as 100×134×3 mm plaques and as 100×155×1.5 mm plaques. Plaques were stored in foil bags in dry-as-molded state, so moisture in DAM plaques is expected to be the same as in pellets fed to the molding machine.

Starting from a dry as molded (DAM) state, the plaques were conditioned using an ISO 1110 procedure.

The ISO 1110 standard provides a method for accelerated conditioning of polyamide specimens, where specimens are held in a humidity chamber having an atmosphere of 70° C. with 62% relative humidity (RH). Specimens are allowed to gain moisture until they reach equilibrium weight, which is determined by measuring the mass of specimens every day, the endpoint of conditioning being indicated by specimens reaching a constant mass. This procedure represents very similar moisture gain to that which would be gained if specimens were held in 23° C. 50% RH atmosphere until reaching equilibrium moisture, which can take over 9 months depending on specimen thickness.

For each of the 7 test specimens, both 1.5 mm and 3 mm thickness plaques were conditioned in the humidity chambers according to the ISO 1110 procedure. For each test specimen and plaque thickness, three replicates were weighed to track moisture gain. In all cases, the three replicates gave excellent agreement in weight gain.

Figure 2:
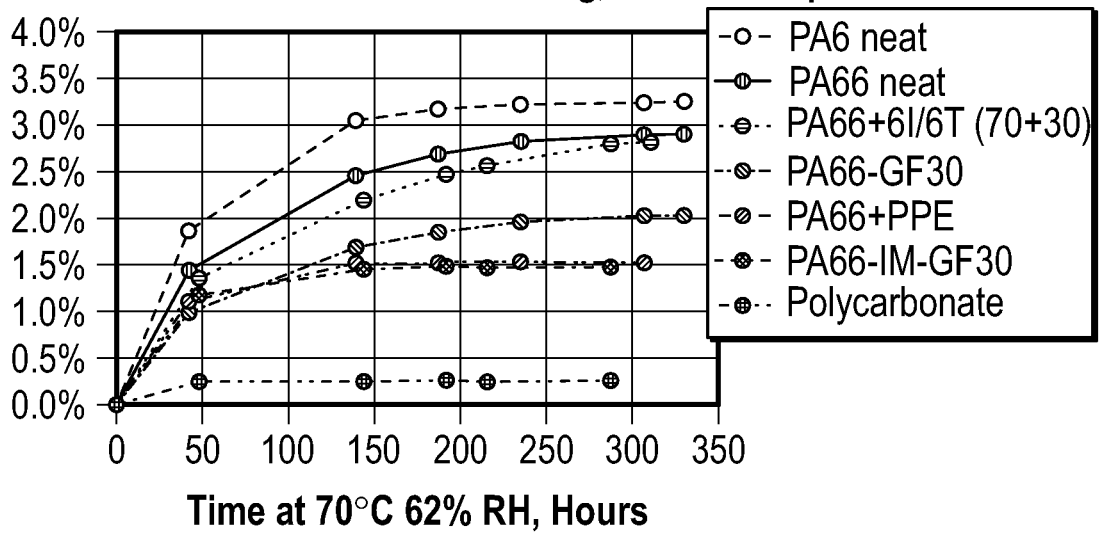
FIG. 2 is a graph showing moisture gain data for 3.0 mm thick test specimen plaques measured according to the ISO 1110 Procedure, according to various examples of the present disclosure.

FIG. 1 (for 1.5 mm thick plaques) and FIG. 2 (for 3.0 mm thick plaques) show average weight gain (in wt % compared to initial DAM weight) for each tested specimen. Table 2 below lists the final equilibrium moisture levels for the seven tested specimens.

TABLE 2

Equilibrium Moisture Levels for Tested Specimens

| Resin | Final wt gain for 1.5 mm plaques | Final wt gain for 3.0 mm plaques |
|---|---|---|
| PA66 neat | 2.96% | 2.92% |
| PA6 neat | 3.50% | 3.26% |
| PA66 + 6I/6T (70 + 30) | 3.14% | 2.82% |
| PA66-GF30 | 2.01% | 2.04% |
| PA66 + PPE neat | 1.64% | 1.54% |
| PA66-IM-GF30 | 1.08% | 1.48% |
| Polycarbonate neat | 0.23% | 0.26% |

Dielectric Constant and Dissipation Factor Measurements:

Approximately ⅛" thick plaques of each material were used for dielectric constant and dissipation factor measurements using the guidelines of ASTM D2520, Method B. All plaques were approximately 3.9"×5.3"×0.12".

Two replicates of each material (see Table 1) were prepared for testing at each required test frequency as noted below. Test frequencies included 3 GHz, 5 GHz, 10 GHz, 20 GHz, 30 GHz and 40 GHz.

Table 3 lists test samples sizes for each test frequency. All test samples were prepared so that test sample length corresponded to the plaque flow direction. Two plaques of each material (A-N in Table 1) were used to prepare the test samples. One replicate for each frequency was fabricated from each plaque.

TABLE 3

Test Sample Sizes

| Test Frequency | Approximate Piece Size (Inches) |
|---|---|
| 3 GHz | 0.070 × 0.200 × 1.5 |
| 5 GHz | 0.090 × 0.140 × 1.5 |
| 10 GHz | 0.075 × 0.075 × 1.5 |
| 20 GHz | 0.050 × 0.050 × 1.5 |
| 30 GHz | 0.030 × 0.030 × 1.5 |
| 40 GHz | 0.025 × 0.025 × 1.5 |

All testing was conducted at laboratory ambient conditions. Test conditions were run at 24° C. and 46% RH. All samples were handled to limit exposure to laboratory ambient conditions during both sample preparation and testing.

Dielectric Constant Measurements:

Testing was performed using the guidelines set forth in ASTM D2520, "Standard Test Methods for Complex Permittivity (Dielectric Constant) of Solid Electrical Insulating Materials at Microwave Frequencies and Temperatures to 1650 Degrees C" Method B, Resonant Cavity Perturbation Technique, was used. The electric field inside the cavities was parallel to the length of the test samples. The measured dielectric constant data for all tested specimens at the six frequencies is listed in Table 4 below. Dielectric constant precision was about ±1% for the 3 GHz-20 GHz frequency range and about ±2% for the 30 GHz-40 GHz range. Results are shown in Table 4.

TABLE 4

Dielectric Constant Measurements

| Material ID | Sample ID | Frequency - | | | | | |
|---|---|---|---|---|---|---|---|
| | | 3 GHz | 5 GHz | 10 GHz | 20 GHz | 30 GHz | 40 GHz |
| PA66 | A1 | 3.04 | 3.01 | 3.06 | 3.04 | 3.09 | 2.91 |
| | A2 | 3.02 | 3.02 | 3.07 | 3.05 | 3.09 | 2.91 |
| | B1 | 3.16 | 3.15 | 3.19 | 3.16 | 3.17 | 3.07 |
| | B2 | 3.17 | 3.15 | 3.20 | 3.16 | 3.16 | 3.09 |
| PA66-GF | C1 | 3.58 | 3.59 | 3.64 | 3.61 | 3.72 | 3.70 |
| | C2 | 3.57 | 3.59 | 3.65 | 3.60 | 3.75 | 3.64 |
| | D1 | 3.69 | 3.70 | 3.76 | 3.72 | 3.81 | 3.63 |
| | D2 | 3.67 | 3.70 | 3.76 | 3.71 | 3.79 | 3.69 |
| PA6 | E1 | 3.04 | 3.03 | 3.07 | 3.07 | 3.10 | 3.07 |
| | E2 | 3.03 | 3.02 | 3.08 | 3.06 | 3.13 | 3.05 |
| | F1 | 3.19 | 3.18 | 3.21 | 3.17 | 3.21 | 3.09 |
| | F2 | 3.20 | 3.17 | 3.23 | 3.18 | 3.21 | 3.09 |
| PA66-PPE | G1 | 2.76 | 2.77 | 2.81 | 2.81 | 2.87 | 2.83 |
| | G2 | 2.77 | 2.77 | 2.82 | 2.80 | 2.88 | 2.79 |
| | H1 | 2.84 | 2.83 | 2.86 | 2.85 | 2.88 | 2.82 |
| | H2 | 2.84 | 2.84 | 2.87 | 2.85 | 2.89 | 2.82 |
| PA Blend | I1 | 3.09 | 3.09 | 3.14 | 3.11 | 3.20 | 3.10 |
| | I2 | 3.08 | 3.10 | 3.15 | 3.11 | 3.20 | 3.11 |
| | J1 | 3.21 | 3.19 | 3.24 | 3.22 | 3.26 | 3.15 |
| | J2 | 3.19 | 3.19 | 3.25 | 3.22 | 3.26 | 3.12 |
| PA-IM-GF | K1 | 3.36 | 3.37 | 3.42 | 3.37 | 3.46 | 3.35 |
| | K2 | 3.36 | 3.37 | 3.43 | 3.37 | 3.44 | 3.42 |
| | L1 | 3.44 | 3.44 | 3.49 | 3.43 | 3.49 | 3.37 |
| | L2 | 3.43 | 3.45 | 3.51 | 3.43 | 3.51 | 3.38 |
| PC | M1 | 2.77 | 2.78 | 2.81 | 2.81 | 2.88 | 2.78 |
| | M2 | 2.78 | 2.78 | 2.81 | 2.80 | 2.86 | 2.78 |
| | N1 | 2.78 | 2.78 | 2.82 | 2.81 | 2.87 | 2.81 |
| | N2 | 2.79 | 2.79 | 2.83 | 2.81 | 2.86 | 2.80 |

Dissipation Factor Measurements:

Testing was performed using the guidelines set forth in ASTM D2520, "Standard Test Methods for Complex Permittivity (Dielectric Constant) of Solid Electrical Insulating Materials at Microwave Frequencies and Temperatures to 1650 Degrees C." Method B, Resonant Cavity Perturbation Technique, was used. The electric field inside the cavities was parallel to the length of the test samples. Dissipation factor resolution was about ±5% for 3 the GHz-20 GHz frequency range and ±10% for the 30 GHz-40 GHz range. Results are shown in Table 5.

TABLE 5

Dissipation Factor Measurements

| Material ID | Sample ID | Frequency - | | | | | |
|---|---|---|---|---|---|---|---|
| | | 3 GHz | 5 GHz | 10 GHz | 20 GHz | 30 GHz | 40 GHz |
| PA66 | A1 | 0.0103 | 0.0099 | 0.0094 | 0.0099 | 0.0093 | 0.0086 |
| | A2 | 0.0105 | 0.0099 | 0.0095 | 0.0098 | 0.0095 | 0.0089 |
| | B1 | 0.0182 | 0.0166 | 0.0160 | 0.0182 | 0.0139 | 0.0133 |
| | B2 | 0.0176 | 0.0167 | 0.0161 | 0.0176 | 0.0138 | 0.0134 |
| PA66-GF | C1 | 0.0105 | 0.0104 | 0.0102 | 0.0091 | 0.0116 | 0.0132 |
| | C2 | 0.0106 | 0.0105 | 0.0104 | 0.0095 | 0.0116 | 0.0132 |
| | D1 | 0.0165 | 0.0156 | 0.0159 | 0.0128 | 0.0159 | 0.0164 |
| | D2 | 0.0164 | 0.0158 | 0.0156 | 0.0122 | 0.0159 | 0.0169 |
| PA6 | E1 | 0.0121 | 0.0114 | 0.0109 | 0.0104 | 0.0110 | 0.0124 |
| | E2 | 0.0123 | 0.0117 | 0.0111 | 0.0103 | 0.0114 | 0.0129 |
| | F1 | 0.0201 | 0.0188 | 0.0186 | 0.0207 | 0.0161 | 0.0151 |
| | F2 | 0.0206 | 0.0189 | 0.0182 | 0.0195 | 0.0159 | 0.0156 |
| PA66-PPE | G1 | 0.0061 | 0.0060 | 0.0058 | 0.0060 | 0.0065 | 0.0065 |
| | G2 | 0.0062 | 0.0060 | 0.0059 | 0.0058 | 0.0065 | 0.0065 |
| | H1 | 0.0095 | 0.0090 | 0.0091 | 0.0076 | 0.0079 | 0.0074 |
| | H2 | 0.0096 | 0.0089 | 0.0089 | 0.0077 | 0.0080 | 0.0074 |
| PA Blend | I1 | 0.0121 | 0.0116 | 0.0110 | 0.0109 | 0.0111 | 0.0117 |
| | I2 | 0.0120 | 0.0115 | 0.0109 | 0.0111 | 0.0112 | 0.0114 |
| | J1 | 0.0142 | 0.0136 | 0.0133 | 0.0114 | 0.0139 | 0.0136 |
| | J2 | 0.0144 | 0.0138 | 0.0135 | 0.0115 | 0.0138 | 0.0137 |
| PA-IM-GF | K1 | 0.0157 | 0.0143 | 0.0134 | 0.0143 | 0.0127 | 0.0129 |
| | K2 | 0.0157 | 0.0144 | 0.0134 | 0.0138 | 0.0130 | 0.0127 |
| | L1 | 0.0195 | 0.0174 | 0.0174 | 0.0134 | 0.0141 | 0.0135 |
| | L2 | 0.0197 | 0.0177 | 0.0172 | 0.0129 | 0.0143 | 0.0137 |
| PC | M1 | 0.0052 | 0.0051 | 0.0053 | 0.0060 | 0.0063 | 0.0064 |
| | M2 | 0.0052 | 0.0051 | 0.0053 | 0.0061 | 0.0062 | 0.0062 |
| | N1 | 0.0056 | 0.0055 | 0.0057 | 0.0061 | 0.0065 | 0.0061 |
| | N2 | 0.0057 | 0.0054 | 0.0057 | 0.0060 | 0.0065 | 0.0063 |

Waveform Modeling:

The above dielectric constant and dissipation factor measurement data (Tables 4 and 5) for the seven tested specimens, DAM and conditioned, were used for the waveform modeling. Various commercial code packages are available for such modeling, for example, from Altair Feko™, comprehensive computational electromagnetics (CEM) code.

Using the waveform modeling, the transmission loss (in decibels, dB) as well as reflection (dB) at each of the tested frequencies (in GHz) for each of the seven test specimens (with respective thickness varied) was determined.

Test Methods

Mechanical testing included testing for the following parameters. Tensile modulus was tested using ISO 527. Tensile strength was tested using ISO 527. Tensile elongation (break) was tested using ISO 527. Flexural modulus was tested using ISO 178. Flexural strength was tested using ISO 178. Notched Charpy impact was tested using ISO 179. Unnotched Charpy impact was tested using ISO 179. Fire retardancy (FR) testing can include testing for the following parameters. Material FR testing is conducted using UL 94. Flame testing is conducted using ASTM E84-3. Weatherability testing includes testing for the following parameters. Lifecycle UV testing (10 yr, 15 yr and 20 yr) is conducted using AATCC Method 16 Option 3. Color fade is determined by measuring change in color at specified points. Scratch testing is conducted using ASTM 50452. Paint adhesion testing is conducted for the following parameters. Crosshatch testing is conducted using ISO 2409. Humidity and cross hatch tests are conducted together using ISO 6270-2 and ISO 554. A cross-hatch test after UV exposure is conducted according to ISO 2409.

Example 1

Specimens (Dry and Wet) at 3 GHz Frequency

TABLE 6

| | | Losses at 3 GHz Dry | | | | | |
|---|---|---|---|---|---|---|---|
| | | 1 | | 2 | | 3 | |
| Material | Frequency (GHz) | Thickness (mm) | Loss (dB) | Thickness (mm) | Loss (dB) | Thickness (mm) | Loss (dB) |
| PA66-PPE | 3 | 2 | 0.058 | 3 | 0.21 | 6 | 0.422 |
| | | Losses at 3 GHz Wet | | | | | |
| | | 1 | | 2 | | 3 | |
| Material | Frequency (GHz) | Thickness (mm) | Loss (dB) | Thickness (mm) | Loss (dB) | Thickness (mm) | Loss (dB) |
| PA66-PPE | 3 | 2 | 0.067 | 3 | 0.234 | 6 | 0.459 |

Table 6 illustrates data from Example 1.

Example 2

Specimens (Dry and Wet) at 28 GHz Frequency

TABLE 7

| | | Optimums 28 GHz Dry | | | | | |
|---|---|---|---|---|---|---|---|
| | | 1 | | 2 | | 3 | |
| Material | Frequency (GHz) | Thickness (mm) | Loss (dB) | Thickness (mm) | Loss (dB) | Thickness (mm) | Loss (dB) |
| PA66 | 28 | 3.032 | 0.127 | 6.078 | 0.254 | 9.122 | 0.383 |
| PA66-GF | 28 | 2.762 | 0.159 | 5.536 | 0.319 | 8.31 | 0.48 |
| PA66-PPE | 28 | 3.144 | 0.089 | 6.298 | 0.178 | 9.452 | 0.267 |
| PA Blend | 28 | 2.978 | 0.152 | 5.97 | 0.306 | 8.962 | 0.46 |
| PA-IM-GF | 28 | 2.868 | 0.176 | 5.75 | 0.353 | 8.63 | 0.531 |
| PC | 28 | 3.15 | 0.085 | 6.31 | 0.171 | 9.468 | 0.257 |

TABLE 8

| | | Optimums 28 GHz Wet | | | | | |
|---|---|---|---|---|---|---|---|
| | | 1 | | 2 | | 3 | |
| Material | Frequency (GHz) | Thickness (mm) | Loss (dB) | Thickness (mm) | Loss (dB) | Thickness (mm) | Loss (dB) |
| PA66 | 28 | 2.99 | 0.189 | 5.998 | 0.38 | 9.006 | 0.572 |
| PA66-GF | 28 | 2.732 | 0.218 | 5.476 | 0.438 | 8.222 | 0.661 |
| PA66-PPE | 28 | 3.138 | 0.109 | 6.29 | 0.219 | 9.442 | 0.329 |
| PA Blend | 28 | 2.948 | 0.189 | 5.912 | 0.38 | 8.874 | 0.572 |
| PA-IM-GF | 28 | 2.846 | 0.194 | 5.706 | 0.39 | 8.568 | 0.588 |
| PC | 28 | 3.152 | 0.089 | 6.314 | 0.178 | 9.476 | 0.267 |

Tables 7 and 8 illustrate data from Example 2.

Example 3

Specimens (Dry and Wet) at 39 GHz Frequency

TABLE 9

| Material | Frequency (GHz) | Optimums 39 GHz Dry | | | | | | | |
|---|---|---|---|---|---|---|---|---|---|
| | | 1 | | 2 | | 3 | | 4 | |
| | | Thickness (mm) | Loss (dB) | Thickness (mm) | Loss (dB) | Thickness (mm) | Loss (dB) | Thickness (mm) | Loss (dB) |
| PA66 | 39 | 2.42 | 0.119 | 4.496 | 0.239 | 6.748 | 0.36 | 9 | 0.481 |
| PA66-GF | 39 | 1.998 | 0.181 | 4.002 | 0.363 | 6.008 | 0.547 | 8.014 | 0.732 |
| PA66-PPE | 39 | 2.284 | 0.089 | 4.578 | 0.178 | 6.87 | 0.267 | 9.162 | 0.356 |
| PA Blend | 39 | 2.17 | 0.158 | 4.35 | 0.317 | 6.53 | 0.476 | 8.712 | 0.637 |
| PA-IM-GF | 39 | 2.078 | 0.175 | 4.166 | 0.351 | 6.256 | 0.529 | 8.344 | 0.708 |
| PC | 39 | 2.296 | 0.086 | 4.602 | 0.172 | 6.906 | 0.259 | 9.212 | 0.345 |

TABLE 10

| Material | Frequency (GHz) | Optimums 39 GHz Wet | | | | | | | |
|---|---|---|---|---|---|---|---|---|---|
| | | 1 | | 2 | | 3 | | 4 | |
| | | Thickness (mm) | Loss (dB) | Thickness (mm) | Loss (dB) | Thickness (mm) | Loss (dB) | Thickness (mm) | Loss (dB) |
| PA66 | 39 | 2.178 | 0.182 | 4.366 | 0.366 | 6.554 | 0.551 | 8.744 | 0.737 |
| PA66-GF | 39 | 1.998 | 0.228 | 4.006 | 0.459 | 6.014 | 0.691 | 8.022 | 0.926 |
| PA66-PPE | 39 | 2.28 | 0.101 | 4.568 | 0.202 | 6.856 | 0.304 | 9.144 | 0.406 |
| PA Blend | 39 | 2.156 | 0.186 | 4.326 | 0.374 | 6.496 | 0.564 | 8.666 | 0.754 |
| PA-IM-GF | 39 | 2.08 | 0.186 | 4.172 | 0.374 | 6.264 | 0.562 | 8.354 | 0.752 |
| PC | 39 | 2.286 | 0.085 | 4.582 | 0.169 | 6.876 | 0.255 | 9.17 | 0.34 |

Tables 9 and 10 illustrate data from Example 3.

Examples 4-17 include figures showing test results for 1 mm thick panels that include various materials (e.g., polyamides, reinforced polyamides, and polycarbonates) for their transmission loss and reflection under wet and dry conditions. The results showed that panels formed from polyamide materials, including reinforced polyamide materials, showed superior transmission loss and reflection properties compared to panels formed from other materials such as polycarbonate. Surprisingly, given the hydrophilic nature of polyamides, those panels including a polyamide performed well when wet.

Example 4

PA66 Specimens (Dry and Wet) at 28 GHz Frequency

Figure 3A:
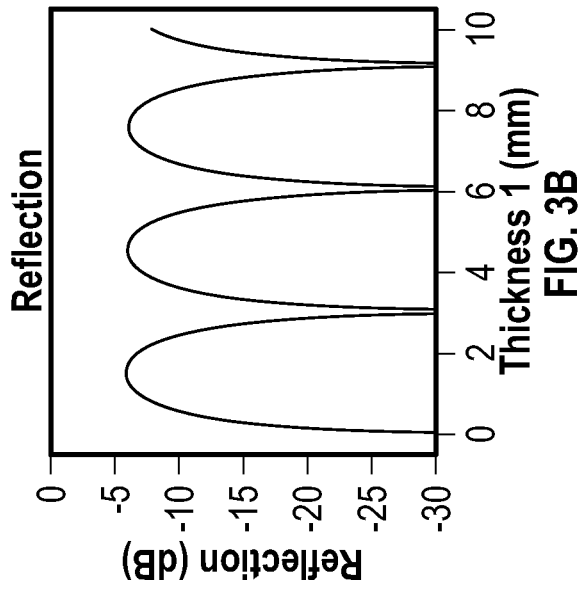
FIG. 3A shows the transmission loss (S21 in dB on the Y-axis) as a function of thickness (mm on the X-axis) for a dry as molded (DAM) (or dry) specimen at a designated frequency, according to various examples of the present disclosure.
Figure 3B:
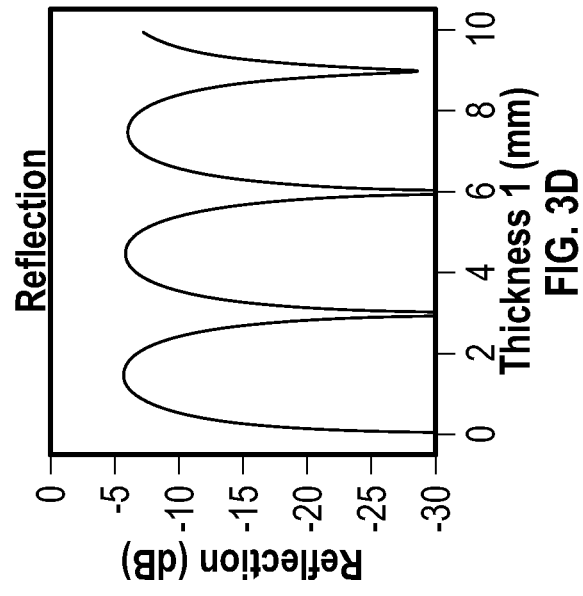
FIG. 3B shows reflection (in dB) as a function of thickness (mm on the X-axis) for a dry as molded (DAM) (or dry) specimen at a designated frequency, according to various examples of the present disclosure.
Figure 3C:
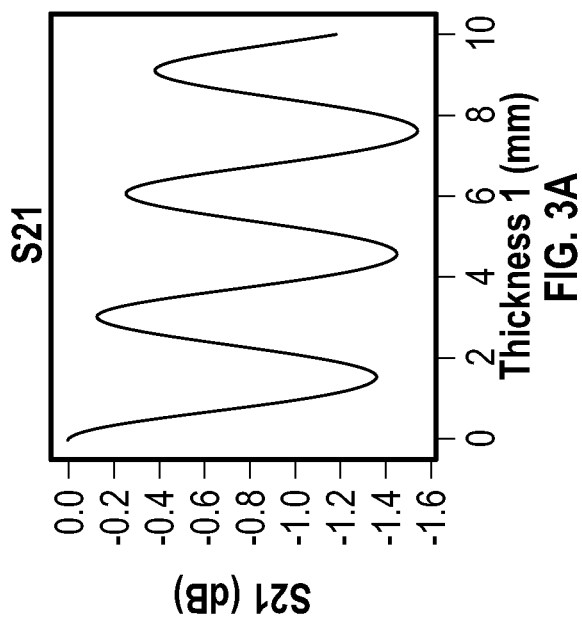
FIG. 3C shows the transmission loss (S21 in dB on the Y-axis) as a function of thickness (mm on the X-axis) for a conditioned (or wet) specimen at a specified frequency, according to various examples of the present disclosure.
Figure 3D:
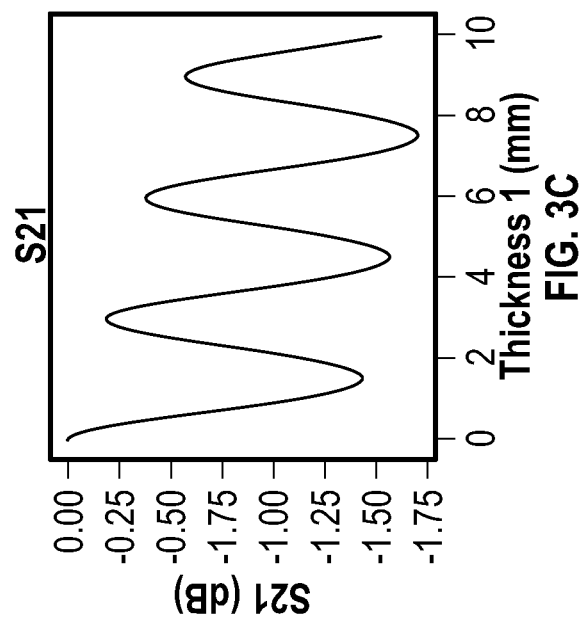
FIG. 3D shows the reflection (in dB) as a function of thickness (mm on the X-axis) for a conditioned (or wet) specimen at a specified frequency, according to various examples of the present disclosure.

FIG. 3A shows the transmission loss (S21 in dB on the Y-axis) as a function of thickness (mm on the X-axis) for a dry as molded (DAM) (or dry) specimen at the designated frequency above. FIG. 3B shows reflection (in dB) as a function of thickness (mm on the X-axis) for a dry as molded (DAM) (or dry) specimen at the designated frequency above. FIG. 3C shows the transmission loss (S21 in dB on the Y-axis) as a function of thickness (mm on the X-axis) for a conditioned (or wet) specimen at the specified frequency above. FIG. 3D shows the reflection (in dB) as a function of thickness (mm on the X-axis) for a conditioned (or wet) specimen at the specified frequency above.

Example 5

PA66 Specimens (Dry and Wet) at 39 GHz Frequency

Figure 4B:
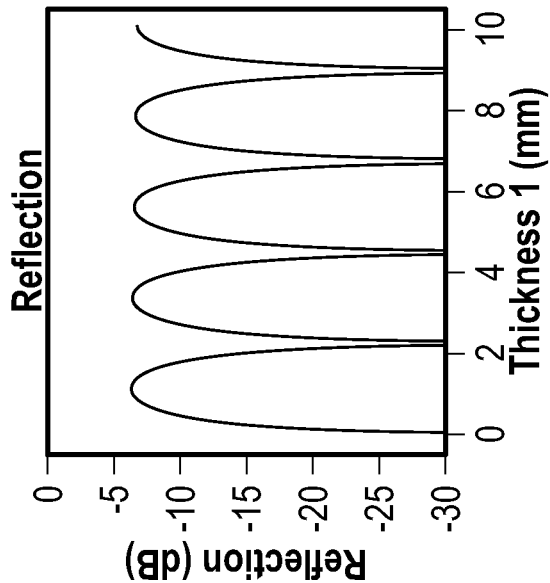
FIG. 4B shows reflection (in dB) as a function of thickness (mm on the X-axis) for a dry as molded (DAM) (or dry) specimen at a designated frequency, according to various examples of the present disclosure.
Figure 4D:
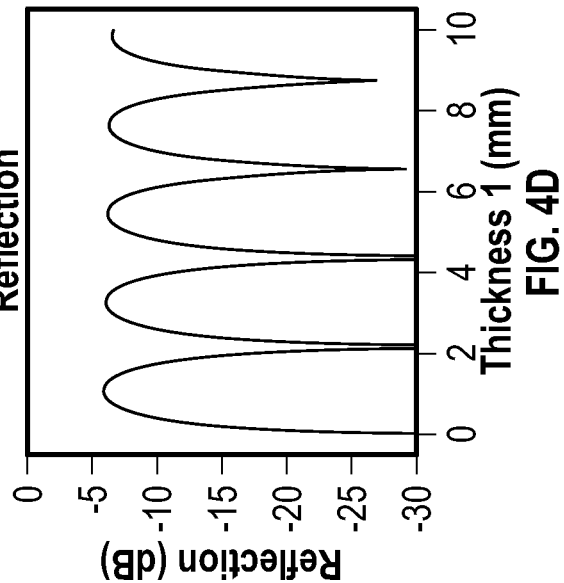
FIG. 4D shows the reflection (in dB) as a function of thickness (mm on the X-axis) for a conditioned (or wet) specimen at a specified frequency, according to various examples of the present disclosure.
Figure 4A:
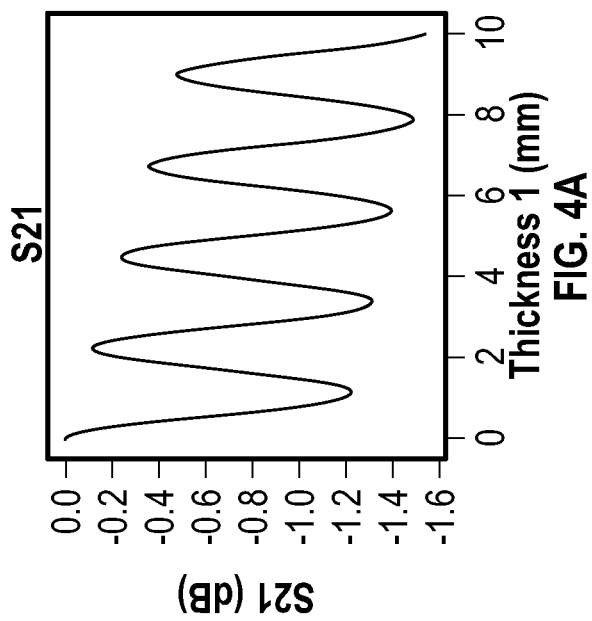
FIG. 4A shows the transmission loss (S21 in dB on the Y-axis) as a function of thickness (mm on the X-axis) for a dry as molded (DAM) (or dry) specimen at a designated frequency, according to various examples of the present disclosure.
Figure 4C:
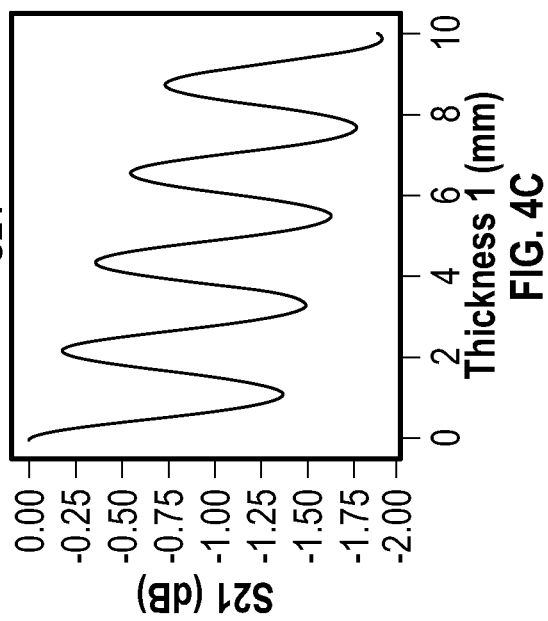
FIG. 4C shows the transmission loss (S21 in dB on the Y-axis) as a function of thickness (mm on the X-axis) for a conditioned (or wet) specimen at a specified frequency, according to various examples of the present disclosure.

FIG. 4A shows the transmission loss (S21 in dB on the Y-axis) as a function of thickness (mm on the X-axis) for a dry as molded (DAM) (or dry) specimen at the designated frequency above. FIG. 4B shows reflection (in dB) as a function of thickness (mm on the X-axis) for a dry as molded (DAM) (or dry) specimen at the designated frequency above. FIG. 4C shows the transmission loss (S21 in dB on the Y-axis) as a function of thickness (mm on the X-axis) for a conditioned (or wet) specimen at the specified frequency above. FIG. 4D shows the reflection (in dB) as a function of thickness (mm on the X-axis) for a conditioned (or wet) specimen at the specified frequency above.

Example 6

PA66-GF Specimens (Dry and Wet) at 28 GHz Frequency

Figure 5A:
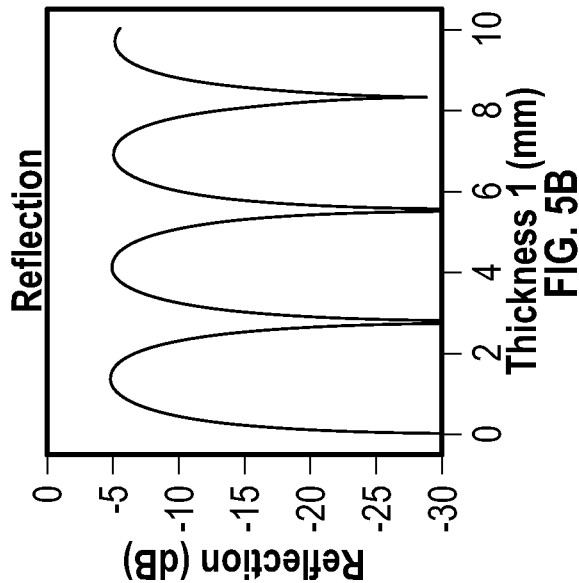
FIG. 5A shows the transmission loss (S21 in dB on the Y-axis) as a function of thickness (mm on the X-axis) for a dry as molded (DAM) (or dry) specimen at a designated frequency, according to various examples of the present disclosure.
Figure 5B:
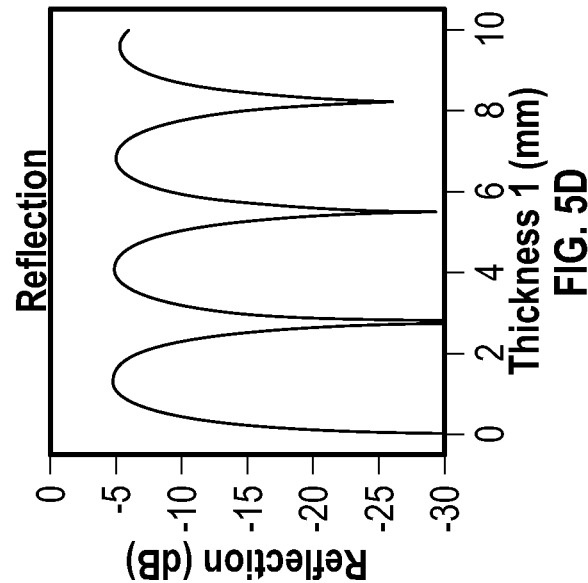
FIG. 5B shows reflection (in dB) as a function of thickness (mm on the X-axis) for a dry as molded (DAM) (or dry) specimen at a designated frequency, according to various examples of the present disclosure.
Figure 5C:
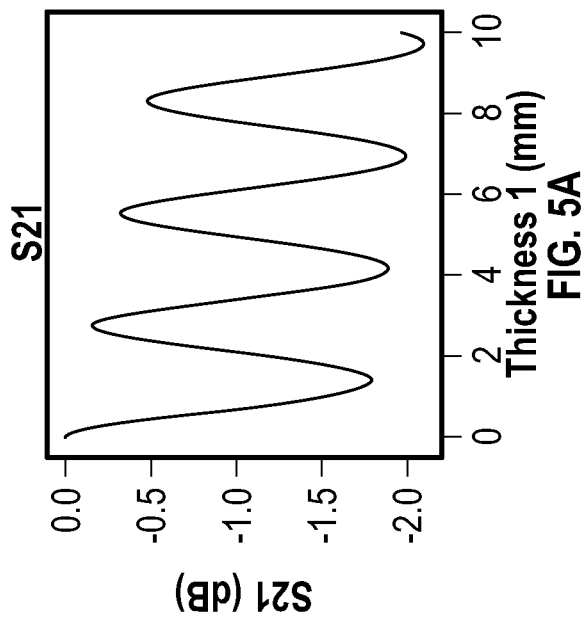
FIG. 5C shows the transmission loss (S21 in dB on the Y-axis) as a function of thickness (mm on the X-axis) for a conditioned (or wet) specimen at a specified frequency, according to various examples of the present disclosure.
Figure 5D:
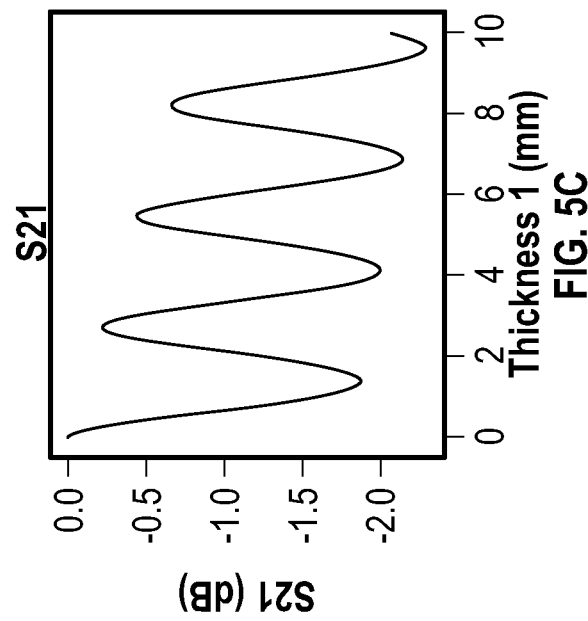
FIG. 5D shows the reflection (in dB) as a function of thickness (mm on the X-axis) for a conditioned (or wet) specimen at a specified frequency, according to various examples of the present disclosure.

FIG. 5A shows the transmission loss (S21 in dB on the Y-axis) as a function of thickness (mm on the X-axis) for a dry as molded (DAM) (or dry) specimen at the designated frequency above. FIG. 5B shows reflection (in dB) as a function of thickness (mm on the X-axis) for a dry as molded (DAM) (or dry) specimen at the designated frequency above. FIG. 5C shows the transmission loss (S21 in dB on the Y-axis) as a function of thickness (mm on the X-axis) for a conditioned (or wet) specimen at the specified frequency above. FIG. 5D shows the reflection (in dB) as a function of thickness (mm on the X-axis) for a conditioned (or wet) specimen at the specified frequency above.

Example 7

PA66-GF Specimens (Dry and Wet) at 39 GHz Frequency

Figure 6A:
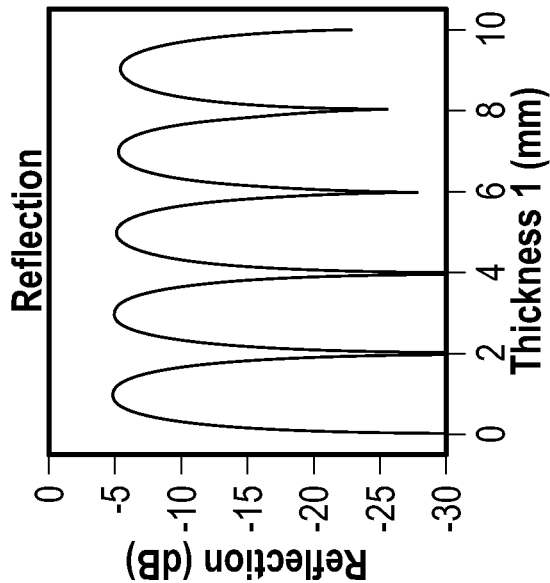
FIG. 6A shows the transmission loss (S21 in dB on the Y-axis) as a function of thickness (mm on the X-axis) for a dry as molded (DAM) (or dry) specimen at a designated frequency, according to various examples of the present disclosure.
Figure 6B:
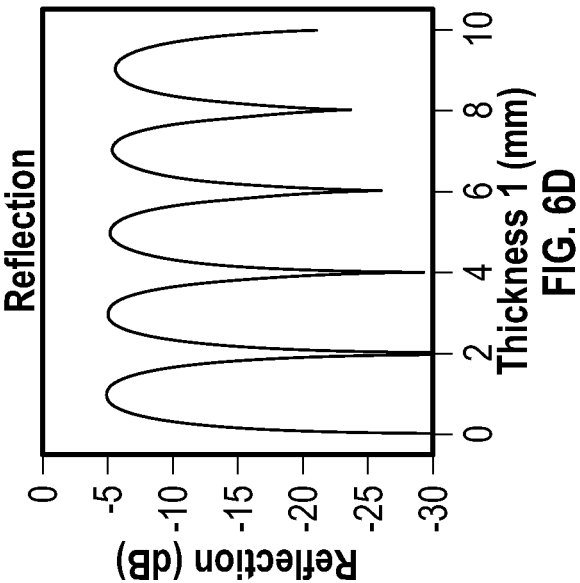
FIG. 6B shows reflection (in dB) as a function of thickness (mm on the X-axis) for a dry as molded (DAM) (or dry) specimen at a designated frequency, according to various examples of the present disclosure.
Figure 6C:
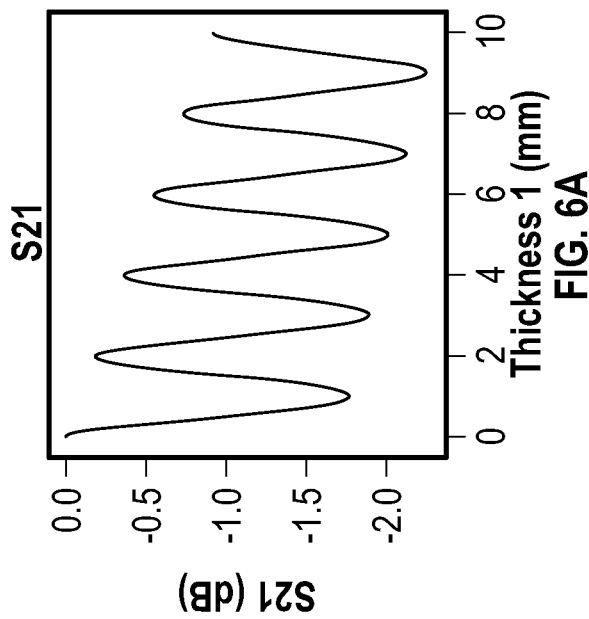
FIG. 6C shows the transmission loss (S21 in dB on the Y-axis) as a function of thickness (mm on the X-axis) for a conditioned (or wet) specimen at a specified frequency, according to various examples of the present disclosure.
Figure 6D:
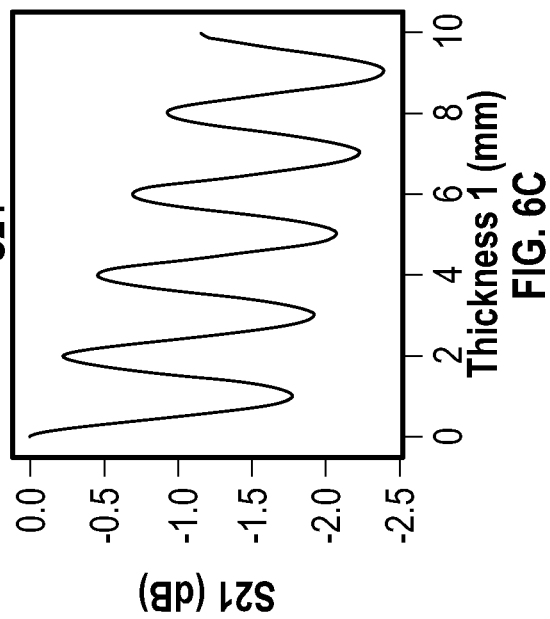
FIG. 6D shows the reflection (in dB) as a function of thickness (mm on the X-axis) for a conditioned (or wet) specimen at a specified frequency, according to various examples of the present disclosure.

FIG. 6A shows the transmission loss (S21 in dB on the Y-axis) as a function of thickness (mm on the X-axis) for a dry as molded (DAM) (or dry) specimen at the designated frequency above. FIG. 6B shows reflection (in dB) as a function of thickness (mm on the X-axis) for a dry as molded (DAM) (or dry) specimen at the designated frequency above. FIG. 6C shows the transmission loss (S21 in dB on the Y-axis) as a function of thickness (mm on the X-axis) for a conditioned (or wet) specimen at the specified frequency above. FIG. 6D shows the reflection (in dB) as a function of thickness (mm on the X-axis) for a conditioned (or wet) specimen at the specified frequency above.

Example 8

PA66-PPE Specimens (Dry and Wet) at 28 GHz Frequency

Figure 7A:
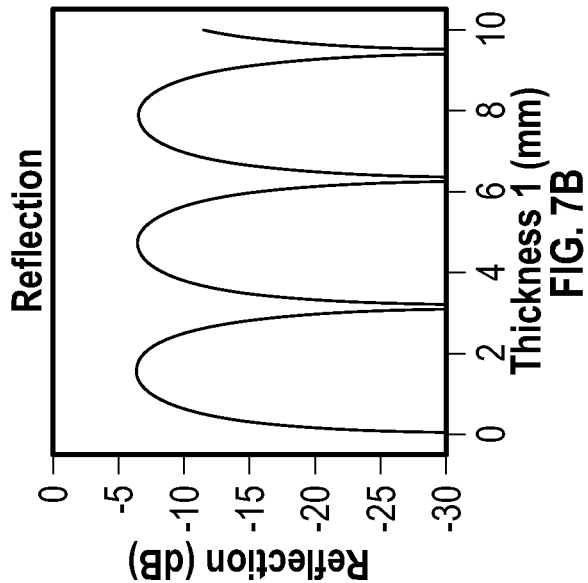
FIG. 7A shows the transmission loss (S21 in dB on the Y-axis) as a function of thickness (mm on the X-axis) for a dry as molded (DAM) (or dry) specimen at a designated frequency, according to various examples of the present disclosure.
Figure 7B:
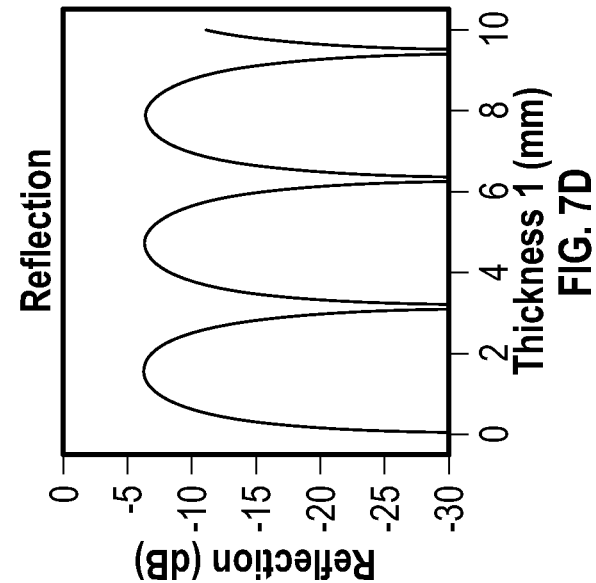
FIG. 7B shows reflection (in dB) as a function of thickness (mm on the X-axis) for a dry as molded (DAM) (or dry) specimen at a designated frequency, according to various examples of the present disclosure.
Figure 7C:
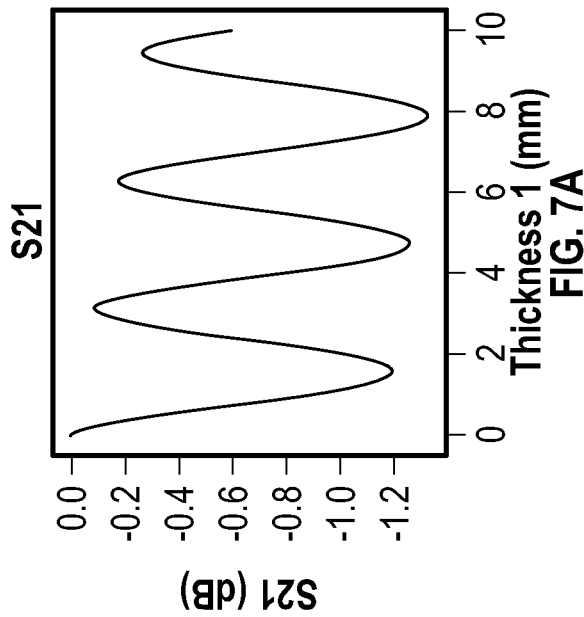
FIG. 7C shows the transmission loss (S21 in dB on the Y-axis) as a function of thickness (mm on the X-axis) for a conditioned (or wet) specimen at a specified frequency, according to various examples of the present disclosure.
Figure 7D:
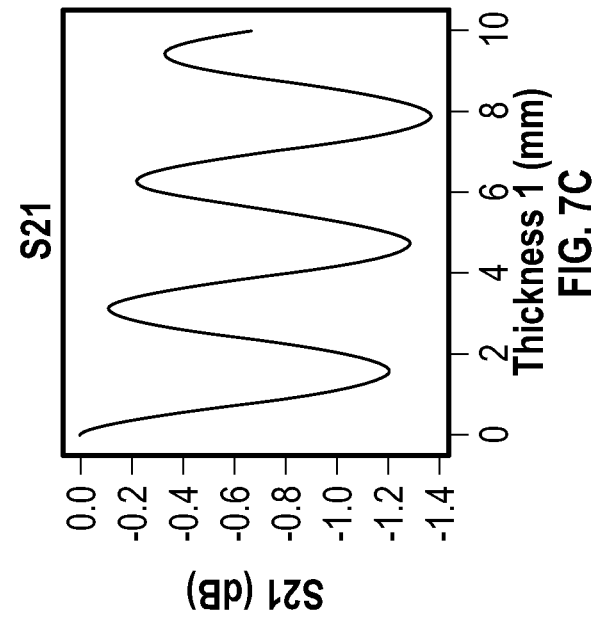
FIG. 7D shows the reflection (in dB) as a function of thickness (mm on the X-axis) for a conditioned (or wet) specimen at a specified frequency, according to various examples of the present disclosure.

FIG. 7A shows the transmission loss (S21 in dB on the Y-axis) as a function of thickness (mm on the X-axis) for a dry as molded (DAM) (or dry) specimen at the designated frequency above. FIG. 7B shows reflection (in dB) as a function of thickness (mm on the X-axis) for a dry as molded (DAM) (or dry) specimen at the designated frequency above. FIG. 7C shows the transmission loss (S21 in dB on the Y-axis) as a function of thickness (mm on the X-axis) for a conditioned (or wet) specimen at the specified frequency above. FIG. 7D shows the reflection (in dB) as a function of thickness (mm on the X-axis) for a conditioned (or wet) specimen at the specified frequency above.

Example 9

PA66-PPE Specimens (Dry and Wet) at 39 GHz Frequency

Figure 8A:
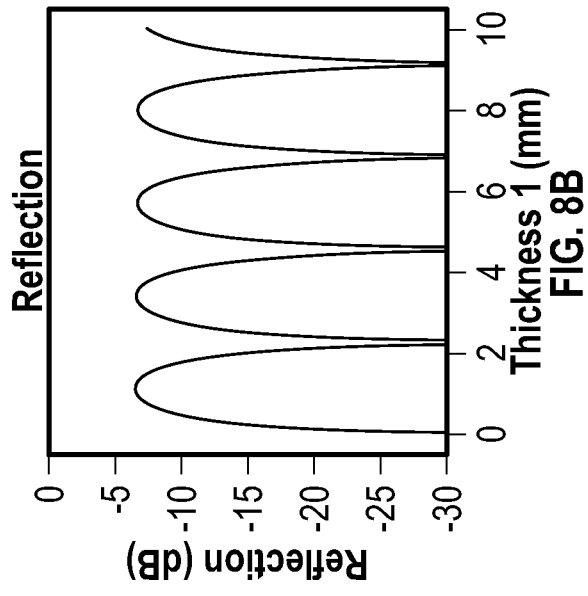
FIG. 8A shows the transmission loss (S21 in dB on the Y-axis) as a function of thickness (mm on the X-axis) for a dry as molded (DAM) (or dry) specimen at a designated frequency, according to various examples of the present disclosure.
Figure 8B:
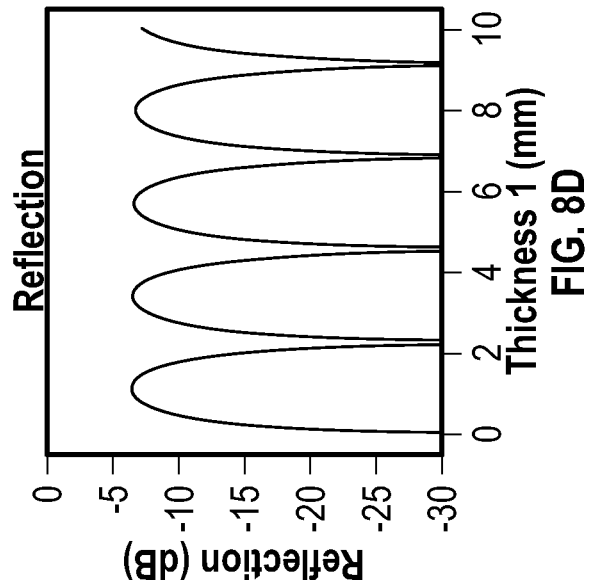
FIG. 8B shows reflection (in dB) as a function of thickness (mm on the X-axis) for a dry as molded (DAM) (or dry) specimen at a designated frequency, according to various examples of the present disclosure.
Figure 8C:
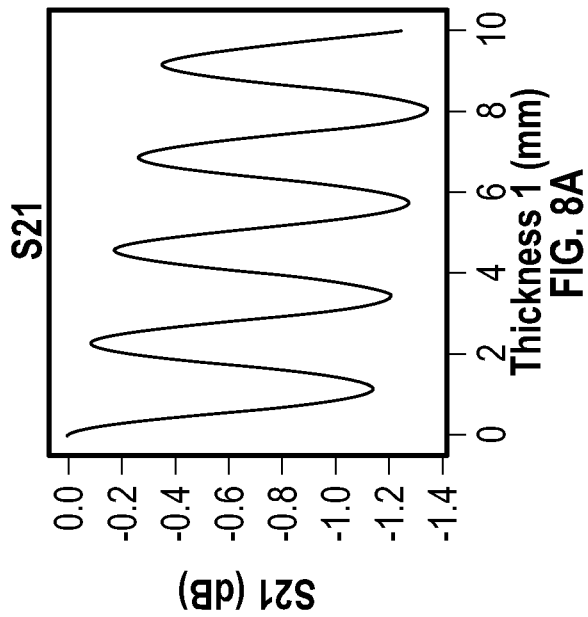
FIG. 8C shows the transmission loss (S21 in dB on the Y-axis) as a function of thickness (mm on the X-axis) for a conditioned (or wet) specimen at a specified frequency, according to various examples of the present disclosure.
Figure 8D:
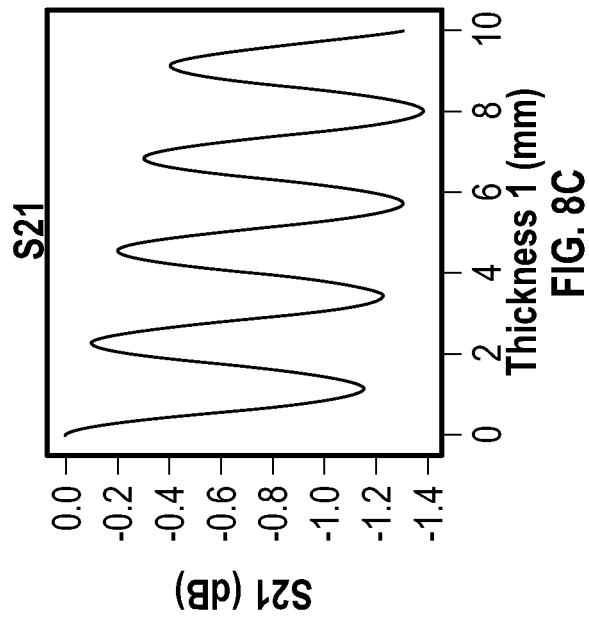
FIG. 8D shows the reflection (in dB) as a function of thickness (mm on the X-axis) for a conditioned (or wet) specimen at a specified frequency, according to various examples of the present disclosure.

FIG. 8A shows the transmission loss (S21 in dB on the Y-axis) as a function of thickness (mm on the X-axis) for a dry as molded (DAM) (or dry) specimen at the designated frequency above. FIG. 8B shows reflection (in dB) as a function of thickness (mm on the X-axis) for a dry as molded (DAM) (or dry) specimen at the designated frequency above. FIG. 8C shows the transmission loss (S21 in dB on the Y-axis) as a function of thickness (mm on the X-axis) for a conditioned (or wet) specimen at the specified frequency above. FIG. 8D shows the reflection (in dB) as a function of thickness (mm on the X-axis) for a conditioned (or wet) specimen at the specified frequency above.

Example 10

PA66-IM-GF30 Specimens (Dry and Wet) at 28 GHz Frequency

FIG. 9A shows the transmission loss (S21 in dB on the Y-axis) as a function of thickness (mm on the X-axis) for a dry as molded (DAM) (or dry) specimen at the designated frequency above. FIG. 9B shows reflection (in dB) as a function of thickness (mm on the X-axis) for a dry as molded (DAM) (or dry) specimen at the designated frequency above. FIG. 9C shows the transmission loss (S21 in dB on the Y-axis) as a function of thickness (mm on the X-axis) for a conditioned (or wet) specimen at the specified frequency above. FIG. 9D shows the reflection (in dB) as a function of thickness (mm on the X-axis) for a conditioned (or wet) specimen at the specified frequency above.

Example 11

PA66-IM-GF30 Specimens (Dry and Wet) at 39 GHz Frequency

Figure 10A:
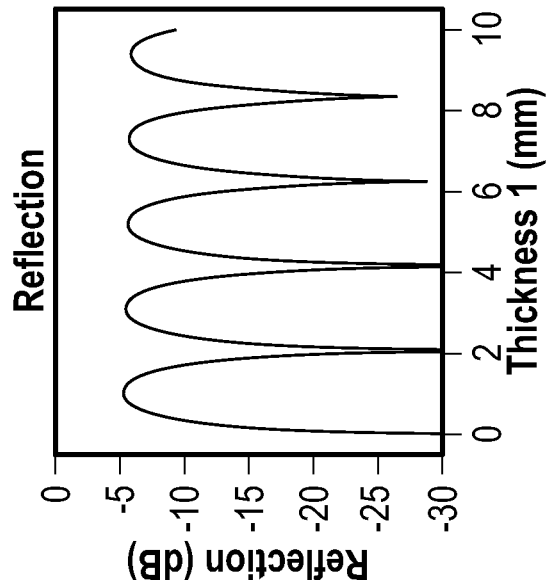
FIG. 10A shows the transmission loss (S21 in dB on the Y-axis) as a function of thickness (mm on the X-axis) for a dry as molded (DAM) (or dry) specimen at a designated frequency, according to various examples of the present disclosure.
Figure 10B:
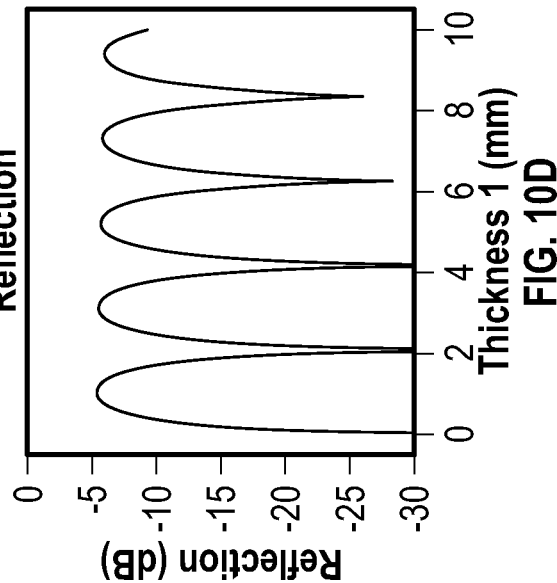
FIG. 10B shows reflection (in dB) as a function of thickness (mm on the X-axis) for a dry as molded (DAM) (or dry) specimen at a designated frequency, according to various examples of the present disclosure.
Figure 10C:
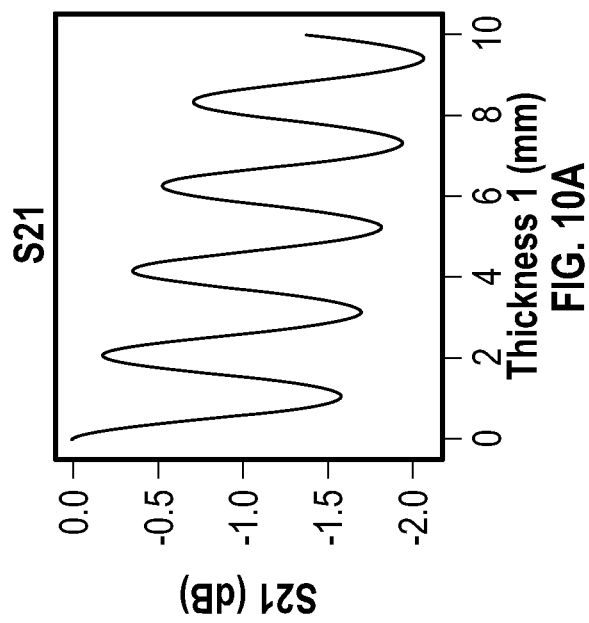
FIG. 10C shows the transmission loss (S21 in dB on the Y-axis) as a function of thickness (mm on the X-axis) for a conditioned (or wet) specimen at a specified frequency, according to various examples of the present disclosure.
Figure 10D:
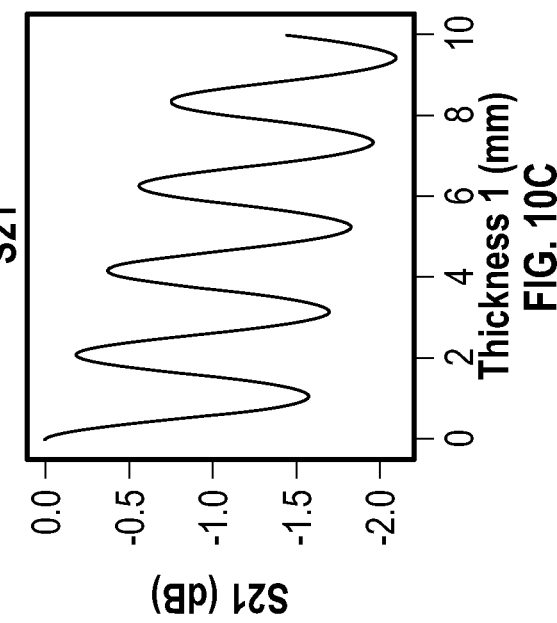
FIG. 10D shows the reflection (in dB) as a function of thickness (mm on the X-axis) for a conditioned (or wet) specimen at a specified frequency, according to various examples of the present disclosure.

FIG. 10A shows the transmission loss (S21 in dB on the Y-axis) as a function of thickness (mm on the X-axis) for a dry as molded (DAM) (or dry) specimen at the designated frequency above. FIG. 10B shows reflection (in dB) as a function of thickness (mm on the X-axis) for a dry as molded (DAM) (or dry) specimen at the designated frequency above. FIG. 10C shows the transmission loss (S21 in dB on the Y-axis) as a function of thickness (mm on the X-axis) for a conditioned (or wet) specimen at the specified frequency above. FIG. 10D shows the reflection (in dB) as a function of thickness (mm on the X-axis) for a conditioned (or wet) specimen at the specified frequency above.

Example 12

PC Specimens (Dry and Wet) at 28 GHz Frequency

Figure 11A:
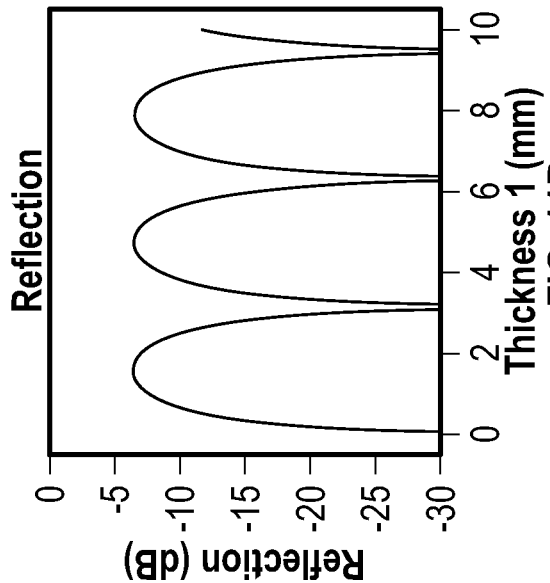
FIG. 11A shows the transmission loss (S21 in dB on the Y-axis) as a function of thickness (mm on the X-axis) for a dry as molded (DAM) (or dry) specimen at a designated frequency, according to various examples of the present disclosure.
Figure 11B:
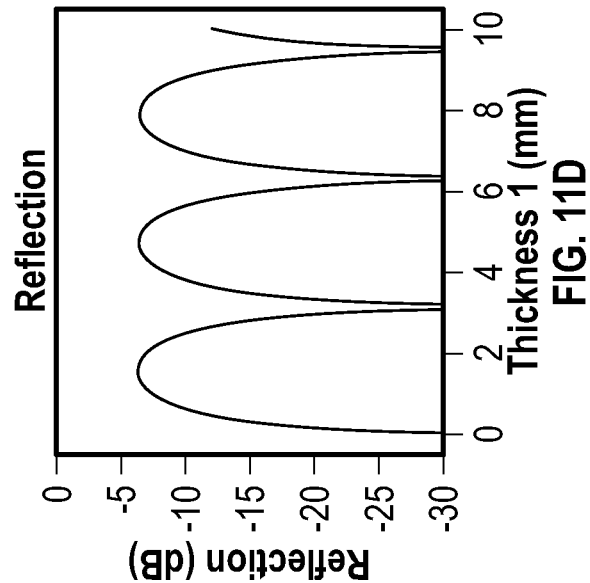
FIG. 11B shows reflection (in dB) as a function of thickness (mm on the X-axis) for a dry as molded (DAM) (or dry) specimen at a designated frequency, according to various examples of the present disclosure.
Figure 11C:
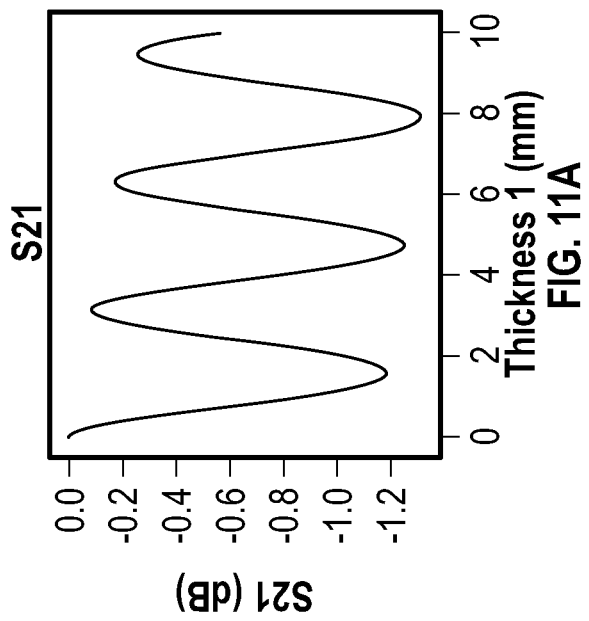
FIG. 11C shows the transmission loss (S21 in dB on the Y-axis) as a function of thickness (mm on the X-axis) for a conditioned (or wet) specimen at a specified frequency, according to various examples of the present disclosure.
Figure 11D:
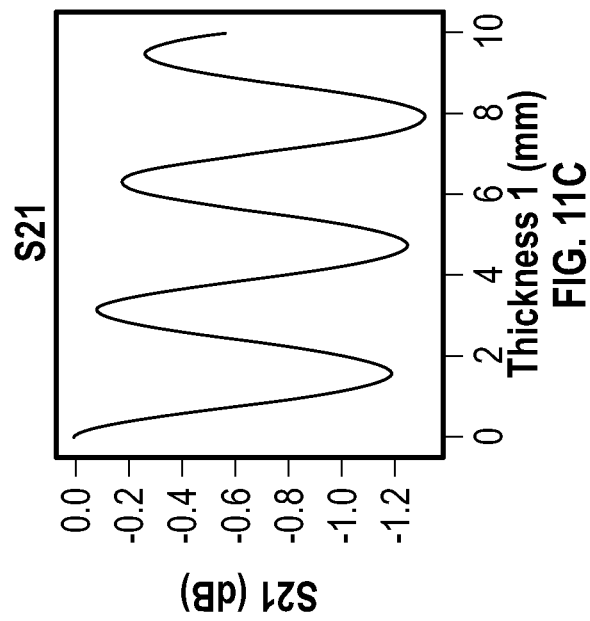
FIG. 11D shows the reflection (in dB) as a function of thickness (mm on the X-axis) for a conditioned (or wet) specimen at a specified frequency, according to various examples of the present disclosure.

FIG. 11A shows the transmission loss (S21 in dB on the Y-axis) as a function of thickness (mm on the X-axis) for a dry as molded (DAM) (or dry) specimen at the designated frequency above. FIG. 11B shows reflection (in dB) as a function of thickness (mm on the X-axis) for a dry as molded (DAM) (or dry) specimen at the designated frequency above. FIG. 11C shows the transmission loss (S21 in dB on the Y-axis) as a function of thickness (mm on the X-axis) for a conditioned (or wet) specimen at the specified frequency above. FIG. 11D shows the reflection (in dB) as a function of thickness (mm on the X-axis) for a conditioned (or wet) specimen at the specified frequency above.

Example 13

PC Specimens (Dry and Wet) at 39 GHz Frequency

Figure 12A:
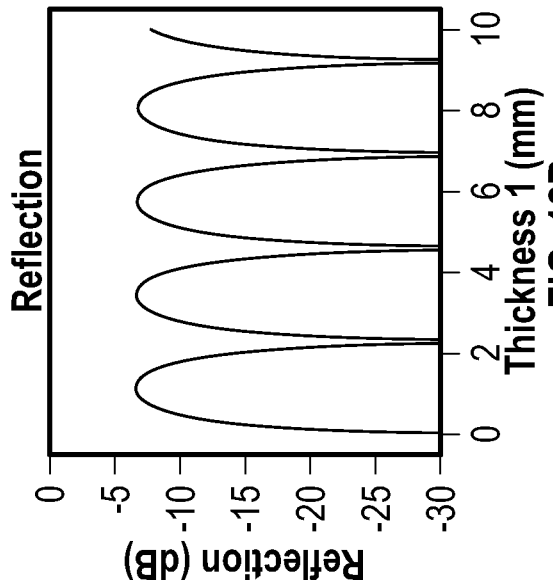
FIG. 12A shows the transmission loss (S21 in dB on the Y-axis) as a function of thickness (mm on the X-axis) for a dry as molded (DAM) (or dry) specimen at a designated frequency, according to various examples of the present disclosure.
Figure 12B:
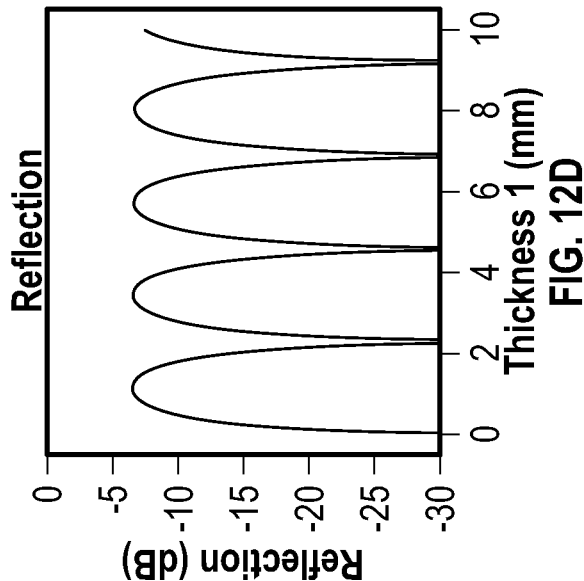
FIG. 12B shows reflection (in dB) as a function of thickness (mm on the X-axis) for a dry as molded (DAM) (or dry) specimen at a designated frequency, according to various examples of the present disclosure.
Figure 12C:
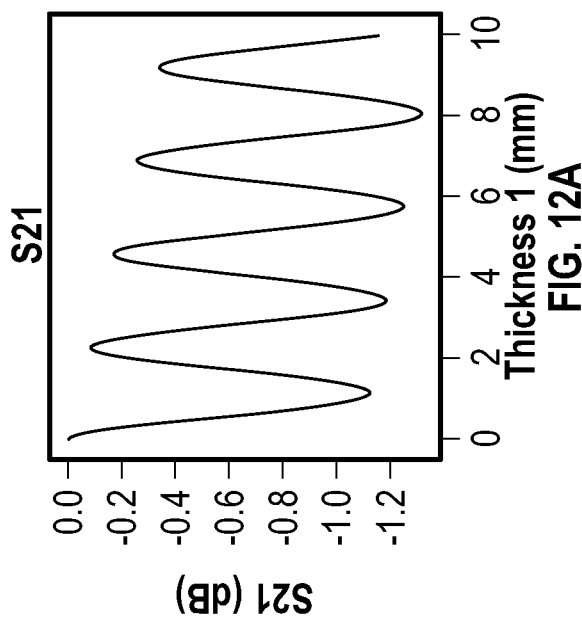
FIG. 12C shows the transmission loss (S21 in dB on the Y-axis) as a function of thickness (mm on the X-axis) for a conditioned (or wet) specimen at a specified frequency, according to various examples of the present disclosure.
Figure 12D:
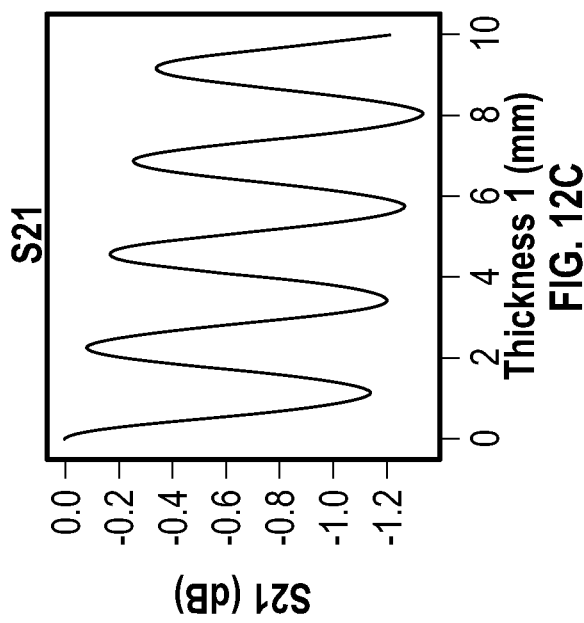
FIG. 12D shows the reflection (in dB) as a function of thickness (mm on the X-axis) for a conditioned (or wet) specimen at a specified frequency, according to various examples of the present disclosure.

FIG. 12A shows the transmission loss (S21 in dB on the Y-axis) as a function of thickness (mm on the X-axis) for a dry as molded (DAM) (or dry) specimen at the designated frequency above. FIG. 12B shows reflection (in dB) as a function of thickness (mm on the X-axis) for a dry as molded (DAM) (or dry) specimen at the designated frequency above. FIG. 12C shows the transmission loss (S21 in dB on the Y-axis) as a function of thickness (mm on the X-axis) for a conditioned (or wet) specimen at the specified frequency above. FIG. 12D shows the reflection (in dB) as a function of thickness (mm on the X-axis) for a conditioned (or wet) specimen at the specified frequency above.

Example 14

PA66+6I/6T (70/30) Blend Specimens (Dry and Wet) at 28 GHz Frequency

Figure 13A:
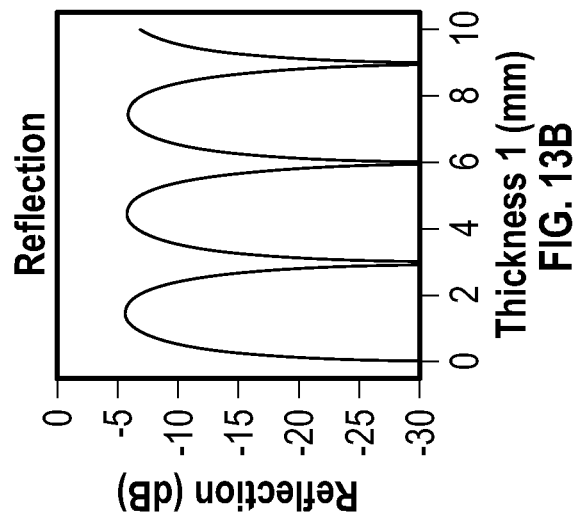
FIG. 13A shows the transmission loss (S21 in dB on the Y-axis) as a function of thickness (mm on the X-axis) for a dry as molded (DAM) (or dry) specimen at a designated frequency, according to various examples of the present disclosure.
Figure 13B:
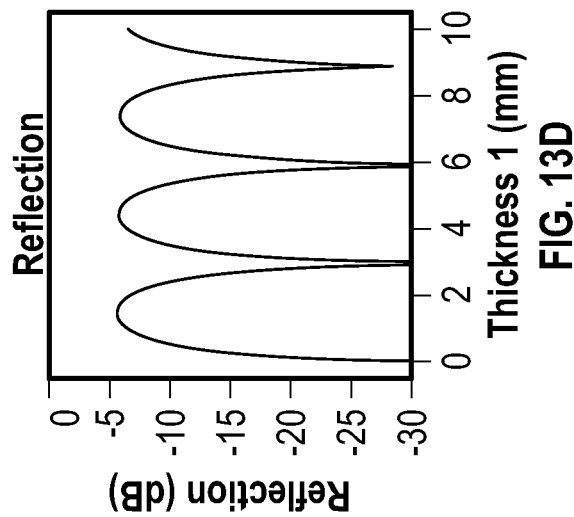
FIG. 13B shows reflection (in dB) as a function of thickness (mm on the X-axis) for a dry as molded (DAM) (or dry) specimen at a designated frequency, according to various examples of the present disclosure.
Figure 13C:
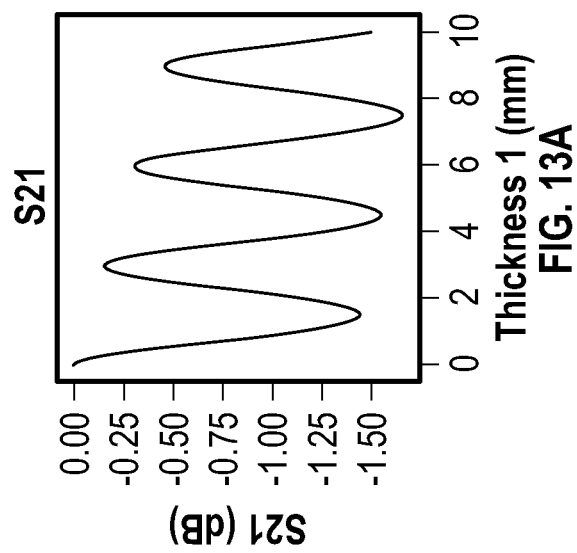
FIG. 13C shows the transmission loss (S21 in dB on the Y-axis) as a function of thickness (mm on the X-axis) for a conditioned (or wet) specimen at a specified frequency, according to various examples of the present disclosure.
Figure 13D:
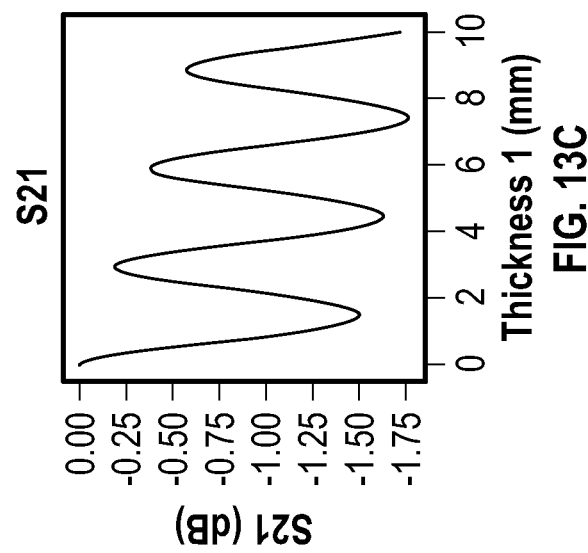
FIG. 13D shows the reflection (in dB) as a function of thickness (mm on the X-axis) for a conditioned (or wet) specimen at a specified frequency, according to various examples of the present disclosure.

FIG. 13A shows the transmission loss (S21 in dB on the Y-axis) as a function of thickness (mm on the X-axis) for a dry as molded (DAM) (or dry) specimen at the designated frequency above. FIG. 13B shows reflection (in dB) as a function of thickness (mm on the X-axis) for a dry as molded (DAM) (or dry) specimen at the designated frequency above. FIG. 13C shows the transmission loss (S21 in dB on the Y-axis) as a function of thickness (mm on the X-axis) for a conditioned (or wet) specimen at the specified frequency above. FIG. 13D shows the reflection (in dB) as a function of thickness (mm on the X-axis) for a conditioned (or wet) specimen at the specified frequency above.

Example 15

PA66+6I/6T (70/30) Blend Specimens (Dry and Wet) at 39 GHz Frequency

FIG. 14A shows the transmission loss (S21 in dB on the Y-axis) as a function of thickness (mm on the X-axis) for a dry as molded (DAM) (or dry) specimen at the designated frequency above. FIG. 14B shows reflection (in dB) as a function of thickness (mm on the X-axis) for a dry as molded (DAM) (or dry) specimen at the designated frequency above. FIG. 14C shows the transmission loss (S21 in dB on the Y-axis) as a function of thickness (mm on the X-axis) for a conditioned (or wet) specimen at the specified frequency above. FIG. 14D shows the reflection (in dB) as a function of thickness (mm on the X-axis) for a conditioned (or wet) specimen at the specified frequency above.

Example 16

PA6 Specimens (Dry and Wet) at 28 GHz Frequency

Figure 15A:
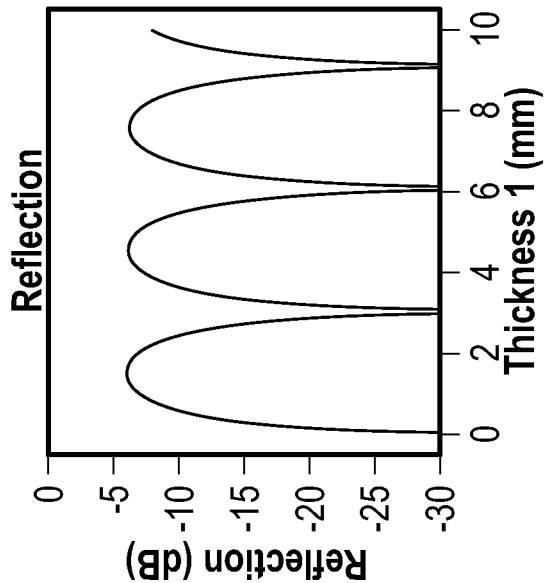
FIG. 15A shows the transmission loss (S21 in dB on the Y-axis) as a function of thickness (mm on the X-axis) for a dry as molded (DAM) (or dry) specimen at a designated frequency, according to various examples of the present disclosure.
Figure 15B:
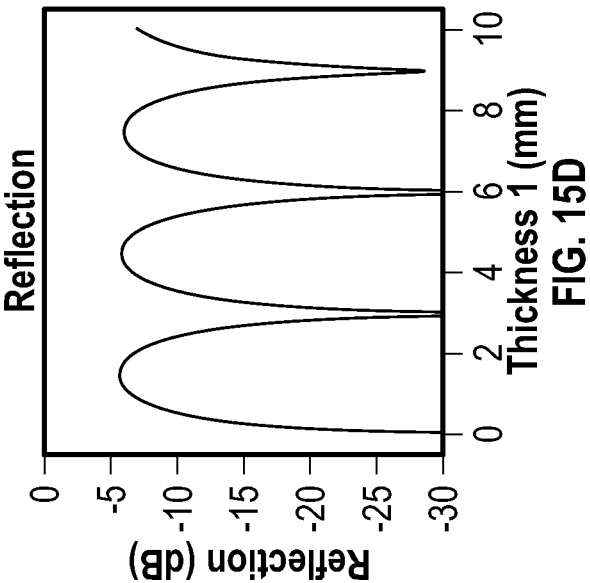
FIG. 15B shows reflection (in dB) as a function of thickness (mm on the X-axis) for a dry as molded (DAM) (or dry) specimen at a designated frequency, according to various examples of the present disclosure.
Figure 15C:
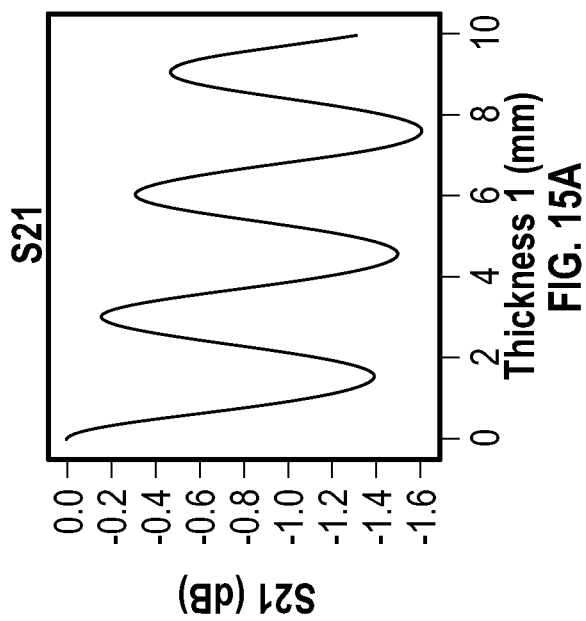
FIG. 15C shows the transmission loss (S21 in dB on the Y-axis) as a function of thickness (mm on the X-axis) for a conditioned (or wet) specimen at a specified frequency, according to various examples of the present disclosure.
Figure 15D:
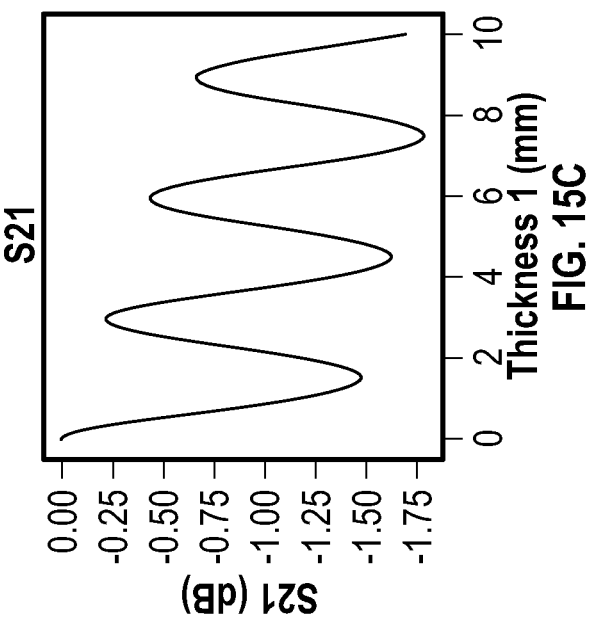
FIG. 15D shows the reflection (in dB) as a function of thickness (mm on the X-axis) for a conditioned (or wet) specimen at a specified frequency, according to various examples of the present disclosure.

FIG. 15A shows the transmission loss (S21 in dB on the Y-axis) as a function of thickness (mm on the X-axis) for a dry as molded (DAM) (or dry) specimen at the designated frequency above. FIG. 15B shows reflection (in dB) as a function of thickness (mm on the X-axis) for a dry as molded (DAM) (or dry) specimen at the designated frequency above. FIG. 15C shows the transmission loss (S21 in dB on the Y-axis) as a function of thickness (mm on the X-axis) for a conditioned (or wet) specimen at the specified frequency above. FIG. 15D shows the reflection (in dB) as a function of thickness (mm on the X-axis) for a conditioned (or wet) specimen at the specified frequency above.

Example 17

PA6 Specimens (Dry and Wet) at 39 GHz Frequency

Figure 16A:
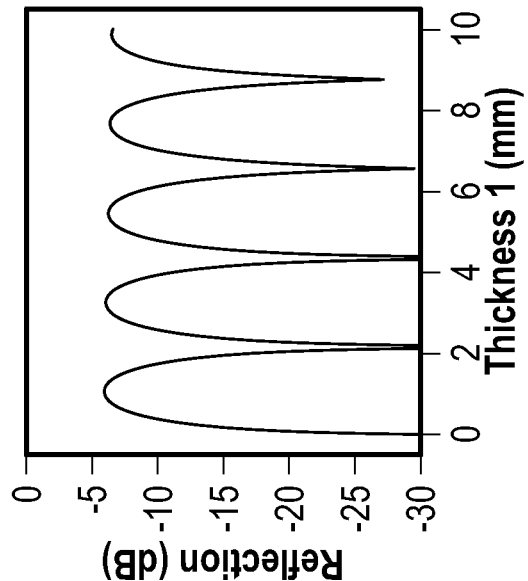
FIG. 16A shows the transmission loss (S21 in dB on the Y-axis) as a function of thickness (mm on the X-axis) for a dry as molded (DAM) (or dry) specimen at a designated frequency, according to various examples of the present disclosure.
Figure 16B:
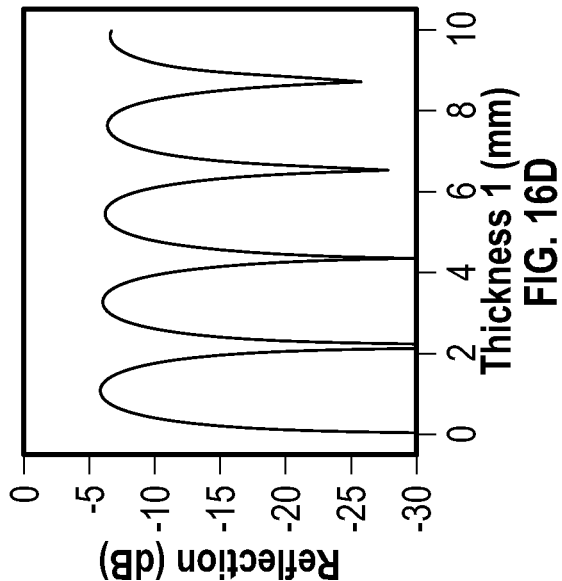
FIG. 16B shows reflection (in dB) as a function of thickness (mm on the X-axis) for a dry as molded (DAM) (or dry) specimen at a designated frequency, according to various examples of the present disclosure.
Figure 16C:
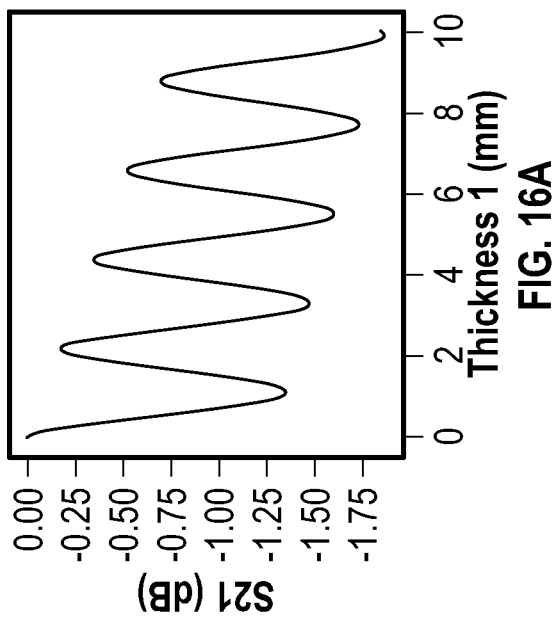
FIG. 16C shows the transmission loss (S21 in dB on the Y-axis) as a function of thickness (mm on the X-axis) for a conditioned (or wet) specimen at a specified frequency, according to various examples of the present disclosure.
Figure 16D:
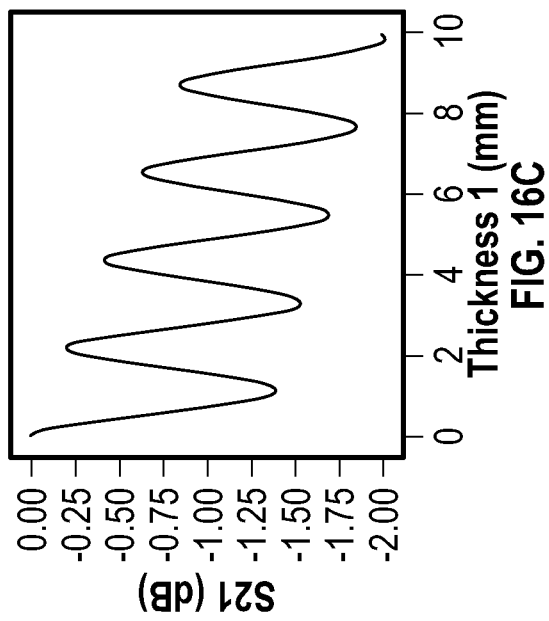
FIG. 16D shows the reflection (in dB) as a function of thickness (mm on the X-axis) for a conditioned (or wet) specimen at a specified frequency, according to various examples of the present disclosure.

FIG. 16A shows the transmission loss (S21 in dB on the Y-axis) as a function of thickness (mm on the X-axis) for a dry as molded (DAM) (or dry) specimen at the designated frequency above. FIG. 16B shows reflection (in dB) as a function of thickness (mm on the X-axis) for a dry as molded (DAM) (or dry) specimen at the designated frequency above. FIG. 16C shows the transmission loss (S21 in dB on the Y-axis) as a function of thickness (mm on the X-axis) for a conditioned (or wet) specimen at the specified frequency above. FIG. 16D shows the reflection (in dB) as a function of thickness (mm on the X-axis) for a conditioned (or wet) specimen at the specified frequency above.

Example 18

RF Testing—Insertion Loss Versus Distance at 24-40 GHz Wave Frequency

Several materials, as described in Table 1, were tested by molding the materials into 1 ft×1 ft flat plaques. These plaques were precision-machined to obtain about 2.18 mm structural thickness. A 0.25 mm thick basecoat of flame retardant (FR) material and 0.11 mm thick top-coat of decorative color were applied to each plaque using roller applicators. The coated plaque surfaces were somewhat rough due to the roller coat application. The total specimen structural thickness is 2.54 mm.

Using a horn antenna setup, the insertion loss in (S21 in dB) is measured in the far field in the 24-40 GHz wave frequency spectrum as a function of the plaque surface distance from the antenna.

Figure 17A:
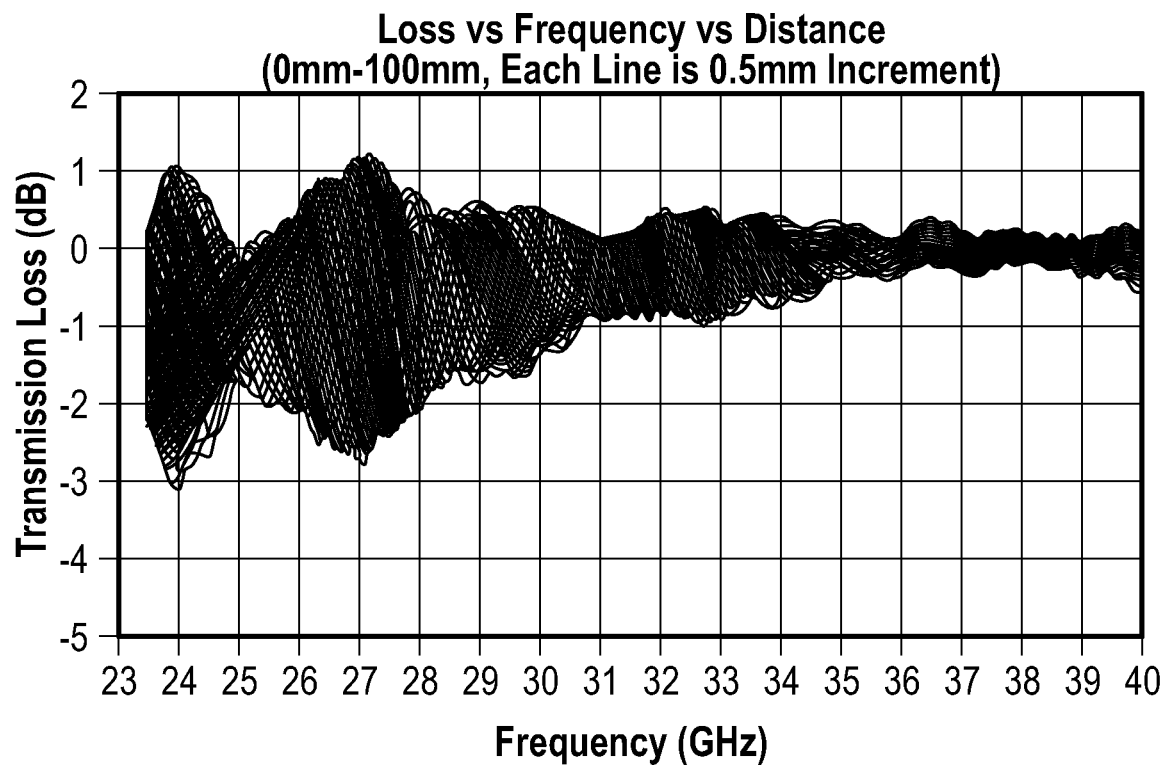
FIG. 17A represents a cyclone plot showing insertion loss (dB) data according to Example 18 of the present disclosure.
Figure 17B:
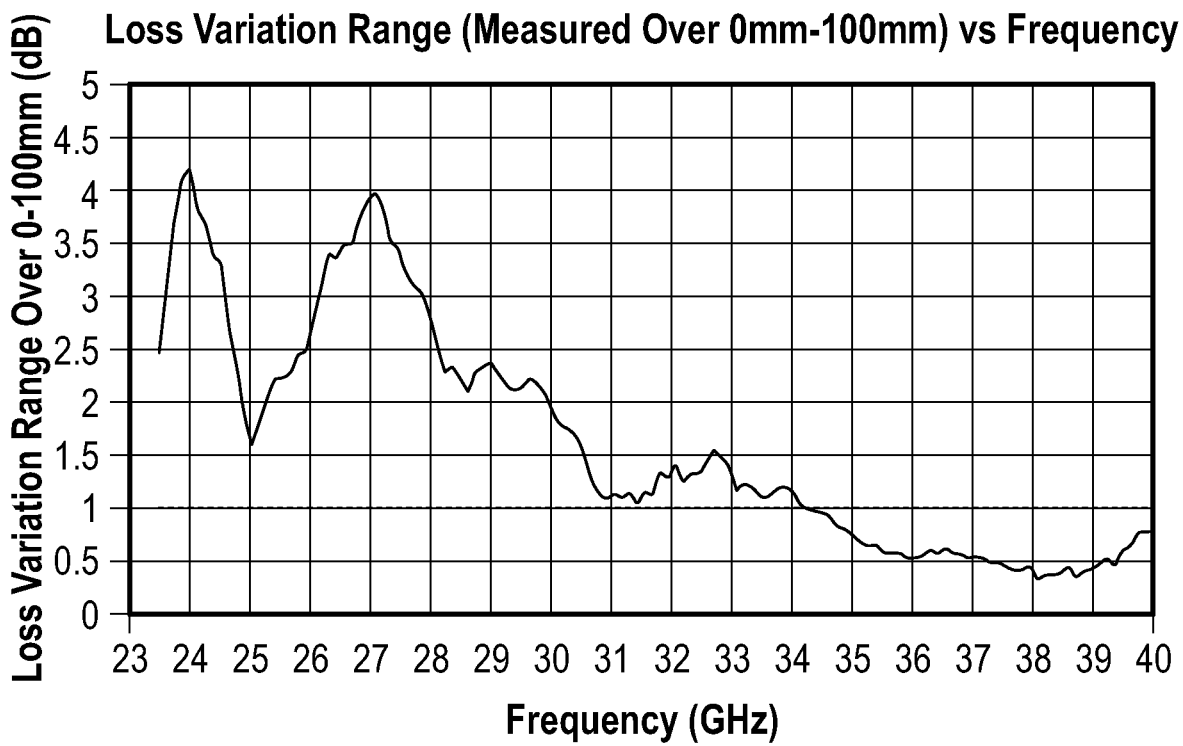
FIG. 17B represents a cyclone plot showing insertion loss (dB) data according to Example 18 of the present disclosure.

FIGS. 17A and 17B represent a cyclone plot showing insertion loss (dB) data measured for one of the tested plaques. FIG. 17A is a cyclone plot of the insertion loss in dB (Y-axis) measured over a 0-100 mm distance span in 0.5 mm increments over the 24-40 GHz wave frequency range (X-axis); each line shown is a 0.5 mm distance increment. FIG. 17B plots the insertion loss variation (Y-axis) of the tested plaque measured over a 0-100 mm distance variation and for the 24-40 GHz frequency range.

Example 19

Array Antenna Testing at 28 GHz Wave Frequency

The plaque specimens, described in Example 18 above, were next tested using a phased array antenna tuned to 28 GHz.

Figures 18A, 18B, 18C:
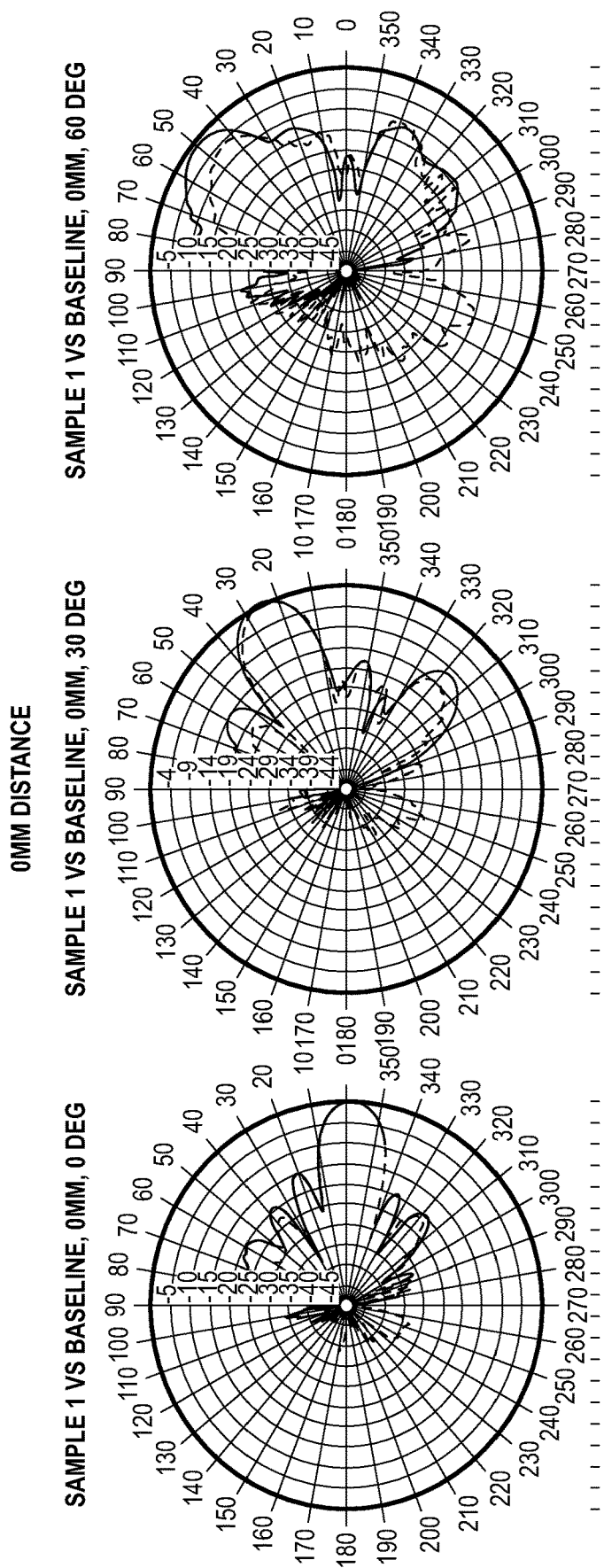
FIG. 18A represents array antenna data measured at an azimuth of 0°, according to an aspect of the present disclosure.
FIG. 18B represents array antenna data measured at an azimuth of 30°, according to an aspect of the present disclosure.
FIG. 18C represents array antenna data measured at an azimuth of 60°, according to an aspect of the present disclosure.
Figures 18D, 18E, 18F:
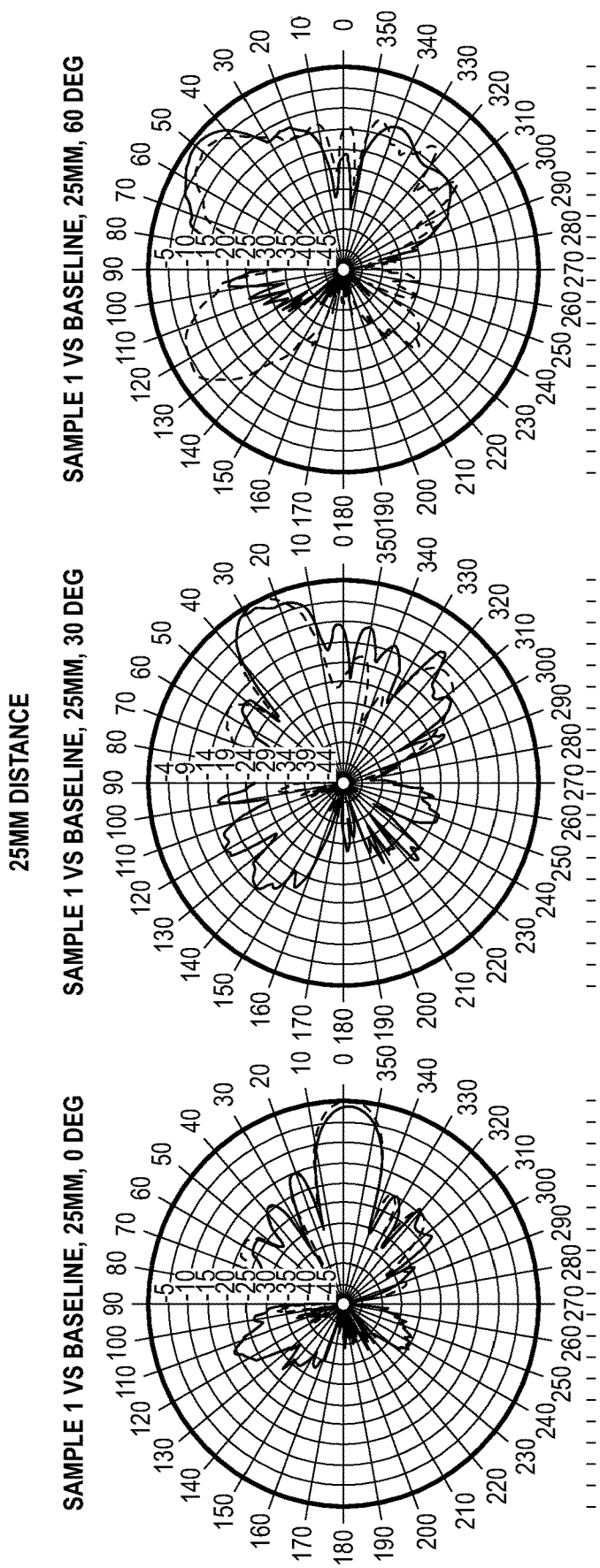
FIG. 18D represents array antenna data measured at an azimuth of 0°, according to an aspect of the present disclosure.
FIG. 18E represents array antenna data measured at an azimuth of 30°, according to an aspect of the present disclosure.
FIG. 18F represents array antenna data measured at an azimuth of 60°, according to an aspect of the present disclosure.

Changes in radiation as well as reflection patterns, for example, main lobe, side lobes, reflections, boresight error, and relative insertion losses (in dB), were measured at 28 GHz frequency and at two radio antenna distances, namely, i) close to each other, see "0 mm Distance" plots in FIGS. 18A-18F, and ii) few wavelengths apart, see "25 mm Distance" plots in FIG. 18B. Incident ray measurements for main beam bore sight loss, error, 3 dB beam width change, $1^{st}$ sidelobe gain increase, and backlobe/reflected lobes gain increase were performed at three azimuths, 0°, 30° and 60°. The term "azimuth" is an angular measurement in a spherical coordinate system. In FIGS. 18A-18F, the solid line represents the baseline performance for the two antenna system without the in-between plaque specimen, and the dashed line represents the plaque performance tested with the two-antenna system at 0 mm and 25 mm distance spacing.

In FIGS. 18A-18F for "0 mm Distance", the main lobe at each of the azimuths show little loss and the side lobes were improved.

Example 20

Enclosure for Telecommunication Equipment in the 500 MHz-6 GHz Frequency Range

A three-dimensional enclosure is prepared from panels made of glass-fiber-reinforced thermoplastic polymer. The panel structural thickness is about 2 mm excluding the paint coatings. The enclosure houses telecommunication equipment, namely, radio, antenna, power supply. In the radio signal frequency range of between 500 MHz to 6 GHz, a signal attenuation between 1 dB and 0 dB is observed.

Example 21

Enclosure for Telecommunication Equipment in the 24 GHz-30 GHz Frequency Range

A three-dimensional enclosure is prepared from panels made of glass-fiber-reinforced thermoplastic polymer. The panel structural thickness is about 3 mm, excluding the paint coatings. The enclosure houses telecommunication equipment, such as capacitors, actuators, power cable terminations, miniatured antenna, power transformer/power conditioner, optical fiber, radios, diplexer/multiplexer, coaxial cable, and their combinations, and may serve, e.g., as antenna concealment, cell phone casings, housing for an electronic component, fiber termination box, coaxial cable sheath, etc. In the radio signal frequency range of between 24 GHz and 30 GHz, a signal attenuation between 1 dB and 0 dB is observed.

Example 22

Enclosure for Telecommunication Equipment in the 36 GHz-40 GHz Frequency Range

A three-dimensional enclosure is prepared from panels made of glass-fiber-reinforced thermoplastic polymer. The panel structural thickness is about 2 mm, excluding the paint coatings. The enclosure houses telecommunication equipment, such as capacitors, actuators, power cable terminations, miniatured antenna, power transformer/power conditioner, optical fiber, radios, diplexer/multiplexer, coaxial cable, and their combinations, and may serves as, e.g., antenna concealment, cell phone casings, housing for electronic components, fiber termination box, coaxial fiber sheath, etc. In the radio signal frequency range of between 36 GHz and 40 GHz, a signal attenuation between 1 dB and 0 dB is observed.

Comparative Example 1

Panel Having a Window for Electromagnetic Signal Transmission

Figure 20C:
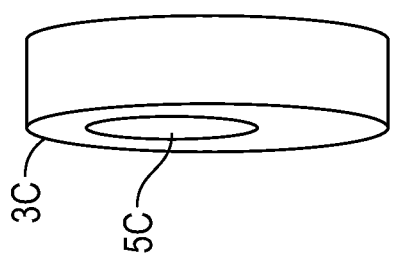
FIG. 20C is a perspective view of a panel or enclosure including windows according to Comparative Example 1 of the present disclosure.
Figure 20B:
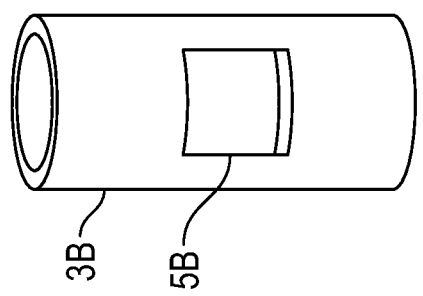
FIG. 20B is a perspective view of a panel or enclosure including windows according to Comparative Example 1 of the present disclosure.
Figure 20A:
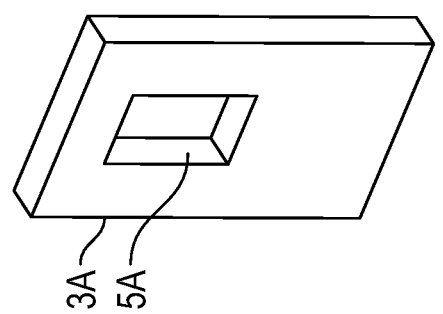
FIG. 20A is a perspective view of a panel or enclosure including windows according to Comparative Example 1 of the present disclosure.

FIGS. 20A-20C are perspective views of panels 3A-3C. Panels 3A-3C include respective openings 5A-5C. Panels 3A-3C can have a number of suitable geometric shapes such as a square shape, rectangular shape (3A), cylindrical shape (3B), disc shape (3C), or any other suitable shape.

An enclosure (not shown) formed from one or more of such panels can house one or more items of electromagnetic equipment. Examples of electromagnetic equipment include, for instance, a three-phase electrical wire terminated into a circuit breaker/disconnect; a power transformer/power conditioner; an optical fiber wire and fiber termination box; a radio or radios; a diplexer/multiplexer (per radio); a coaxial cable from radio to antenna(s); or an antennae. This enclosure may also require a coax penetration to a remote antenna mount location. The enclosure is designed to accommodate any target application and has temperature control systems (fans, vent holes, or slots), access doors (screwed on, clipped on, hinged) for internals, and mounting accessories (brackets, screwed mounts, swivel mounts, sliding guides), and the like.

Opening 5A, 5B, or 5C, may be fitted with a window structure or assembly constructed from any suitable material that enables the transmission of an electromagnetic signals. Examples include mono- or multi-layered transparent films, sheets, glass cover, metal or plastic mesh, and such. There may be multiple such openings of different shapes and sizes to accommodate the electromagnetic signal conveyance with reduced signal strength loss.

While such panel(s) and the enclosure(s) formed therefrom may be of any suitable material such as polymer, plastic, foam, metal, composites, etc., incorporation of opening(s) necessary for signal transmission make such enclosures complex to design, fabricate, mount, and maintain. Furthermore, such panels and enclosures made therefrom having openings or windows fitted with materials different from the panel materials make such structures less durable (e.g., short life cycle) while compromising their structural integrity, mechanical strength and impact resistance. An enclosure is deemed "windowless" as used in the instant disclosure if it lacks such an opening or window that is fitted with a material different from the panel material.

Example 23

Panel through which Electromagnetic Signals are Transmitted or Received

Figure 21C:
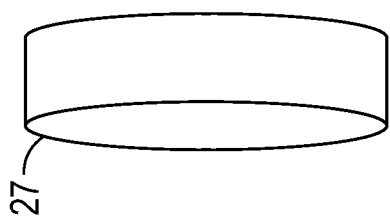
FIG. 21C is a perspective view of a windowless panel or enclosure according to Example 26 of the present disclosure.
Figure 21B:
FIG. 21B is a perspective view of a windowless panel or enclosure according to Example 26 of the present disclosure.
Figure 21A:
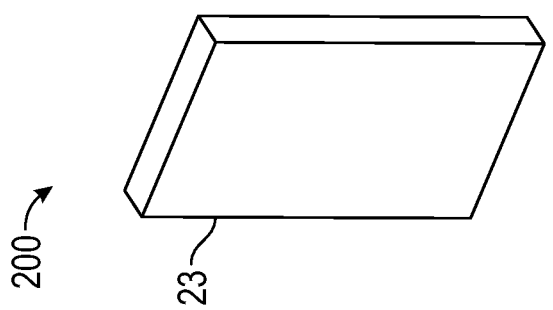
FIG. 21A is a perspective view of a windowless panel or enclosure according to Example 26 of the present disclosure.

FIGS. 21A-21C are perspective views of enclosures 23, 25, and 27. Compared to Comparative Example 1, enclosures 23, 25, and 27 have a thickness as described in the Examples herein and have no separate opening or window for transmission or receival of electromagnetic signal. The enclosure may be of any suitable geometric shape such as square, rectangular (enclosure 23 in FIG. 21A), cylindrical (enclosure 25 in FIG. 21B), disc (enclosure 27 in FIG. 21C), dome-shaped, cone-shaped, or any suitable shape.

The formed enclosure is part of a continuously molded article. The article described in this example can be useful for providing weather-resistant shielding for electronic equipment. Such an enclosure (not shown), or articles formed from one or more of such enclosures, can house one or more items of electromagnetic equipment. The electronic equipment can include, for example, a three-phase electrical wire terminated into a circuit breaker/disconnect; a power transformer/power conditioner; an optical fiber wire and fiber termination box; a radio or radios; a diplexer/multiplexer (per radio); a coaxial cable from radio to antenna(s); an antennae. This enclosure may also require a coax penetration to a remote antenna mount location. The enclosure is designed to accommodate any target application and has temperature control systems (fans, vent holes, or slots), access doors (screwed on, clipped on, hinged) for internals, and mounting accessories (brackets, swivel mounts, slider mounts), and such.

Absence of any opening(s) or window(s) while transmission and receival of electromagnetic signals occur though an enclosure body make such enclosures simple to design, fabricate, mount, and maintain. Furthermore, such panels and enclosures made therefrom, absent openings or windows fitted with materials different from the panel materials, make such structures more durable (e.g., long-lasting) with their structural integrity, strength, and impact resistance well-preserved.

Example 24

PA66-based Panel and Enclosure through which 30 GHz Frequency Electromagnetic Signals are Transmitted or Received Several panel structures are molded using a PA66 based thermoplastic resin labeled "PA66-IM-GF30" and corresponding to Specimen labeled "L" (50% RH) in Table 1 of the present disclosure. PA66-IM-GF30 is prepared using INVISTA™ PA66 material and further containing impact modified polyolefin with 30 wt % glass fiber (GF) reinforcement. The densities of four panels are 1.097, 1.244, 1.277 and 1.361 g/cc.

The so-formed panels were joined to form a three-dimensional rectangular enclosure having the dimensions of 48" L×24" W×12" D (or, 4' L×2' W×1' D). Proper network telecommunication equipment was housed inside the enclosure. The enclosure contained no separate opening or windows having any transparent medium such as film, glass covering, sheet, or the like. The PA66-IM-GF30 resin specimen had a dielectric constant of 3.5 and dissipation factor (DF) of 0.0142, both measured at 30 GHz frequency.

The panel wall structural thickness was maintained to about 3 mm for the transmission and receival of 30 GHz frequency electromagnetic signal having less than 0.5 dB loss during its transmission across the panel wall. This electromagnetic signal transmission and reception do not occur through a transparent or optical window.

Example 25

PA66-based Panel and Enclosure through which 40 GHz Frequency Electromagnetic Signals are Transmitted or Received Several panel structures were molded using a PA66 based thermoplastic resin labeled "PA66-PPE", which corresponds to Specimen labeled "H" (50% RH) in Table 1 of the present disclosure. PA66-PPE is an unreinforced thermoplastic resin. The densities of the panels are ≥1.1 g/cc and ≤1.4 g/cc.

The so-formed panels were joined to form a three-dimensional cylindrical enclosure having the dimensions of from about 22' to about 36" outside diameter and from about 0.5' to about 6.5' length (or, 3' O.D×5' long cylinder). Proper network telecommunication equipment was housed inside the enclosure. The enclosure contained no separate opening or windows having any transparent medium such as film, glass covering, sheet, etc. The PA66-PPE resin specimen had a dielectric constant of about 2.82 and a dissipation factor (DF) of about 0.0074, both measured at 40 GHz frequency.

The panel wall structural thickness was maintained to about 4 mm for the transmission and receival of 40 GHz frequency electromagnetic signal having less than 0.5 dB loss during its transmission across the panel wall. This electromagnetic signal transmission and receival did not occur through a transparent or optical window.

Example 26

PA66-based Panel and Enclosure through which sub-6 GHz (3 GHz) Frequency Electromagnetic Signals are Transmitted or Received Several panel structures were molded using a PA66 based thermoplastic resin labeled "PA66-PPE", which corresponded to Specimen labeled "H" (c50% RH) in Table 1 of the present disclosure. PA66-PPE is an unreinforced thermoplastic resin. The density of the panel is ≤1.1 g/cc and ≥1.4 g/cc.

The formed panels are joined to form a three-dimensional clamshell-shaped enclosure intended for sub-6 GHz 5G and 4G LTE radio equipment shrouds. Proper network telecommunication equipment is housed inside the enclosure. The enclosure contains no separate opening or windows having any transparent medium such as film, glass covering, sheet, etc. The PA66-PPE resin specimen has a dielectric constant of about 2.84 and a dissipation factor (DF) of about 0.0095, both measured at 3 GHz frequency.

The panel wall structural thickness was maintained to about 4 mm for the transmission and receival of 3 GHz frequency electromagnetic signal having less than 0.5 dB loss during its transmission across the panel wall. This electromagnetic signal transmission and receival do not occur through a transparent or optical window.

The present polyamide-based clamshell radio shroud weighs about 20-25 lbs and offers cost-efficient, durable solution in sub-6 GHz 5G and 4G LTE radio frequency transmission markets. An equivalent metal shroud having the necessary openings for radio wave transmission and receival functions is more expensive, less durable and heavier (~60-70 lbs).

Example 27

RF Testing—Insertion Loss Versus Distance at 24-40 GHz Wave Frequency

Similar to Example 18, a horn antenna setup was used to measure the insertion loss (S21 in dB) in the far field in the 24-40 GHz wave frequency spectrum as a function of the test specimen plaque surface distance from the antenna. Several materials, as described in Table 1, were tested by molding the materials into 1 ft×1 ft flat plaques. These plaques were precision-machined to obtain about 2.18 mm structural thickness. A 0.56 mm thick basecoat of flame retardant (FR) material and 0.15 mm thick top-coat of decorative color were applied to each plaque using spray coating technology. The total specimen structural thickness is 2.89 mm.

Figure 22:
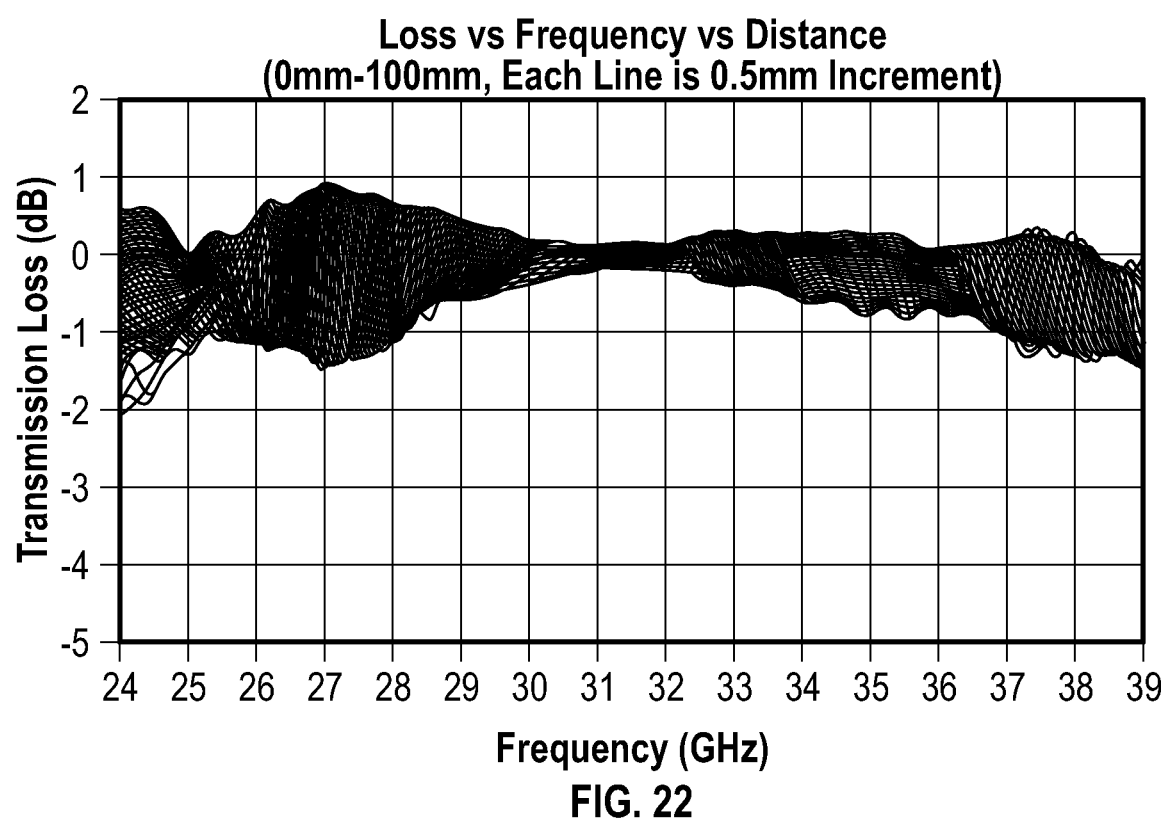
FIG. 22 represents a cyclone plot showing insertion loss (dB) data according to an aspect of the present disclosure.

FIG. 22 is a cyclone plot of the insertion loss in dB (Y-axis) measured over a 0-100 mm distance span in 0.5 mm increments over a 24-40 GHz frequency range (X-axis); each line shown is a 0.5 mm distance increment.

Example 28

Array Antenna Testing at 28 GHz Wave Frequency

The plaque specimens, described in Example 24 above, were next tested using a phased array antenna tuned to 28 GHz.

Figures 23A, 23B, 23C:
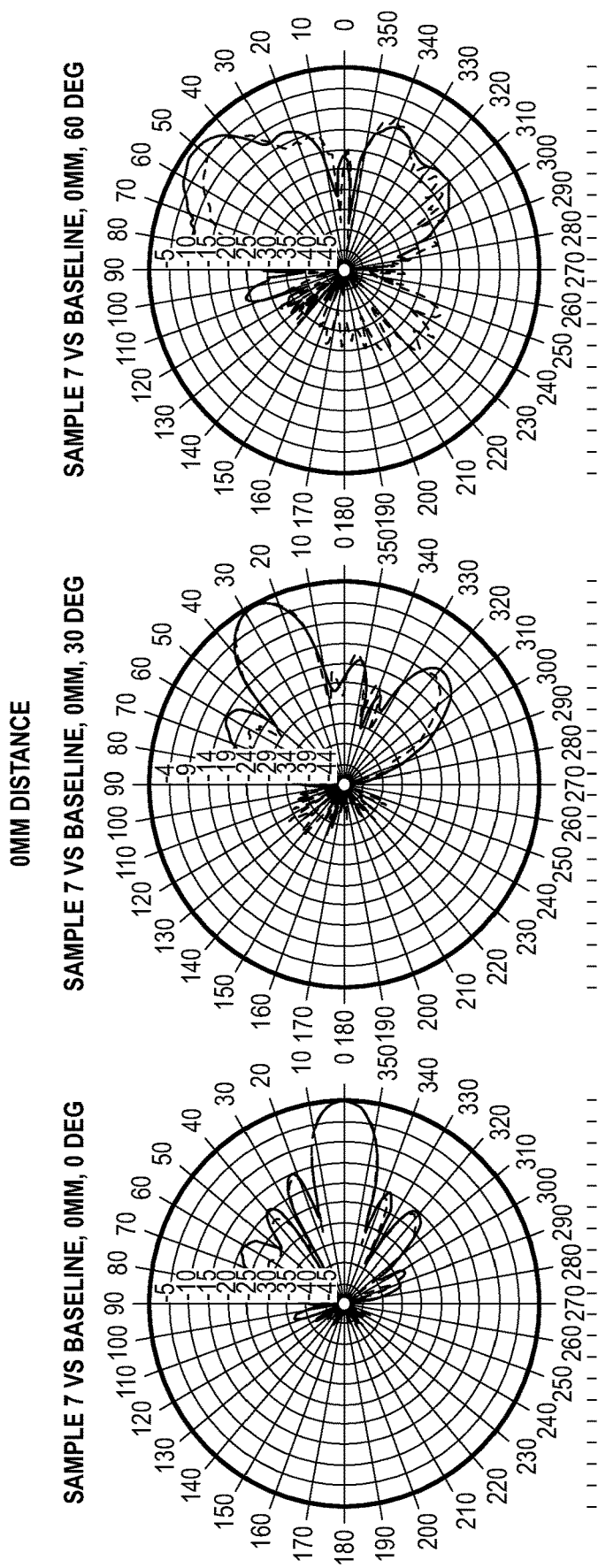
FIG. 23A represents array antenna data measured at an azimuth of 0° according to Example 28 of the present disclosure.
FIG. 23B represents array antenna data measured at an azimuth of 30°, according to Example 28 of the present disclosure.
FIG. 23C represents array antenna data measured at an azimuth of 60°, according to Example 28 of the present disclosure.

Changes in radiation as well as reflection patterns, for example, main lobe, side lobes, reflections, boresight error, and relative insertion losses (in dB), were measured at 28 GHz frequency and at two radio antenna distances, namely, i) close to each other ("0 mm Distance" plots in FIG. 23A), and ii) a few wavelengths apart ("25 mm Distance") plots in FIG. 23B. Incident ray measurements for main beam bore sight loss, error, 3 dB beam width change, $1^{st}$ sidelobe gain increase, and backlobe/reflected lobes gain increase, were performed at three azimuths, 0°, 30°, and 60°.

In FIGS. 23A-23F, the solid lines represent the baseline performance for the two-antenna system without the in-between plaque specimen, and the dashed lines represent the plaque performance tested with the two-antenna system at 0 mm and 25 mm distance spacing.

In FIGS. 23A-23F, for "0 mm Distance" and "25 mm Distance," respectively, the main lobe at each of the azimuths show little loss and the side lobes were improved compared to the ones in FIGS. 18A-18BF in Example 19.

Example 29

Mechanical Performance Data for Table 1 Specimens

Some of the material specimens from Table 1 were tested for mechanical performance. Specifically, specimens for material labeled "G" [DAM] and "H" [Cond] for PA66+PPE, as well as materials labeled "C" [DAM" and "D" [Cond] for PA66+GF30 were tested. Additional specimens were prepared using 20 wt % GF reinforced PA66+PPE and 20 wt % GF reinforced PA66 materials (not shown in Table 1), referred to as "PA66+PPE GF20" and "PA66 GF20", respectively. Tables 11A-F below provide the mechanical performance data for the tested specimens at three temperatures, −40° C., 23° C., and 50° C.

TABLE 11A

Tensile Data for Dry as Molded [DAM] Specimens

| Material | Table 1 Reference Label | Tensile Strength Tensile Stress at Yield (MPa) | Elongation Nominal Yield Strain (%) | Tensile Strength Tensile Stress at Break (MPa) | Nominal Break Strain (%) | Tensile Modulus Modulus of Elasticity (MPa) | Temp |
|---|---|---|---|---|---|---|---|
| PA66 + PPE | "G" | 60.8 | 5 | 59.9 | >59 | 2640 | 23 C. |
|  |  | 90.5 | 7.8 | 87.4 | 34 | 2980 | −40 C. |
|  |  | 48.7 | 26 | 51.3 | 86 | 1820 | 50 C. |
| PA66 + PPE GF20 |  | 127 | 3.8 | 123 | 5.3 | 6730 | 23 C. |
|  |  | 180 | 4.9 | 179 | 4.9 | 7130 | −40 C. |
|  |  | 103 | 4.9 | 100 | 7.5 | 5590 | 50 C. |
| PA66 GF20 |  |  |  | 147 | 3.4 | 7190 | 23 C. |
|  |  |  |  | 173 | 3 | 7460 | −40 C. |
|  |  | 115 | 5.1 | 111 | 9.6 | 6050 | 50 C. |
| PA66 GF 30 | "C" | 184 | 3.8 | 182 | 4.4 | 10100 | 23 C. |
|  |  |  |  | 237 | 3.3 | 10200 | −40 C. |
|  |  | 147 | 5.1 | 144 | 6.7 | 8370 | 50 C. |

TABLE 11B

Tensile Data for Conditioned [COND] Specimens

| Material | Table 1 Reference Label | Tensile Stress at Yield (MPa) | Nominal Yield Strain (%) | Tensile Stress at Break (MPa) | Nominal Break Strain (%) | Modulus of Elasticity (MPa) | Temp |
|---|---|---|---|---|---|---|---|
| PA66 + PPE | "H" | 49 | 16 | 52.9 | 100 | 1600 | 23 C. |
|  |  | 88 | 7.2 | 84.4 | 38 | 3310 | −40 C. |
|  |  | 41.4 | 18 | 43.6 | 96 | 1250 | 50 C. |
| PA66 + PPE GF20 |  | 100 | 5 | 97.2 | 7.8 | 5280 | 23 C. |
|  |  | 166 | 4.2 | 163 | 4.1 | 7350 | −40 C. |
|  |  | 85.9 | 5.8 | 83.9 | 8.3 | 4700 | 50 C. |
| PA66 GF20 |  | 94.6 | 8.4 | 91.1 | 13 | 4460 | 23 C. |
|  |  |  |  | 174 | 3.1 | 8680 | −40 C. |
|  |  | 80.8 | 9.9 | 78.3 | 13 | 3570 | 50 C. |
| PA66 GF 30 | "D" | 127 | 6.5 | 125 | 8.2 | 6830 | 23 C. |
|  |  |  |  | 229 | 3.3 | 10900 | −40 C. |
|  |  | 107 | 8.1 | 105 | 9.5 | 5440 | 50 C. |

TABLE 11C

Un-notched Charpy Data for DAM and Conditioned Specimens

| Material | Table 1 Reference Label | Units | DAM | Conditioned (ISO 1110) | Temp | Break Type |
|---|---|---|---|---|---|---|
| PA66 + PPE | "G" for DAM and | kJ/m$^2$ | 370 | 340 | 23 C. | Non Break |
|  | "H" for Conditioned | kJ/m$^2$ | 400 | 420 | −40 C. | Non Break |
|  |  | kJ/m$^2$ | 310 | 240 | 50 C. | Non Break |
| PA66 + PPE GF20 |  | kJ/m$^2$ | 82 | 76 | 23 C. | Complete |
|  |  | kJ/m$^2$ | 88 | 78 | −40 C. | Complete |
|  |  | kJ/m$^2$ | 79 | 73 | 50 C. | Complete |
| PA66 GF20 |  | kJ/m$^2$ | 53 | 98 | 23 C. | Complete |
|  |  | kJ/m$^2$ | 49 | 45 | −40 C. | Complete |
|  |  | kJ/m$^2$ | 72 | 110 | 50 C. | Complete |
| PA66 GF 30 | "C" for DAM and | kJ/m$^2$ | 89 | 110 | 23 C. | Complete |
|  | "D" for Conditioned | kJ/m$^2$ | 66 | 59 | −40 C. | Complete |
|  |  | kJ/m$^2$ | 100 | 120 | 50 C. | Complete |

TABLE 11D

Notched Charpy Data for DAM and Conditioned Specimens

| Material | Table 1 Reference Label | Units | DAM | Conditioned (ISO 1110) | Temp | Break Type |
|---|---|---|---|---|---|---|
| PA66 + PPE | "G" for DAM and | kJ/m$^2$ | 20 | 24 | 23 C. | Complete |
|  | "H" for Conditioned | kJ/m$^2$ | 16 | 12 | −40 C. | Complete |
|  |  | kJ/m$^2$ | 23 | 35 | 50 C. | Complete |
| PA66 + PPE GF20 |  | kJ/m$^2$ | 11 | 11 | 23 C. | Complete |
|  |  | kJ/m$^2$ | 8 | 7.3 | −40 C. | Complete |
|  |  | kJ/m$^2$ | 12 | 14 | 50 C. | Complete |
| PA66 GF20 |  | kJ/m$^2$ | 7.2 | 10 | 23 C. | Complete |
|  |  | kJ/m$^2$ | 6.4 | 6.9 | −40 C. | Complete |
|  |  | kJ/m$^2$ | 8.5 | 22 | 50 C. | Complete |
| PA66 GF 30 | "C" for DAM and | kJ/m$^2$ | 11 | 15 | 23 C. | Complete |
|  | "D" for Conditioned | kJ/m$^2$ | 8.9 | 8.8 | −40 C. | Complete |
|  |  | kJ/m$^2$ | 14 | 27 | 50 C. | Complete |

TABLE 11E

Flexural Data for DAM Specimens

| Material | Table 1 Reference Label | Flexural Stress at Yield | Flexural Strain at Yield | Flexural Stress at 3.5% Strain (MPa) | Flexural Modulus (MPa) | Temp |
|---|---|---|---|---|---|---|
| PA66 + PPE | "G" |  |  | 81.9 | 2380 | 23 C. |
|  |  |  |  | 93.4 | 2600 | −40 C. |
|  |  |  |  | 44.9 | 1490 | 50 C. |
| PA66 + PPE GF20 |  |  |  | 171 | 5440 | 23 C. |
|  |  |  |  | 195 | 5670 | −40 C. |
|  |  |  |  | 125 | 4370 | 50 C. |
| PA66 GF20 |  |  |  | 198 | 6050 | 23 C. |
|  |  | 261 | 4.5 | 220 | 6190 | −40 C. |
|  |  |  |  | 144 | 5090 | 50 C. |
| PA66 GF 30 | "C" | 280 | 4.9 | 252 | 8280 | 23 C. |
|  |  | 341 | 4.6 | 289 | 8290 | −40 C. |
|  |  |  |  | 178 | 6660 | 50 C. |

TABLE 11F

Flexural Data for Conditioned Specimens

| Material | Table 1 Reference Label | Flexural Stress at Yield | Flexural Strain at Yield | Flexural Stress at 3.5% Strain (MPa) | Flexural Modulus (MPa) | Temp |
|---|---|---|---|---|---|---|
| PA66 + PPE | "H" |  |  | 47.4 | 1460 | 23 C. |
|  |  |  |  | 97.6 | 2830 | −40 C. |
|  |  |  |  | 37 | 1120 | 50 C. |
| PA66 + PPE GF20 |  |  |  | 129 | 4430 | 23 C. |
|  |  | 241 | 4.9 | 201 | 6000 | −40 C. |
|  |  |  |  | 108 | 3740 | 50 C. |
| PA66 GF20 |  |  |  | 107 | 3730 | 23 C. |
|  |  | 256 | 4.3 | 226 | 6480 | −40 C. |
|  |  |  |  | 85.8 | 2890 | 50 C. |
| PA66 GF 30 | "D" |  |  | 145 | 5360 | 23 C. |
|  |  | 331 | 4.3 | 296 | 9250 | −40 C. |
|  |  |  |  | 118 | 4420 | 50 C. |

Example 30

This Example 30 illustrates ranges of thicknesses for nylon-6,6 free of glass reinforcing fibers (Example 30a), nylon-6,6 containing 30 weight percent glass reinforcing fibers (Example 30b) and polycarbonate (Example 30c),

TABLE 12A

Example 30a - Nylon-6,6 with no added glass fiber.

| Frequency, GHz | Thickness range to achieve less than 1 dB | |
|---|---|---|
| — | Min | Max |
| 0.5 | 0 mm | 5.136 mm |
| 6 | 0 mm | 4.28 mm |
| 24 | 2.53 mm | 4.39 mm |
| 30 | 2.00 mm | 3.55 mm |
| 36 | 1.66 mm | 3.04 mm |
| 40 | 1.49 mm | 2.73 mm |
| 76 | 1.96 mm | 2.52 mm |
| 81 | 1.84 mm | 2.37 mm |

TABLE 12B

Example 30b - Nylon-6,6 with 30% by weight glass fiber.

| Frequency, GHz | Thickness range to achieve less than 1 dB | |
|---|---|---|
| — | Min | Max |
| 0.5 | 0 mm | 3.911 mm |
| 6 | 0 mm | 3.25 mm |
| 24 | 2.46 mm | 4.08 mm |
| 30 | 1.97 mm | 3.19 mm |
| 36 | 1.66 mm | 2.64 mm |
| 40 | 1.49 mm | 2.38 mm |
| 76 | 1.85 mm | 2.34 mm |
| 81 | 1.73 mm | 2.1 mm |

TABLE 12C

Polycarbonate with no added glass fiber.

| Frequency, GHz | Thickness range to achieve less than 1 dB | |
|---|---|---|
| — | Min | Max |
| 0.5 | 0 mm | 7.024 mm |
| 6 | 0 mm | 5.86 mm |
| 24 | 2.33 mm | 5.04 mm |
| 30 | 1.90 mm | 3.95 mm |
| 36 | 1.55 mm | 3.37 mm |
| 40 | 1.4 mm | 3.03 mm |
| 76 | 1.94 mm | 2.74 mm |
| 81 | 2.96 mm | 3.65 mm |

Examples 31A-E

Specimens Including PA66/DI Formulations

Several formulations are prepared that include PA66/DI along with the glass fiber, FR additive, heat stabilizer additive and UV stabilizer in the compositional ranges shown in Table 13.

TABLE 13

| Component | Range (wt %) | Example 31A | Example 31B | Example 31C | Example 31D | Example 31E |
|---|---|---|---|---|---|---|
| PA66/DI [45 RV] | ≥50 to ≤85 | 58 | 64 | 70 | 74 | 78 |
| Glass Fiber [GF] | ≥5 to ≤20 | 15 | 15 | 10 | 10 | 5 |
| Flame Retardant [FR] Additive | Up to 20 | 20 | 20 | 20 | 15 | 15 |
| UV Stabilizer Additive | | | | 0.2-3 | | |
| Heat stabilizer Additive | | | | 0.2-2 | | |
| Colorant/Pigmentation [added at molding step] | Up to 5 | | | 0.2-3 | | |
| TOTAL | | 100 | 100 | 100 | 100 | 100 |

In Table 13 formulations, non-limiting examples of FR additive may include Exolit® OP 1080P, Exolit® OP 1314, Exolit® OP 1400, etc. The Exolit® FR additives are commercially available from Clariant.

In Table 13 formulations, non-limiting examples of UV stabilizer additive may include Carbon Black (19 nm range), organic UV/heat stabilizers such as Irganox® commercial products, phosphite-based commercial additives, hindered amine light [HAL] stabilizers [e.g.: Nylostab® products], UV absorber additives, and combinations thereof In Table 13 formulations, non-limiting examples of heat stabilizer and chain extending additives may include copper or organic-based such as Irganox® B1171, Irganox® B1098, Bruggolen™ TP-H1802, Bruggolen™ M1251, etc. For example, Irganox® B1171 is a commercial polymer additive product of BASF.

The colorant additive may be added at molding step for Table 13 formulations. Non-limiting examples of such colorant additive may include commercial products available in the thermoplastics industry.

The test plaques are prepared using the Table 13 formulations and as described above in the "dielectric constant and dissipation factor determination" section. The dielectric constants and Loss Tangent values are determined according to the test methods described above and in the signal frequency range of 20-40 GHz. Table 14 provides a summary of the dielectric performance data measured for various specimens prepared according to the present disclosure. The term "Loss Tangent" is a measure of how much the wave will decay due to absorption through a medium.

TABLE 14

| | At Frequency | | | | | |
|---|---|---|---|---|---|---|
| | 20 GHz | | 30 GHz | | 40 GHz | |
| Specimen | Dielectric Constant | Loss Tangent | Dielectric Constant | Loss Tangent | Dielectric Constant | Loss Tangent |
| PA66 Neat [unreinforced] | 3.16 | 0.0182 | 3.17 | 0.0139 | 3.07 | 0.0133 |
| PA66-GF30 Polyamide with 30 wt % glass fiber | 3.72 | 0.0128 | 3.81 | 0.0159 | 3.63 | 0.0164 |
| PA66-PPE [unreinforced] | 2.85 | 0.0076 | 2.88 | 0.0079 | 2.82 | 0.0074 |
| PA66 GF20 [Polyamide with 20 wt % glass fiber] | | | 3.35 | 0.0090 | | |
| PA66 GF20 with 20% FR additive, 1% UV additive, 1% colorant | | | 3.31 | 0.0080 | | |
| PA66/DI [45 RV] | | | 3.00 | 0.0090 | | |

Examples 32A-C

FR Performance Testing for PA66 Specimens

In Table 15 below, the flame retardancy [FR] performance data is summarized for several specimens according to the present disclosure. The tested specimens achieved the overall UL-94 test rating of V-0. The similar UL-94 test rating of V-0 is expected for the PA66/DI specimens with 20 wt % GF reinforcement, 20 wt % FR additive and up to 3 wt % each of UV additive and colorant. The FR coatings used in Table 15 are commercially available.

TABLE 15

| Sample ID | Specimen Description | Nominal thickness (mm) | Measured Average Thickness (mm) | Conditions | UL-94 Rating [FR Performance] |
|---|---|---|---|---|---|
| 32A | PA66-PPE with FR coating [unreinforced] | 1.5 | 2.481 | As received | V-0 |
|  |  |  | 2.485 | 168 hr. @ 70° C. | V-0 |
|  |  | 3.0 | 4.025 | As received | V-0 |
|  |  |  | 4.065 | 168 hr. @ 70° C. | V-0 |
| 32B | PA66 GF20 with FR coating | 1.5 | 2.466 | As received | V-0 |
|  |  |  | 2.408 | 168 hr. @ 70° C. | V-0 |
|  |  | 3.0 | 3.912 | As received | V-0 |
|  |  |  | 3.922 | 168 hr. @ 70° C. | V-0 |
| 32C | PA66 GF20 with 20% FR additive, 1% UV additive, 1% colorant | 1.5 | 1.464 | As received | V-0 |
|  |  |  | 1.443 | 168 hr. @ 70° C. | V-0 |
|  |  | 3.0 | 2.959 | As received | V-0 |
|  |  |  | 2.934 | 168 hr. @ 70° C. | V-0 |

There are a variety of tests and standards that may be used to rate the flame retardant nature of a polymeric resin system. Underwriters' Laboratories Test No. UL 94 serves as one Industry Standard test for flame retardant thermoplastic compounds. "UL 94 Standard for Tests for Flammability of Plastic Materials for Parts in Devices and Appliances" gives details of the testing method and criteria for rating. The test method ASTM D635 is Standard Test Method for Rate of Burning or Extent and Time of Burning of Plastics in a Horizontal Position. The test method ASTM D3801 is Standard Test Method for Measuring the Comparative Burning Characteristics of Solid Plastics in a Vertical Position. Vertical burning test ratings (e.g.: V-0, V-1, V-2) are more stringent and difficult to achieve than Horizontal burning ratings (HB-1, HB-2, HB-3).

The Examples surprisingly showed that a nylon-6,6 based formula could be developed to meet the mechanical requirements of a mm wave enclosure while transmitting enough mm wave signal to be useful in 5G service. One of the reasons this was surprising is that the nylon-66 absorbs water, which is thought to detrimentally affect transmission. Another unexpected beneficial feature of this formulation that was found is its compatibility with various additives, which is better than other base thermoplastics such as polypropylene and polycarbonate. Thermoplastics were found beneficial for their superior processibility. It was also surprisingly found that the addition of 5, 10, 20, 30 or more weight percent glass fiber (to improve tensile strength and toughness) yielded a compounded polyamide with acceptable mm wave transmissibility.

As shown in Example 30a for Nylon-6,6 with no added glass fiber, the Attenuation Coefficient value can range up to 3.9 dB/GHz.cm (for 0.5 GHz wave frequency) or can range between 0.05 and 0.07 dB/GHz.cm (for 81 GHz wave frequency). Example 30b for Nylon-6,6 with 30% by weight glass fiber, the attenuation coefficient value can range up to 5.25 dB/GHz.cm (for 0.5 GHz wave frequency), can range between 0.10 and 0.20 dB/GHz.cm (for 36 GHz wave frequency) or can range between 0.055 and 0.075 dB/GHz.cm (for 81 GHz wave frequency). Similarly, in the case of Example 30c for Polycarbonate with no added glass fiber, the attenuation coefficient value can range up to 3.0 dB/GHz.cm (for 0.5 GHz wave frequency) or can range between 0.03 and 0.045 dB/GHz.cm (for 81 GHz wave frequency).

The terms and expressions that have been employed are used as terms of description and not of limitation, and there is no intention in the use of such terms and expressions of excluding any equivalents of the features shown and described or portions thereof, but it is recognized that various modifications are possible within the scope of the aspects of the present invention. Thus, it should be understood that although the present invention has been specifically disclosed by specific aspects and optional features, modification and variation of the concepts herein disclosed may be resorted to by those of ordinary skill in the art, and that such modifications and variations are considered to be within the scope of aspects of the present invention.

Listing of Aspects.

The following aspects are provided, the numbering of which is not to be construed as designating levels of importance:

Aspect 1 provides an enclosure article for protecting a radio antenna operating in the 0.5 GHz to 81 GHz frequency range, the enclosure article comprising a thermoplastic resin comprising:
 a first polyamide comprising
  nylon-6,
  nylon-6,6,
  a copolymer of nylon-6 or nylon-6,6 comprising at least one repeating unit that is
   poly(hexamethylene terephthalamide),
   poly(hexamethylene isophthalamide), or
   a copolymer of poly(hexamethylene terephthalamide) and poly(hexamethylene isophthalamide),
  a mixture thereof, or
  a copolymer thereof; and
 a second polyamide, an additive, or a mixture thereof.

Aspect 2 provides the enclosure article of Aspect 1, comprising a first plate of a first thickness and a second plate of a second thickness.

Aspect 3 provides the enclosure article of Aspect 2, wherein the first plate and the second plate differently attenuate electromagnetic signals.

Aspect 4 provides the enclosure article of any one of Aspects 1-3, wherein
 the thermoplastic resin comprises
 the first polyamide;
 the second polyamide; and
 an additive Aspect 5 provides the enclosure article of any one of Aspects 1-4, wherein the first polyamide comprises:
 nylon-6 or nylon-6,6; and
 a copolymer comprising nylon-6 or nylon-6,6, the copolymer comprising at least one repeating unit that is
  poly(hexamethylene terephthalamide),
  poly(hexamethylene isophthalamide), a copolymer of poly(hexamethylene terephthalamide) and poly(hexamethylene isophthalamide), wherein a molar ratio of the poly(hexamethylene terephthalamide) repeating unit to poly(hexamethylene isophthalamide) repeating unit is in a range of from about 60:40 to about 90:10, or a mixture thereof.

Aspect 6 provides the enclosure article of any one of Aspects 1-4, wherein the first polyamide comprises:
nylon-6 or nylon-6,6; and
a copolymer comprising nylon-6 or nylon-6,6 and at least one repeating unit that is
poly(hexamethylene terephthalamide),
poly(hexamethylene isophthalamide), and/or
a copolymer of poly(hexamethylene terephthalamide) and poly(hexamethylene isophthalamide), wherein a molar ratio of the poly(hexamethylene terephthalamide) repeating unit to poly(hexamethylene isophthalamide) repeating unit is in a range of from about 70:30 to about 75:25.

Aspect 7 provides the enclosure article of any one of Aspects 1-6, wherein the first polyamide is at least one of nylon-6 and nylon-6,6.

Aspect 8 provides the enclosure article of any one of Aspects 1-7, wherein the thermoplastic resin comprises the additive and the additive is a reinforcing fiber that is up to 50 wt % level of the thermoplastic resin.

Aspect 9 provides the enclosure article of Aspect 8, wherein the reinforcing fiber comprises glass fibers, silicon fibers, carbon fibers, polypropylene fibers, polyacrylonitrile fibers, basalt fibers, or mixtures thereof.

Aspect 10 provides the enclosure article of any one of Aspects 8 or 9, wherein the reinforcing fiber comprises a glass fiber.

Aspect 11 provides the enclosure article of any one of Aspects 1-10, wherein the thermoplastic resin comprises the additive and the additive is chosen from an ultraviolet resistance additive, a flame retardancy additive, an antistatic additive, an impact modifier, a colorant, a moisture repellant, or a combination thereof.

Aspect 12 provides the enclosure article of any one of Aspects 1-11, wherein the thermoplastic resin comprises the additive and the additive is in a range of from about 0.1 wt % to about 30 wt % of the thermoplastic resin.

Aspect 13 provides the enclosure article of any one of Aspects 1-12, wherein the thermoplastic resin comprises the additive and the additive is in a range of from about 10 wt % to about 30 wt % of the resin, wherein a transmittance loss of the thermoplastic resin is less than 2 decibels (dB) for a signal having a frequency between 500 MHz and 40 GHz.

Aspect 14 provides the enclosure article of any one of Aspects 1-13, wherein a transmittance loss of the thermoplastic resin within at least one of a 0.5 GHz to 6 GHz frequency range, a 24 GHz to 30 GHz frequency range, and a 36 GHz to 40 GHz range is less than 1 decibel (dB).

Aspect 15 provides the enclosure article of Aspect 14, wherein the transmittance loss of the thermoplastic resin is less than 0.5 decibels (dB).

Aspect 16 provides the enclosure article of any one of Aspects 1-15, wherein the article fully encloses the radio antenna.

Aspect 17 provides the enclosure article of any one of Aspects 1-15, wherein the article comprises a panel.

Aspect 18 provides the enclosure article of Aspect 17, wherein the article has a uniform thickness.

Aspect 19 provides the enclosure article of any one of Aspects 17 or 18, wherein the article has a convex profile, a concave profile, or an undulating profile.

Aspect 20 provides the enclosure article of any one of Aspects 17-19, wherein the panel is windowless.

Aspect 21 provides the enclosure article of any one of Aspects 1-20, wherein the article is weather-resistant.

Aspect 22 provides the enclosure article of any one of Aspects 1-21, wherein a relative weight gain of the article due to moisture uptake is less than 4% upon equilibration in an atmosphere at 70° C. and 62% relative humidity.

Aspect 23 provides the enclosure article of any one of Aspects 1-22, wherein the thermoplastic resin comprises reinforcing glass fiber in up to 50 wt % level of the total composition mass; wherein the thermoplastic resin has:
a tensile strength in a range of from about 40 MPa to about 300 MPa;
a density in a range of from 0.7 g/cm$^3$ to 5 g/cm$^3$;
an impact resistance in a range of from 40 kJ/m$^2$ to 150 kJ/m$^2$; and
a signal attenuation of at least one of the following, when a direction of a signal impinging on the article is normal to a surface of the article, and wherein an article thickness is substantially uniform across an area where the signal impinges on the article:
from 1 dB to 0 dB for signal of frequency 500 MHz to 6 GHz when the article thickness is from 0.5 mm to 6 mm;
from 1 dB to 0 dB for signal of frequency 24 GHz to 30 GHz when the article thickness is from 0.5 mm to 4.5 mm;
from 1 dB to 0 dB for signal of frequency 36 GHz to 40 GHz when the article thickness is from 0.5 mm to 4 mm; and
from 1 dB to 0 dB for signal of frequency 76 GHz to 81 GHz when the article thickness is from 0.5 mm to 3.5 mm.

Aspect 24 provides the enclosure article of any one of Aspects 1-23, wherein a density of the article is in a range selected from:
greater than or equal to 0.7 g/cm$^3$ to less than or equal to 5 g/cm$^3$;
greater than or equal to 0.8 g/cm$^3$ to less than or equal to 4 g/cm$^3$; and
greater than or equal to 0.85 to less than or greater than 3 g/cm$^3$.

Aspect 25 provides the enclosure article of any one of Aspects 1-24, wherein the thermoplastic resin comprises from 10 to 50 wt % glass fibers.

Aspect 26 provides the enclosure article of Aspect 25, wherein the thermoplastic resin comprises from 12 to 50 wt % glass fibers.

Aspect 27 provides the enclosure article of Aspect 26, wherein the thermoplastic resin comprises 14 to 40 wt % glass fibers.

Aspect 28 provides the enclosure article of any one of Aspects 25-27, wherein the thermoplastic resin has a tensile strength in a range of from 40 to 300 MPa.

Aspect 29 provides the enclosure article of any one of Aspect 1-28, having a substantially uniform signal attenuation of:
from 1 B to 0 dB for signal of frequency 500 MHz to 6 GHz when an article thickness is from 1.5 mm to 4 mm;
from dB to 0 dB for signal of frequency 24 GHz to 30 GHz when the article thickness is from 2.5 mm to 4 mm;

from 1 B to 0 dB for signal of frequency 36 GHz to 40 GHz when the article thickness is from 1.75 mm to 2.75 mm; or from 1 dB to 0 dB for signal of frequency 76 GHz to 81 GHz when the article thickness is from 1.75 mm to 2.75 mm.

Aspect 30 provides the enclosure article of any one of the Aspects 1-29, comprising at least one of up to 20% of a flame-retardancy additive or a flame-retardancy coating, wherein the enclosure article has a UL-94 test rating of V-0.

Aspect 31 provides the enclosure article of any one of Aspects 1-30, wherein the thermoplastic resin comprises PA66:DI (85:15 to 96:4 wt:wt), glass fiber in a range of about 5 to about 20 wt %, a flame-retardant additive in a range of up to about 20 wt %, a UV additive in a range of up to about 3 wt %, a heat stabilizer additive in a range of up to about 2 wt %, and a colorant additive in a range of up to about 3 wt %.

Aspect 32 provides the enclosure article of any of Aspects 1-31, wherein the enclosure article is formed by one of injection molding, thermoforming, compression molding, or extrusion.

Aspect 33 provides a system comprising the enclosure article of any one of Aspects 1-32, spaced apart from the radio antenna.

Aspect 34 provides the system of Aspect 33, wherein the radio antenna operates in a frequency band associated with 5G broadband cellular network technology.

Aspect 35 provides a system comprising:
the radio antenna; and
the enclosure article of any one of Aspects 1-34, substantially enclosing the radio antenna.

Aspect 36 provides the system of Aspect 35, wherein the radio antenna operates in a frequency band associated with 5G broadband cellular network technology.

Aspect 37 provides an enclosure article for protecting a radio antenna operating in the 0.5 GHz to 81 GHz frequency range, the enclosure article comprising nylon-6,6.

Aspect 38 provides a method comprising transmitting electromagnetic radiation through the enclosure of any one of Aspects 1-37.

What is claimed is:

1. An enclosure for protecting a radio antenna, the enclosure comprising:
a thermoplastic resin comprising:
85:15 to 96:4 wt:wt PA66:DI, wherein DI comprises a combination of 2-methyl-pentamethylenediamine and isophthalic acid,
glass fiber in a range of about 5 to about 20 wt %,
a flame-retardant additive in a range of up to about 20 wt %,
a UV additive in a range of up to about 3 wt %,
a heat stabilizer additive in a range of up to about 2 wt %, and
a colorant additive in a range of up to about 3 wt % wherein
the radio antenna is configured for operation in a frequency range of 0.5 GHz to 81 GHz, and
the enclosure is free of portions and windows for transmission of an electromagnetic signal having a frequency range of 0.5 GHz to 81 GHz and that are free of the thermoplastic resin.

2. A method comprising:
transmitting electromagnetic radiation having a frequency in a range of 0.5 GHz to 81 GHz through an enclosure for protecting a radio antenna, the enclosure comprising
a thermoplastic resin comprising:
85:15 to 96:4 wt:wt PA66:DI, wherein DI comprises a combination of 2-methyl-pentamethylenediamine and isophthalic acid,
glass fiber in a range of about 5 to about 20 wt %,
a flame-retardant additive in a range of up to about 20 wt %,
a UV additive in a range of up to about 3 wt %,
a heat stabilizer additive in a range of up to about 2 wt %, and
a colorant additive in a range of up to about 3 wt %, and
the enclosure is free of portions and windows for transmission of an electromagnetic signal having a frequency range of 0.5 GHz to 81 GHz and that are free of the thermoplastic resin.

3. The enclosure of claim 1, wherein the enclosure is configured to fully enclose the radio antenna.

4. The enclosure of claim 3, wherein the enclosure has a uniform thickness.

5. The enclosure of claim 1, wherein a relative weight gain of the enclosure due to moisture uptake is less than 4% upon equilibration in an atmosphere at 70° C. and 62% relative humidity, according to ISO 1110.

6. The enclosure of claim 1, wherein the enclosure has:
a tensile strength in a range of from about 40 MPa to about 300 MPa,
a density in a range of from 0.7 g/cm$^3$ to 5 g/cm$^3$,
a un-notched Charpy impact resistance, at 23° C., in a range of from 40 kJ/m$^2$ to 150 kJ/m$^2$, and
a signal attenuation of at least one of the following, when a direction of a signal impinging on the enclosure is normal to a surface of the enclosure, and wherein an enclosure thickness is substantially uniform across an area where the signal impinges on the enclosure:
from 1 dB to 0 dB for signal of frequency 500 MHz to 6 GHz when the enclosure thickness is from 0.5 mm to 6 mm,
from 1 dB to 0 dB for signal of frequency 24 GHz to 30 GHz when the enclosure thickness is from 0.5 mm to 4.5 mm,
from 1 dB to 0 dB for signal of frequency 36 GHz to 40 GHz when the enclosure thickness is from 0.5 mm to 4 mm, and
from 1 dB to 0 dB for signal of frequency 76 GHz to 81 GHz when the enclosure thickness is from 0.5 mm to 3.5 mm.

7. The enclosure of claim 1, wherein a density of the enclosure is in a range of from greater than or equal to 0.7 g/cm$^3$ to less than or equal to 5 g/cm$^3$.

8. The enclosure of claim 1, wherein the thermoplastic resin comprises from 10 to 20 wt % glass fibers.

9. The enclosure of claim 6, wherein the enclosure has a tensile strength in a range of from 40 to 300 MPa.

10. The enclosure of claim 1, having a substantially uniform signal attenuation of:
from 1 dB to 0 dB for signal of frequency 500 MHz to 6 GHz when an enclosure thickness is from 1.5 mm to 4 mm,
from 1 dB to 0 dB for signal of frequency 24 GHz to 30 GHz when the enclosure thickness is from 2.5 mm to 4 mm,
from 1 dB to 0 dB for signal of frequency 36 GHz to 40 GHz when the enclosure thickness is from 1.75 mm to 2.75 mm, or
from 1 dB to 0 dB for signal of frequency 76 GHz to 81 GHz when the enclosure thickness is from 1.75 mm to 2.75 mm.

11. The method of claim 2, wherein the enclosure is configured to fully enclose the radio antenna.

12. The method of claim 11, wherein the enclosure has a uniform thickness.

13. The method of claim 11, wherein a relative weight gain of the enclosure due to moisture uptake is less than 4% upon equilibration in an atmosphere at 70° C. and 62% relative humidity, according to ISSO 1110.

14. The method of claim 2, wherein the enclosure has:
a tensile strength in a range of from about 40 MPa to about 300 MPa,
a density in a range of from 0.7 g/cm$^3$ to 5 g/cm$^3$,
a un-notched Charpy impact resistance, at 23° C. in a range of from 40 kJ/m$^2$ to 150 kJ/m$^2$, and
a signal attenuation of at least one of the following, when a direction of a signal impinging on the enclosure is normal to a surface of the enclosure, and wherein an enclosure thickness is substantially uniform across an area where the signal impinges on the enclosure:
from 1 dB to 0 dB for signal of frequency 500 MHz to 6 GHz when the enclosure thickness is from 0.5 mm to 6 mm,
from 1 dB to 0 dB for signal of frequency 24 GHz to 30 GHz when the enclosure thickness is from 0.5 mm to 4.5 mm,
from 1 dB to 0 dB for signal of frequency 36 GHz to 40 GHz when the enclosure thickness is from 0.5 mm to 4 mm, and
from 1 dB to 0 dB for signal of frequency 76 GHz to 81 GHz when the enclosure thickness is from 0.5 mm to 3.5 mm.

15. The method of claim 2, wherein a density of the enclosure is in a range of from greater than or equal to 0.7 g/cm$^3$ to less than or equal to 5 g/cm$^3$.

16. The method of claim 2, wherein the thermoplastic resin comprises from 10 to 20 wt % glass fibers.

17. The method of claim 16, wherein the enclosure has a tensile strength in a range of from 40 to 300 MPa.

18. The method of claim 2, having a substantially uniform signal attenuation of:
from 1 dB to 0 dB for signal of frequency 500 MHz to 6 GHz when an enclosure thickness is from 1.5 mm to 4 mm,
from 1 dB to 0 dB for signal of frequency 24 GHz to 30 GHz when the enclosure thickness is from 2.5 mm to 4 mm,
from 1 dB to 0 dB for signal of frequency 36 GHz to 40 GHz when the enclosure thickness is from 1.75 mm to 2.75 mm, or
from 1 dB to 0 dB for signal of frequency 76 GHz to 81 GHz when the enclosure thickness is from 1.75 mm to 2.75 mm.

19. The enclosure of claim 7, wherein a density of the enclosure is in a range of from greater than or equal to 0.8 g/cm$^3$ to less than or equal to 4 g/cm$^3$.

20. The enclosure of claim 19, wherein a density of the enclosure is in a range of from greater than or equal to 0.85 g/cm$^3$ to less than or equal to 3 g/cm$^3$.

\* \* \* \* \*